United States Patent
Shimizu et al.

[11] Patent Number: 6,069,324
[45] Date of Patent: May 30, 2000

[54] LOAD DEFLECTING DEGREE COMPUTING APPARATUS AND CARRYING WEIGHT COMPUTING APPARATUS FOR VEHICLE

[75] Inventors: Shinichiro Shimizu; Hideyuki Aoshima; Laiping Su, all of Shizuoka, Japan

[73] Assignee: Yazaki Corporation, Tokyo, Japan

[21] Appl. No.: 09/051,275

[22] PCT Filed: Apr. 19, 1996

[86] PCT No.: PCT/JP96/01066

§ 371 Date: Apr. 6, 1998

§ 102(e) Date: Apr. 6, 1998

[87] PCT Pub. No.: WO97/14019

PCT Pub. Date: Apr. 17, 1997

[30] Foreign Application Priority Data

Oct. 12, 1995 [JP] Japan .................................. 7-264429
Apr. 12, 1996 [JP] Japan .................................. 8-91052

[51] Int. Cl.[7] .......................... G01G 19/02; G01G 19/12
[52] U.S. Cl. ......................... 177/136; 73/1.13; 702/101; 702/174
[58] Field of Search .................................. 73/1.13, 1.15; 702/101, 102, 173, 174, 175, 150, 154; 177/136, 137, 138, 139, 141, 45, 46, 47, 48, 49

[56] References Cited

U.S. PATENT DOCUMENTS

| | | | |
|---|---|---|---|
| 4,478,091 | 10/1984 | Forrester | 177/136 |
| 4,691,792 | 9/1987 | Shintani | 177/141 |
| 4,839,835 | 6/1989 | Hegenbuch | 177/141 |
| 4,852,674 | 8/1989 | Gudat | 177/141 |
| 4,854,407 | 8/1989 | Wagner | 177/141 |
| 5,167,289 | 12/1992 | Stevenson | 177/141 |
| 5,243,146 | 9/1993 | Nishitani | 177/136 |
| 5,456,119 | 10/1995 | Nakazaki et al. | 73/841 |
| 5,509,293 | 4/1996 | Karumanchi | 73/1.13 |
| 5,610,372 | 3/1997 | Phillips et al. | 177/141 |
| 5,659,470 | 8/1997 | Goska et al. | 177/141 |
| 5,684,254 | 11/1997 | Nakazaki et al. | 73/774 |
| 5,726,915 | 3/1998 | Prager et al. | 702/116 |
| 5,780,783 | 7/1998 | Heider et al. | 177/137 |
| 5,814,771 | 9/1998 | Oakes et al. | 177/136 |
| 5,837,946 | 11/1998 | Johnson et al. | 177/136 |

FOREIGN PATENT DOCUMENTS

| | | |
|---|---|---|
| 51-151574 | 12/1976 | Japan . |
| 61-92828 | 6/1986 | Japan . |
| 2-500049 | 1/1990 | Japan . |
| 5-213108 | 8/1993 | Japan . |
| 6-16826 | 3/1994 | Japan . |

OTHER PUBLICATIONS

Rudolph F. Graf, "Modern Dictionary of Electronics, Sixth Edition", Butterworth–Heineman, Newton, MA, pp. 872–873, 1997.

*Primary Examiner*—Randy W. Gibson
*Attorney, Agent, or Firm*—Amstrong, Westerman, Hattori, McLeland & Naughton

[57] ABSTRACT

A carrying weight computing apparatus serves to compute a carrying weight of a vehicle on the basis of the outputs from a plurality of weight sensor arranged apart from each other at least in a vehicle width direction of the vehicle. The carrying weight computing apparatus includes a deflective load setting unit for setting the deflection of load applied to the vehicle, and a carrying weight computing unit for computing the carrying weight on the basis of the deflection of load set by said deflective load setting unit so that the deflection of load and the carrying weight can be computed from the outputs from said weight sensors. The deflective load setting unit includes a correction function holding means for holding an output characteristic correction function corresponding to each said weigh sensor for correcting the non-linear characteristic of each said weight sensor into its linear characteristic, and output characteristic correcting unit for correcting the output from each said weight sensor in terms of the corresponding output characteristic correction function. The deflective load setting unit serves to compute the deflection of load in the vehicle width direction of the load applied to the vehicle on the basis of the corrected outputs from said weight sensors.

35 Claims, 37 Drawing Sheets

FIG. 24

| $Z_{1,n}$ | $Z_{1,n-1}$ | $Z_{1,n-2}$ | ......................... | $Z_{1,3}$ | $Z_{1,2}$ | $Z_{1,1}$ | $x_1$ |
|---|---|---|---|---|---|---|---|
| $Z_{2,n}$ | $Z_{2,n-1}$ | $Z_{2,n-2}$ | ......................... | $Z_{2,3}$ | $Z_{2,2}$ | $Z_{2,1}$ | $x_2$ |
| : | : | : | : : $Z_{a,a}$ : : | : | : | : | $x_3 \cdots x_{n-2}$ |
| $Z_{n-1,n}$ | $Z_{n-1,n-1}$ | $Z_{n-1,n-2}$ | ......................... | $Z_{n-1,3}$ | $Z_{n-1,2}$ | $Z_{n-1,1}$ | $x_{n-1}$ |
| $Z_{n,n}$ | $Z_{n,n-1}$ | $Z_{n,n-2}$ | ......................... | $Z_{n,3}$ | $Z_{n,2}$ | $Z_{n,1}$ | $x_n$ |
| $y_n$ | $y_{n-1}$ | $y_{n-2}$ | $y_{n-3} \cdots\cdots\cdots y_4$ | $y_3$ | $y_2$ | $y_1$ | |

| $\delta$ | | VVL | VL | LOW | HIGH | VH | VVH |
|---|---|---|---|---|---|---|---|
| | VL | Z | P | PM | P | Z | Z |
| | LOW | P | PM | PM | P | N | NM |
| | HIGH | P | P | P | Z | Z | |
| | VH | | P | N | N | | |

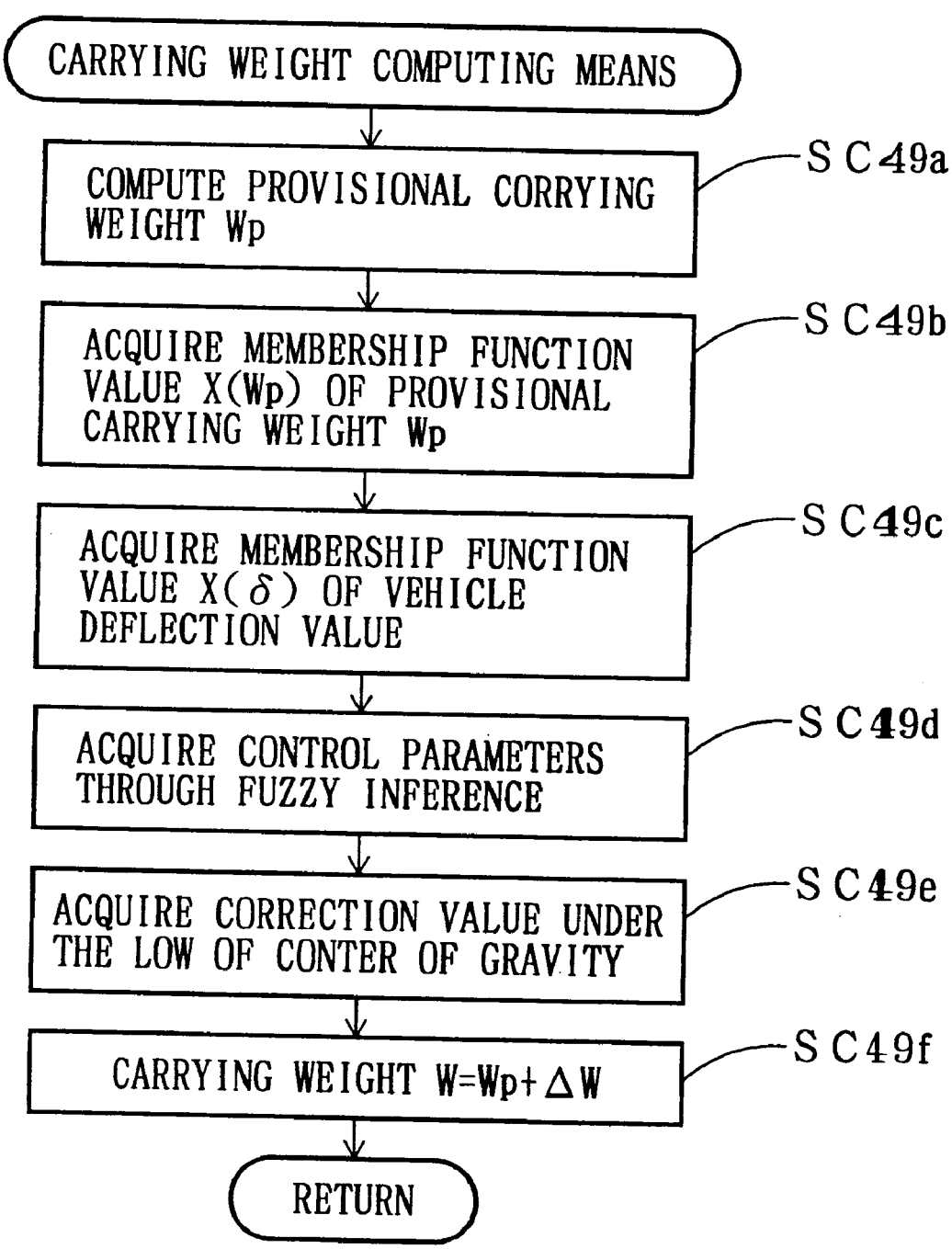

LOAD DEFLECTING DEGREE COMPUTING APPARATUS AND CARRYING WEIGHT COMPUTING APPARATUS FOR VEHICLE

BACKGROUND OF THE INVENTION

1. Technical Field of the Invention

The present invention relates to an apparatus for computing the degree of load applied to a vehicle such as a track, and an apparatus for computing a carrying weight.

2. Explanation of the Prior Art

The carrying weight of a vehicle has been measured for mainly a large-scale vehicle such as a track in Japan in order to prevent the traffic accident such as turn-over on its side due to excessive carrying and promotion of vehicle deterioration.

Conventionally, the carrying weight of a vehicle has been measured with an object to be measured on a scale. However, the facilities used requires a large scale and so a wide installing space, thereby limiting the number of scales which can be installed. This does not permit measurement to be made for a larger number of vehicles and increases the installation cost.

Therefore, in recent years, a carrying weight computing apparatus in which the weight on board of the vehicle itself is computed has been proposed.

In the conventional vehicle on-board type weight computing apparatus, a sensing element for weight measurement such as a distortion gauge sensor is attached to each of arc leaf springs, which are arranged between the front/rear and left/right positions of a platform frame and left/right ends of both front and rear axle. The carrying weight is computed by totaling the outputs from the sensing elements in proportion to the loads applied to the respective sensing elements.

However, the outputs from the sensing elements change as the deflection of load applied to a vehicle, particularly, the deflection of load in a vehicle width direction, changes according to whether or not the vehicle stays on an inclined ground, to carrying balance of load in a platform and to the characteristic of distribution of weight of a vehicle itself.

Therefore, only totaling the measured values of the above sensing elements may not compute a collect carrying weight. Thus, in order to improve the computing accuracy, the presence or absence of the deflection of loading or its contents must be taken in consideration.

In the sensing element such as a distortion gauge sensor, the characteristic when the load applied to it increases is not coincident to that when the load decreases. Specifically, the sensing element has a non-linear characteristic inclusive of the hysterisis in which a higher output when the load increases is provided than that when it decreases.

In addition, there is a variation in the characteristic among a plurality of sensing elements used for computing the deflection of load or carrying weight.

For this reason, if the deflection of load is simply computed on the basis of the outputs from the sensing elements under the judgment that the variation in the outputs from the sensing elements is due to the deflection of the load, the influence of hysterisis and a variation of the characteristics among the sensing elements is left as it is within the deflection or carrying weight. Therefore, on the way where the load applied to the vehicle decreases, the output from the sensing element becomes a negative load value. Thus, on the basis of the output value, correct deflection or carrying weight cannot be computed.

Further, the output from each sensing element varies when a vehicle vibrates owing to its running. Therefore, in order to compute the carrying weight accurately, the state of running or stopping of the vehicle is preferably taken in consideration.

SUMMARY OF THE INVENTION

The present invention has been accomplished under the above circumstance.

A first object of the present invention is to provide an apparatus for computing the deflection of load on a vehicle which can compute the contents of deflection in a load applied to the vehicle irrespectively of the non-linear characteristic inclusive of the hysterisis of each weight sensor and variation in the characteristic among the weight sensors. Such an apparatus is useful in computing the carrying weight of the vehicle accurately on the basis of the outputs from such as distortion gauge sensors.

A second object of the present invention is to provide a carrying weight computing apparatus which can accurately compute the carrying weight of a vehicle on the basis of the output from each of the weight sensors.

A third object of the present invention is to provide a carrying weight computing apparatus which can compute the carrying weight on the basis of the output from each of the weight sensors without being affected by the vibration of a vehicle attendant to its running.

In order to attain the above first object, the load deflection degree computing apparatus defined in claim 1 is an apparatus for computing the vehicle deflection degree in a vehicle width direction of load applied on the vehicle on the basis of outputs from a plurality of weight sensors arranged separately in the vehicle width direction, comprising: correction function holding means for holding an output characteristic correction function for correcting the non-linear characteristic of each of said weight sensors into the liner characteristic, said correction function corresponding to the output from each said sensor; and an output characteristic correction means for correcting the output from each said weight sensor in terms of said output characteristic correction function, characterized in that said vehicle deflection degree is computed on the basis of the corrected output from each said weight sensor.

In order to attain the third object, as defined in claim 6, the load deflection degree computing apparatus may comprise weight sensor level correction means for correcting the output signal from each said weight sensor so that the characteristics of said weight sensors are coincident with one another, wherein said vehicle deflection degree is computed on the basis of the levels of the output signals corrected by said weight sensor level correction means.

In order to attain the second object, the carrying weight computing apparatus according to the present invention defined in claim 7, in which a carrying weight on a vehicle is computed on the basis of the outputs from a plurality of weight sensors separately arranged at least in a vehicle width direction, is characterized by comprising deflective load setting means for setting a deflection applied on the vehicle; and a carrying weight computing means for computing said carrying weight on the basis of outputs from said plurality of weight sensors and the deflection set by said deflective load setting means.

The deflection of load set by said deflective load setting means, as defined in claim 17, may be the ratios of load in both vehicle length and vehicle width directions detected on the basis of the respective output signals from the weight sensors by the deflective load detecting means.

As in the carrying weight computing apparatus defined in claim 22, the deflection of load set by said deflective load setting means is one detected on the basis of the output signals from the weight sensors by said deflective load setting means.

As in the carrying weight computing apparatus defined in claim 30, the deflection of load set by said deflective load setting means is the degree of deflection applied to the vehicle detected on the basis of the outputs from said weight sensors by said deflective load detecting means.

Where the deflective load setting means set, as deflection of load, the ratio of load, deflection of load applied to the vehicle and degree of deflection applied to the vehicle, in order to attain the third object, the following structure can be adopted.

Namely, as in the carrying weight computing apparatus defined in claims 19 and 24, said deflective load detecting means may detect the ratios in the vehicle length and vehicle width directions, deflection of the load applied to the vehicle and degree of the load applied to the vehicle on the basis of the output signals from said weight sensors corrected by the weight sensor level correcting means so that the characteristic of said weight sensor agree with one another.

Further, as in the carrying weight computing apparatus defined in claim 33, said weight computing means may compute the weight of the vehicle, and said deflective load detecting means may detect the ratios in the vehicle length and vehicle width directions, deflection of the load applied to the vehicle and degree of the load applied to the vehicle on the basis of the output signals from said weight sensors corrected by the weight sensor level correcting means so that the characteristic of said weight sensor agree with one another.

Where the deflective load setting means set, as deflection of load, the ratio of load, deflection of load applied to the vehicle and degree of deflection applied to the vehicle, in order to attain the third object, the following structure can be adopted.

As in the carrying weight computing apparatus according to the present invention defined in claims 20 and 25, said deflective load detecting means may detect the ratios in the vehicle length and vehicle width directions, deflection of the load applied to the vehicle and degree of the load applied to the vehicle on the basis of the output signal levels from said weight sensors corrected by the output characteristic correcting means in terms of output characteristic correction functions corresponding to the outputs from said weight sensors to correct their non-linear characteristic to their linear characteristic held in the correction function holding means.

As in the carrying weight computing apparatus according to the present invention defined in claim 34, said weight computing means may compute the weight of the vehicle, and said deflective load detecting means may detect the ratios in the vehicle length and vehicle width directions, deflection of the load applied to the vehicle and degree of the load applied to the vehicle on the basis of the output signal levels from said weight sensors corrected by the output characteristic correcting means in terms of output characteristic correction functions corresponding to the outputs from said weight sensors to correct their non-linear characteristic to their linear characteristic held in the correction function holding means.

In order to attain the fourth object of the present invention, as in the carrying weight computing apparatus defined in claim 14, before-computation running detection means may detect presence or absence of running of the vehicle before the carrying weight is computed this time on the basis of an output from a running sensor for detecting the running of the vehicle and said carrying weight previously computed; correction data selecting means selects the corresponding correction value data from said correction value data holding means on the basis of the detection result by said before-computation running detection means and said deflection of load; and said carrying weight computing means computes the said carrying weight on the basis of said correction data selected by said correction data selecting means.

BRIEF DESCRIPTION OF THE DRAWINGS

FIG. 24 is a flowchart showing the contents of a deflection correction table stored in NVM shown in FIG. 22;

FIG. 39 is a flowchart showing the subroutine of the carrying weight computing shown in FIG. 36.

DESCRIPTION OF THE PREFERRED EMBODIMENTS

Schematic Configuration of Load Deflection Computing Apparatus for Vehicle

Figure 1:
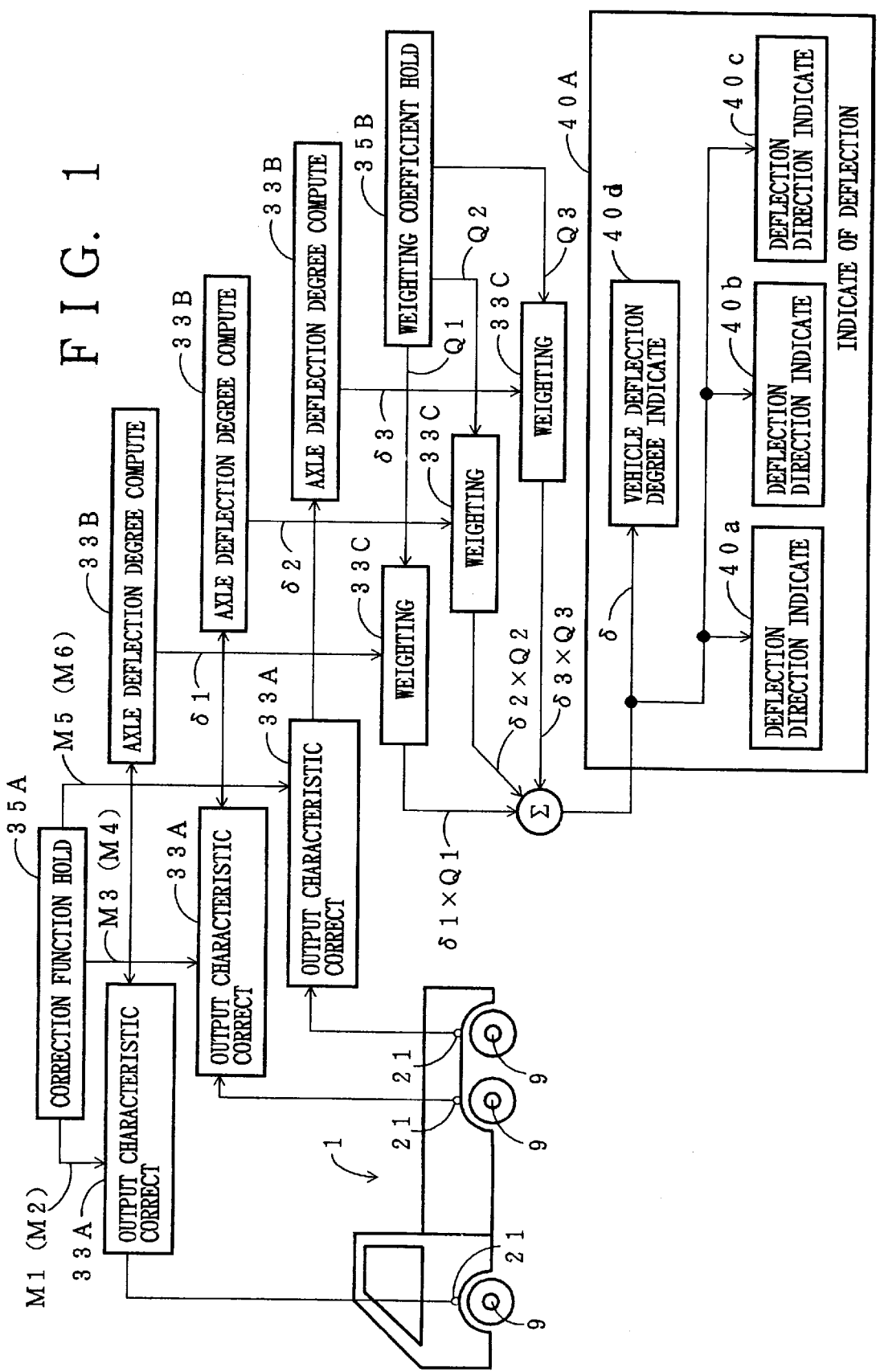
FIG. 1 is a basic arrangement view of a load deflection computing apparatus according to the present invention.

Now referring to the basic arrangement view of FIG. 1, an explanation will be given of the load deflection computing apparatus according to the present invention.

The load deflection computing apparatus for a vehicle according to the present invention intends to compute the deflection degree of load applied to a vehicle in a body width direction on the basis of the outputs from a plurality of weight sensors arranged at regular intervals in the vehicle width direction. The load deflection degree computing apparatus comprises correction function holding means 35A for holding output characteristic correction functions M1–M6 (hereinafter simply referred to as "correction functions") corresponding to outputs from the respective weight sensors 21 and for correcting the non-linearity characteristic of each of weight sensors 21 into a linearity characteristic thereof; and output characteristic correcting means 33A for correcting the outputs from the weight sensors 21 so that the deflection degree of the load applied to the vehicle in a vehicle width direction is computed on the basis of the outputs of the weight sensors 21 which have been corrected by the output characteristic correcting means 33A.

In the load deflection degree computing apparatus for a vehicle according to the present invention, the output characteristic collecting means 33A correct the outputs from the weight sensors 21 using the correction functions M1 to M6, respectively so that the non-linear characteristic inclusive of the hysterisis in the output from each weight sensor 21 is corrected into the linearity characteristic. Thus, the outputs from the weight sensors 21 corrected using the correction functions M1 to M6 are substantially equal between when the load for the vehicle 1 increases and when it decreases.

In other words, the coincidence of the deflection degrees between when the load increases and when it decreases is enhanced as compared with the case where the deflection degree is computed using the non-corrected outputs from the weight sensors 21, thus greatly improving the accuracy of the computed deflection degree.

The load deflection degree computing device according to the present invention further includes a deflection degree indicating means 40 for indicating the deflection degree in a vehicle width direction of the computed load. This indicated deflection can be taken in consideration in computing the carrying weight of the vehicle 1, and also permits the deflecting state of the load applied to the vehicle 1 to be more correctly recognized than in the case of judging the baggage by naked eyes.

In the load deflection degree computing apparatus according to the present invention, the weight sensors 21 are arranged on both ends of each axle 9 of the vehicle 1. Further, the load deflection computing apparatus includes an axle deflection value computing means 33B, a weighting coefficient holding means 35B and a weighting means 33C. The axle deflection value computing means 33B serves to compute axle deflection values $\delta 1$ to $\delta 3$ each representing the orientation and magnitude of the deflection in the vehicle width direction of the load applied to the respective axles 9. The weighting coefficient holding means 35B serve to hold the weighting coefficients Q1 to Q3 inherent to the axles 9. The weighting means 33C serves to assign weights to the axle deflection values $\delta 1$ to $\delta 3$ in terms of the above weighting coefficients Q1 to Q3.

The total of the axle deflection values $\delta 1 \times Q1$ to $\delta 3 \times Q3$ represents a vehicle deflection value $\delta$. The deflection indicating means 40 includes a vehicle deflection value indicating unit 40$d$ for indicating the vehicle deflection value $\delta$.

The load deflection computing apparatus according to the present invention having such a configuration permits orientation and magnitude of the deflection for each axle 9 to be accurately computed in such a manner that the axle deflection values $\delta 1$ to $\delta 3$ for the respective axles 9 are computed by the computing means 33B on the basis of the outputs from the weight sensors 21 after the influence of the non-linearity characteristic containing the hysterisis has been removed by correction by the correction functions M1 to M6.

The weights of the weighting coefficients Q1 to Q3 are assigned to the corresponding axle deflection values δ1 to δ3 by the weighting means 33C, and the vehicle deflection value δ is computed on the basis of the axle deflection values δ1 to δ3. Thus, the accurate vehicle deflection value δ can be computed taking into consideration the distribution of loads applied to the respective axles 9 in the vehicle length direction.

Thus, indicating the vehicle deflection value δ on the vehicle deflection indicating unit 40d of the deflection indicating means 40, the deflecting direction and content of the load can be easily recognized under a certain standard.

In addition, the load deflection computing apparatus according to the present invention is so configured that the deflection indicating means 40 has deflecting direction indicating units 40a to 40c for indicating the orientation of the deflection of the load in the body direction. For this reason, in which orientation in the vehicle width direction, the entire load deflects can be easily recognized visually.

Concrete Arrangement of Load Deflection Computing Apparatus for Vehicle

Now referring to FIGS. 2 to 9, a detailed explanation will be given of the concrete arrangement of a load deflection degree computing apparatus according to the present invention.

Figure 2A:
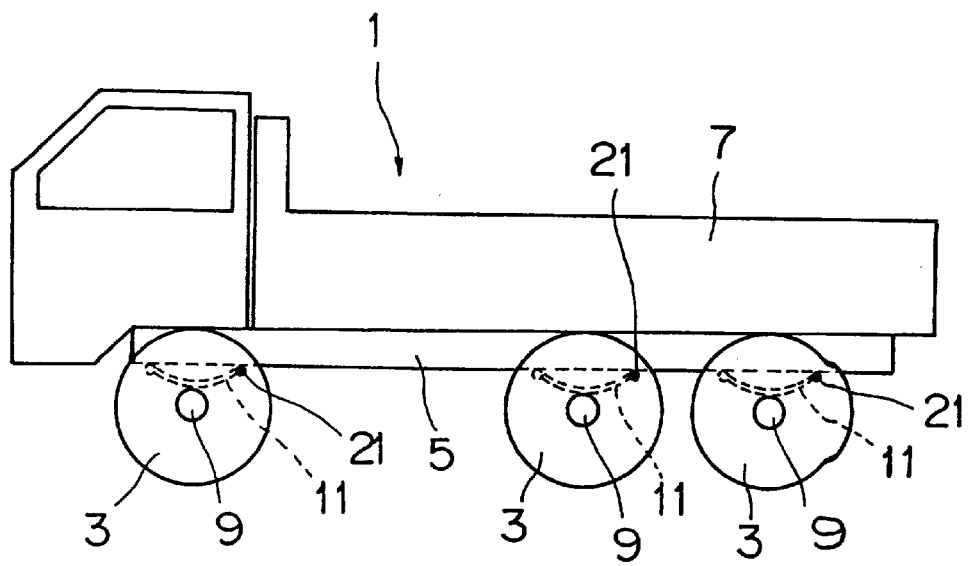
FIG. 2A is a side view showings positions where sensing elements are arranged in a load deflection degree computing apparatus according to the present invention, and in the first and third aspects of a carrying weight computing apparatus according to the present invention.
Figure 2B:
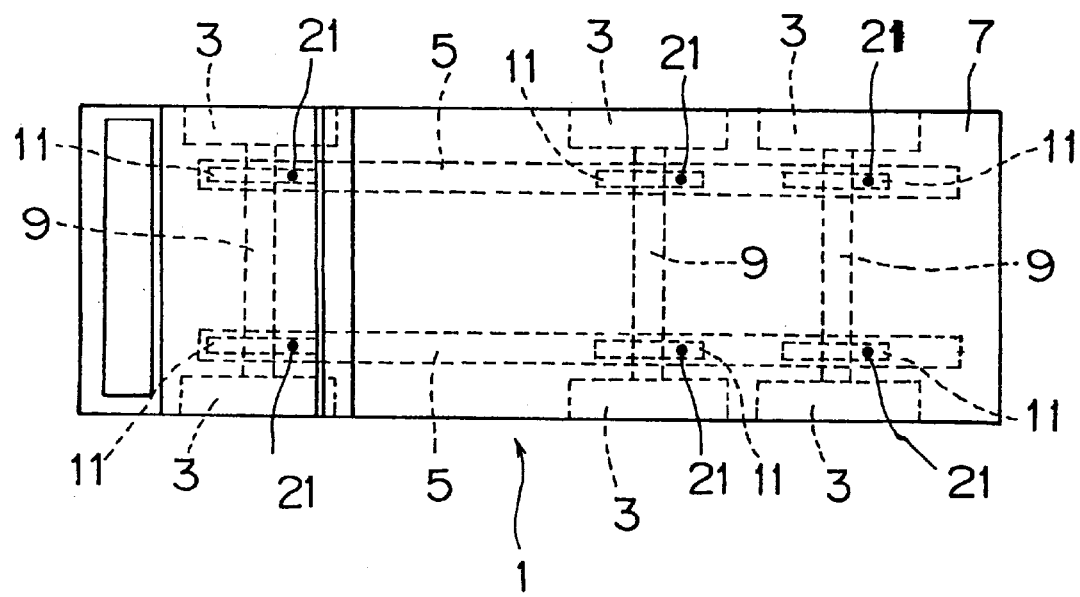
FIG. 2B is a plan view of positions where sensing elements are arranged in a load deflection computing apparatus according to the present invention, and a carrying weight computing apparatus according to the first and third aspects are arranged.
Figure 3:
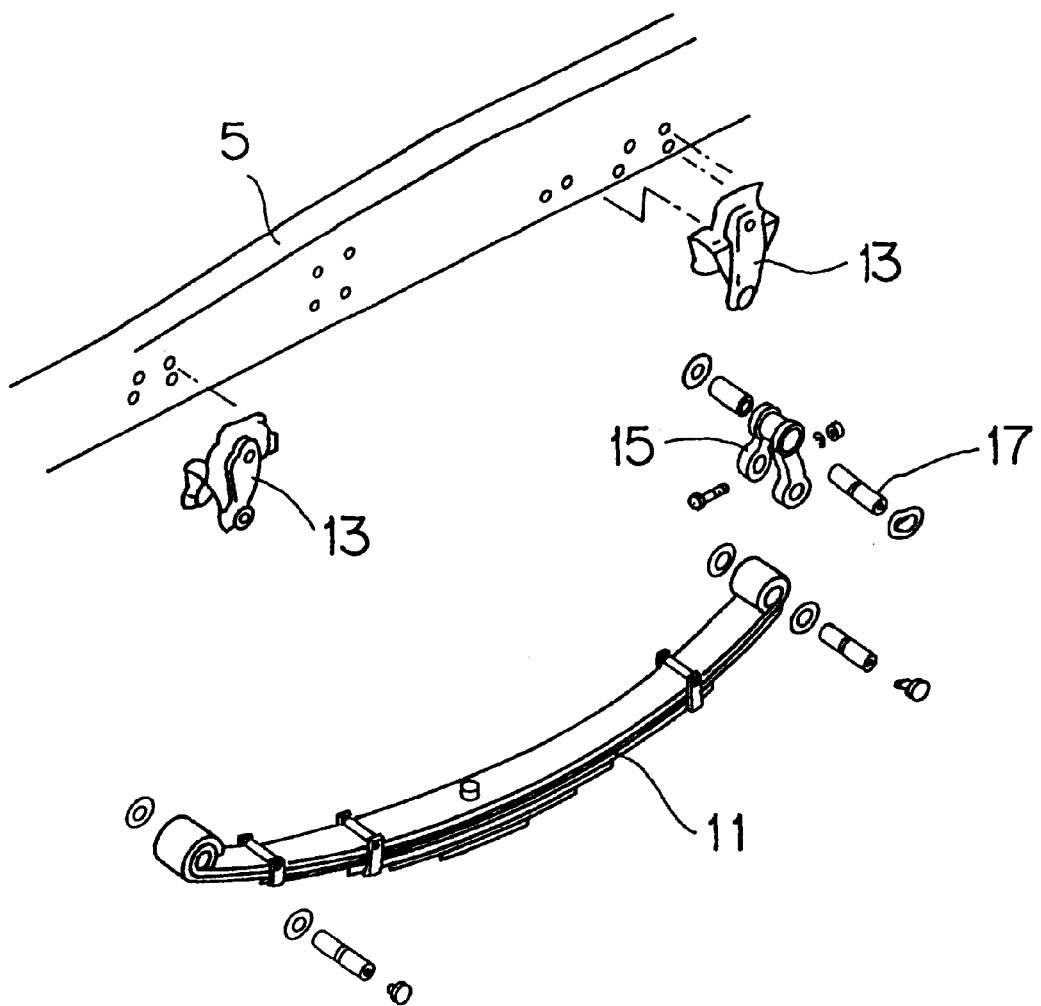
FIG. 3 is an exploded perspective view of a structure for supporting a leaf spring shown in FIG. 2 to a platform frame of a vehicle.
Figure 4:
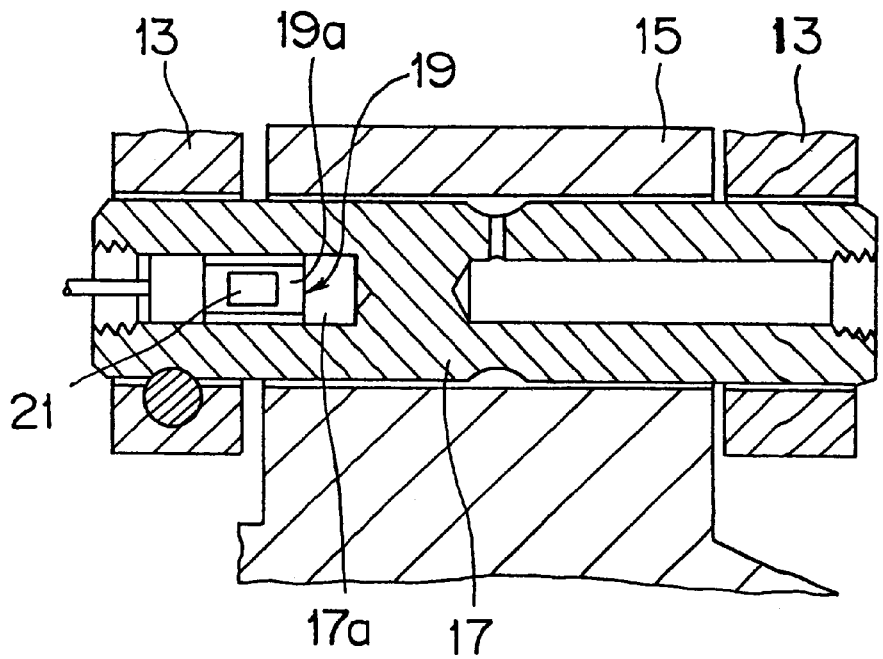
FIG. 4 is a sectional view showing a sensing element provided within a shackle pin shown in FIG. 3.
Figure 5:
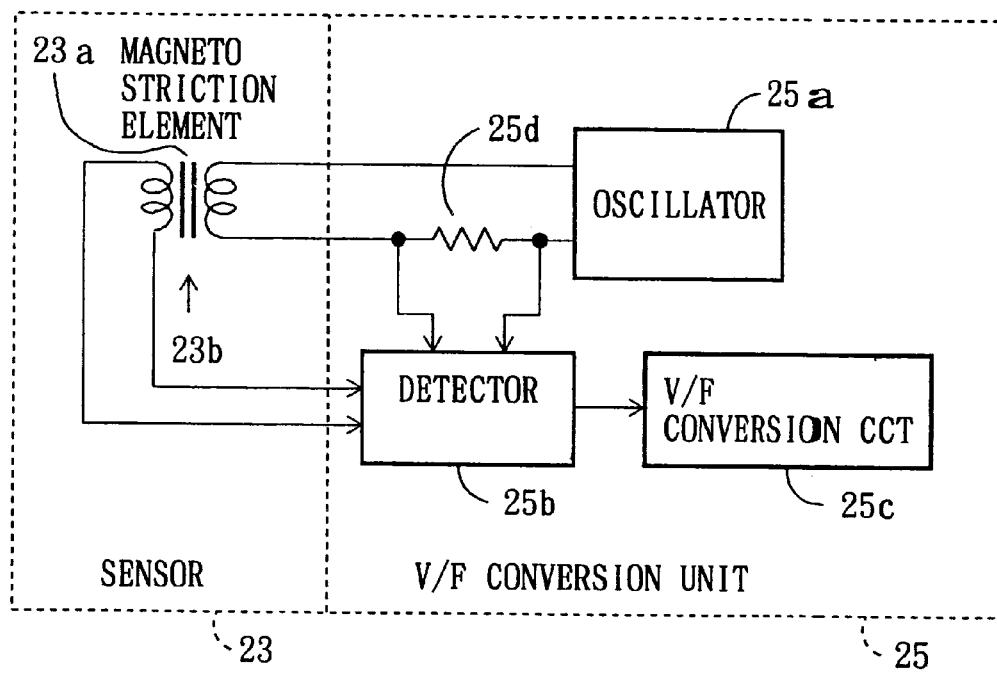
FIG. 5 is a circuit diagram showing the configuration of the sensing element shown in FIG. 4 partially in block form.

FIG. 2 is a view showing the positions of a vehicle where the sensing elements of the load deflection computing apparatus according to the one embodiment of the present invention; FIG. 2A is a side view of the vehicle, and FIG. 2B is a plan view thereof. FIG. 3 is an exploded perspective view of the structure for supporting the leaf spring in FIG. 2 on a platform frame of the vehicle. FIG. 4 is a sectional view of the sensing element provided in the shackle pin.

In FIGS. 2A and 2B, the vehicle 1 includes a wheel 3, a platform frame 5 and a platform 7.

A total of six wheels 3 are provided on both right and left ends at the front, intermediate and rear positions. The front two wheels and the intermediate and rear wheels are supported at both ends in the vehicle width direction of the axles 9 at the front, intermediate and rear positions.

The platform 7 is supported on the platform frame 5. The transverse positions of the platform 5 apart from each other at the front, intermediate and rear positions of the platform frame are supported by both left and right ends of the axles 9, in the vehicle width direction respectively.

As shown in FIG. 3, a leaf spring 11 has an arc shape which is convex toward the ground and is composed of belt-shaped spring sheets laminated. Both ends thereof in the vehicle length direction are supported by two brackets 13 which are attached at the positions apart from each other in the vehicle length direction of the platform frame 5. Particularly, the rear end of the vehicle 1 of the leaf spring 11 is swingably supported by the bracket 13 through a shackle 15 arranged between the bracket 13 and the leaf spring 11.

Reference numeral 17 denotes a shackle pin for coupling the bracket 13 with the shackle 15.

In the vehicle I having such a configuration, the load deflection computing apparatus is composed of the sensing element 21 and a carrying weight meter 31 (FIG. 6) connected thereto. The sensing element 31 (corresponding to the weight sensor) used to compute the load deflection applied to the vehicle is also used to compute the carrying weight of the vehicle 1. The sensing elements 21 are arranged within the shackle pins 17 for coupling the six brackets 13 and the shackles 15, respectively.

In this embodiment, each of the sensing elements 21 may be a magneto-strict gauge sensor which, as shown in FIG. 4, is attached to a web 19a of a holding member 19 housed in a hole 17a formed along an axial direction from the end of the shackle pin 17. Specifically, the sensing element 21 is fit in a receiving hole (not shown).

Each of the above six sensing elements includes a sensor 23 and a voltage/frequency converting unit (hereinafter referred to as "V/F converting unit").

The sensor 23 is composed of a magneto-strict element 23a and a transformer 23b having a magnetic path thereof.

The V/F converting unit 25 is composed of an oscillator 25a connected to the primary winding of the transformer 23b, a detector 25b connected to the secondary winding of the transformer 23b and a V/F converting circuit 25c connected to the detector 25b.

The sensing element 21, in response to the output signal from the oscillator 25a, passes a current through the primary winding of the transformer 23b and induces an AC current through the secondary winding of the transformer 23b. The detector 25b converts the AC current into a DC current. Further, the V/F converting circuit 25c converts the DC current into a pulse signal proportional to the value thereof, which is in turn produced externally.

A resistor 25d having high resistance is connected between the oscillator 25a and the primary winding fo the transformer 23b. Because of the presence of the resistor 25d, the value of the AC voltage induced in the primary winding of the transformer 23b will not vary even when the output signal form the oscillator 25a varies slightly.

The detector 25b converts the AC voltage into the DC voltage by multiplying the AC voltage by the voltage across the resistor 25b, thereby reducing the noise component included in the AC voltage.

In the sensing element 21, the permeability of the magneto-strict element 23a varies according to the load applied thereto. Thus, the AC voltage induced in the secondary winding of the transformer 23b varies so that the frequency of the pulse signal outputted from the V/F converting circuit 25c increases or decreases.

The deflection degree for the vehicle 1 is computed by a microcomputer mounted in a weight meter 31 according to the first embodiment of the present invention on the basis of the outputs from the six sensing elements 21 as a previous step of computing the load weight.

The front face 31a of the carrying weight meter 31 includes a deflection degree indicating area 40 (corresponding to the deflection degree indicating means) for indicating the deflection degree biased on the vehicle 1, a carrying weight indicating unit 37 for indicating the carrying weight on the vehicle computed on the basis of the deflection degree, an excessive load indicating lamp 41 for indicating that the load weight exceeds a prescribed carrying weight, a warning buzzer 43 for informing an excessive load state, an offset adjustment value setting key 45, ten-digit keypad 53, reset key 54, set key 55, etc.

The deflection degree indicating area 40 includes three deflection indicating lamps 40a to 40c (which correspond to the deflection orientation indicating section) for indicating the sate of deflection of load, i.e. the orientations of deflection (left deflection, uniform, and right deflection) in a vehicle width direction, and a deflection indicating section 40d for indicating the vehicle deflection value δ which is obtained by digitizing the magnitude of the deflection and its orientation in the vehicle width direction. The deflection indicating area 45d consists of a light emitting diodes of 7 segments.

Figure 7:
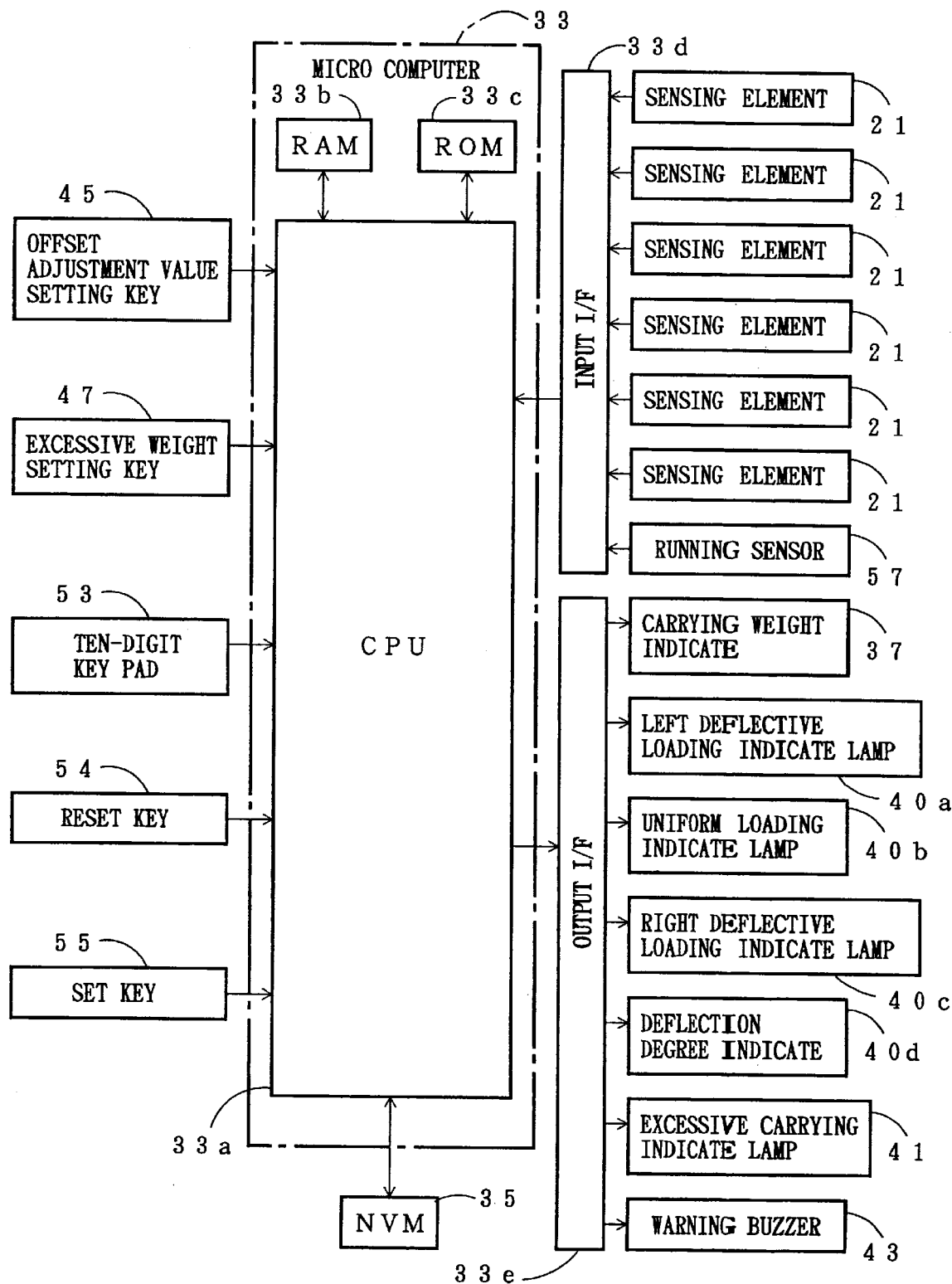
FIG. 7 is a block diagram showing the hardware configuration of a microcomputer shown in FIG. 6.

The microcomputer 33 includes, as seen from the block diagram of FIG. 7, includes a CPU (central processing unit)

33a, a RAM (random access memory)33b and an ROM (read-only-memory).

The CPU 33a is connected to a non-volatile memory (NVM) in which stored data do not disappear even when power supply is stopped (which corresponds to correction function holding means 35A and weighting coefficient holding means 35B); the offset adjustment value setting key 45; an excessive carrying weight setting key 47 which is used to compute a carrying weight and to decide excessive carrying; a ten-digit keypad 53; a reset key 54; and a set key 55. The CPU 33a is connected to each of the sensing elements 21 and a running sensor 57 for generating a running pulse in accordance with the running of the vehicle 1 through an input interface 33d.

Further, the CPU 33a is connected, through an output sensor 33e, the carrying weight indicating area 37, load indicating lamps 40a to 40c for indicating load of "left deflection", "uniform" and "right deflection", a deflection indicate section 40d, an excessive carrying indicating lamp 41, and a warning buzzer 43. The deflection indicating section 40d, excessive carrying indicating lamp 41 and warning buzzer 43 are used for outputting the decision result of excessive carrying based on the carrying weight.

The RAM 33b has a data area for storing several kinds of data and a work area used for several kinds of processing. The work area has areas for several kinds of registers and for several kinds of flags.

The ROM 33c has a control program for causing the CPU 33a to perform several kinds of processing.

The NVM 35 previously stores tables of offset adjustment values, characteristic correction values and error correction values for the output pulse signals from the sensing elements, weighting coefficients Q1 to Q3 inherent to the respective axles 9 used to compute the vehicle deflection δ (represented by %), a deflection decision value for determining which of the three deflection indicating lamps 40a to 40c is to be lit a weight conversion equation, etc.

The adjustment values on the offset adjustment value table serve to remove variations in the frequencies of the pulse signals produced from the six sensing elements 21 in a tare state of the vehicle 1. The adjustment values are set for each of the sensing elements by setting processing in the tare state of the vehicle 1.

The adjustment value for each sensing element 21 is a difference between the frequency of the output pulse signal from each sensing element 21 in the tare state of the vehicle 1 and the reference frequency of 200 Hz of the pulse signal in the state of carrying weight of zero, and actually ranges from +170 Hz to −500 HZ.

Therefore, because of the adjustment values, the sensing elements 21 will produce the output pulse signal at the frequency of 30 Hz to 700 Hz in the tare state.

The characteristic correction values on the characteristic correction value table serve to correct the non-linear characteristic inclusive of hysterisis of each sensing element 21 (the output from the sensing element 21 is higher when the load applied to each sensing element increases than when it decreases) into a linear characteristic. The characteristic correction value is set for each sensing element 21 before it is mounted in the shackle pin 17.

The error correction values on the error correction table serve to correct variations in the correlation characteristic between the load applied to each sensing element and the output pulse signal among the sensing elements 21. The error correction value is set for each sensing element 21 before it is set mounted in the shackle pin 17.

Specifically, the error correction value for each sensing element 21 is a correction coefficient which is to multiply the frequency of the pulse signal produced from each sensing element 21 in order to align the gradient indicative of the line of the correlation between the load applied to each sensing element 21 and the output pulse signal to that of the line indicative of the reference characteristic.

The sensing element 21, as described in connection with the characteristic correction value, has a non-linear characteristic including hysterysis and hence generates an output pulse signal whose characteristic equation varies according to the frequency band of the output pulse signal. Actually, the single error correction value is not set for each sensing element, but plural error correction values applied to the frequency region between the adjacent changing points are set for each sensing element.

The weighting coefficients Q1 to Q3 inherent to the respective axles 9 weighs the axle deflection values δ1 to δ3 described later (represented by %) indicative of the value and orientation of the deflection in the vehicle width direction of load applied to axles in accordance with the rate of the load dispersion over the axles 9 and empirically determined by the kind or structure of a vehicle 1 (The axle deflection values δ1 to δ3 are acquired by the frequencies of the output pulse signals from the sensing elements after offset adjustment, characteristic correction and error correction).

In this embodiment, the weighting coefficients are set for Q1=0.1 for the front axle 9, Q2=0.3 for the intermediate axle 9 and Q3=0.6 for the rear axle 9.

The deflection decision value (or range) is a reference value for deciding that the load deflects left when the above vehicle deflection value δ exceeds this value (range), it deflects right when the load does not reach this range, and it is biased uniformly right and left when it is within this range. In this embodiment, the deflection decision value is set for $-5 \leq \delta \leq -5$.

The above conversion equation is to correct a total of the frequencies of the output pulse signals from the respective sensing elements 21 by the corresponding correction data Z1 to Z6 on the gain correction table, subtracts 200 Hz, which is a reference frequency fo the pulse signal at the carrying weight=0 ton, from the gain-corrected total frequency, and multiplies the frequency thus obtained by the unit conversion weight of 0.01 ton per 1 Hz.

Thus, where the gain-corrected total frequency acquired from the frequencies of the output pulse signals from the six sensing elements 21 is 700 Hz, the carrying load of 5 ton is computed by the above conversion equation. Where it is 1200 Hz, the carrying weight of 10 ton is computed.

The number to the third decimal place of the computed carrying weight is rounded off.

Now referring to the flowcharts of FIGS. 8 and 9, an explanation will be given of the processing performed by the CPU 33a in accordance with the control program stored in the ROM 33c.

A power source for a carrying load meter 31 is energized by first turning on an accessory (ACC) switch (not shown) of the vehicle. Then, the microcomputer 33 is actuated to start the program. First, the CPU 33a makes initial settings in accordance with the main routine shown in the flowchart of FIG. 8 (step S1).

The details of the initial settings are not described here. These initial settings include zero resetting of the values stored in various register areas of the RAM 33b and zero setting of the various flag areas.

It is decided whether or not there is a mode setting requirement by the operation of the offset adjustment value setting key 45 or excessive carrying weight value setting key 47 (step S3). If "NOT", the processing proceeds to step S7. If "YES", the processing proceeds to the setting processing in step S5.

Figure 9:
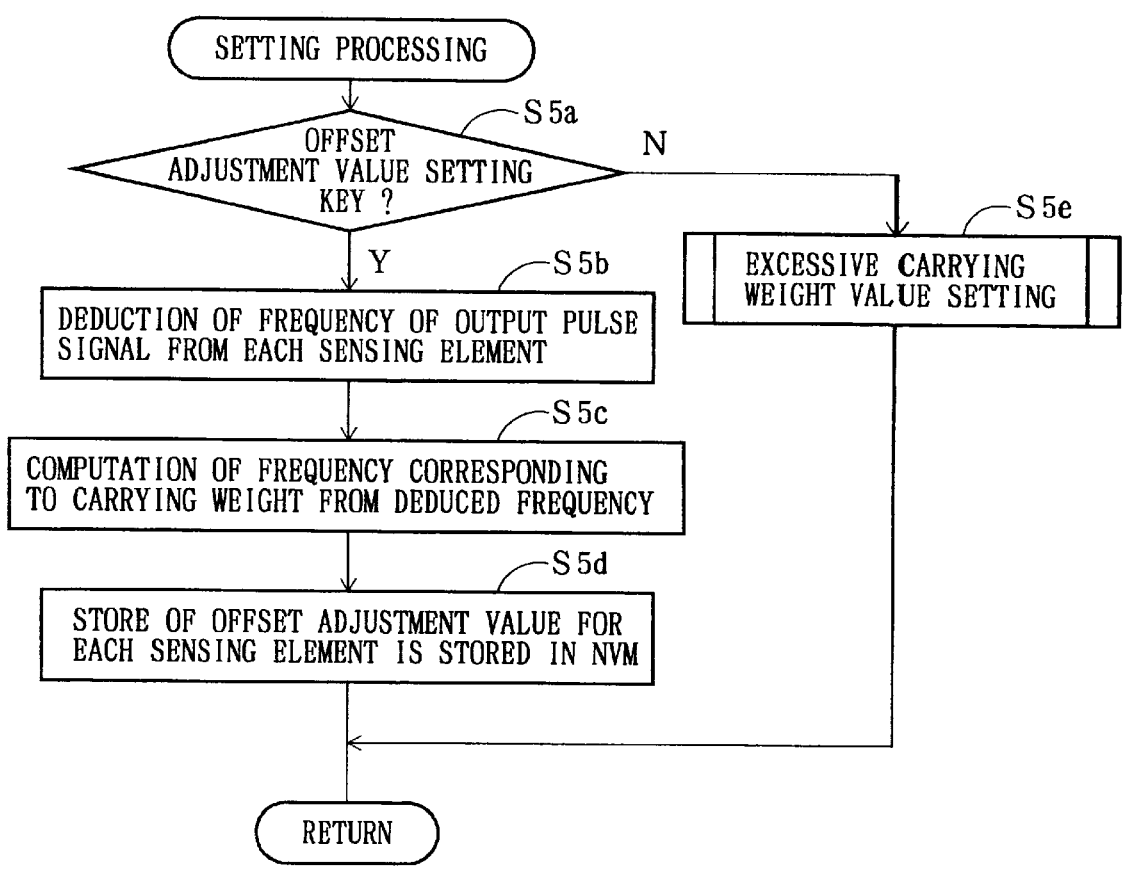
FIG. 9 is a flowchart showing the subroutine of setting processing shown in FIG. 8.

The details of the setting processing is shown in the flowchart of FIG. 9. In step S5a, it is decided whether the confirmation of requirement in step S3 has come from the operation of the offset adjustment value setting key 45. If "YES", with the vehicle 1 being in a tare state, the frequency of the pulse signal inputted from each sensing element 21 through the input interface 33d is identified (step S5b).

The reference frequency of 200 Hz at the time of the carrying weight of zero ton is subtracted from the frequency of the output pulse signal from each sensing element 21 identified by step S5b to acquire the frequencies corresponding to the carrying weight. This operation is performed in an operation area of the RAM 33b (step S5c). The acquired six frequencies are stored, with their polarities (+, −) inverted, in the NVM 35 as offset adjustment values for the sensing elements 21 (step S5d). Thereafter, the processing is returned to step S3 of the main routine.

On the other hand, if step S5a is "NO" (the confirmation of requirement has not come from the offset adjustment key 45), processing of setting an excessive carrying weight is performed (step S5e).

In this processing, the details of which are not explained, the value inputted by the ten-digit key pad 53 is canceled by the reset key 54 and fixed by the set key 55. The input value is written as a reference weight for the excessive carrying in the NVM 35.

Upon completion of setting the excessive carrying weight, the setting processing is returned to step S3 of the main routine.

If step S3 is "NO" (there is no requirement of mode setting), the routine proceeds to step S7. In step S7, it is decided whether or not the running pulse has been inputted from the running sensor 57. If step S7 is "YES", the routine is returned to step S3. If step S7 is "NO", the routine proceeds to step S9 in which the frequency of the pulse signal inputted from each sensing element 21 is identified (step S9).

In step S1, it is decided whether all the identified frequencies of the output pulse signals from the sensing elements 21 are within an offset adjustable range from 30 Hz to 700 Hz.

If step S11 is "NO" (at least one of the identified frequencies is deviated from the range), an error indication is made by e.g. an alphabet character of "E. Lo" on the deflection indicating area 40d (step S13).

In step S15, the frequency of the pulse signal inputted from each sensing element 21 is offset-adjusted on the operation area in terms of the offset adjustment value in the NVM 35. The pulse signal frequency thus obtained is further characteristic-corrected in terms of the characteristic correction value in the NVM 35 (step S17). The pulse signal frequency thus obtained is further error-corrected on the operation area in terms of the error correction value in the NVM 35 (step S19).

The output Mi from each sensing element 21 after the characteristic correction is defined by different equations according to whether the output Wi before the characteristic correction is Wi>0 or Wi≦0.

Specifically, if the output Wi before the characteristic-correction is Wi>0, the output Mi after the characteristic-correction is Mi=Wi, whereas if Wi≦0, Mi=0.

Incidentally, i represents the position number of the sensing element 21. The left sensing element 21 of the front axle 9 is i=1; the right sensing element 21 thereof is i=2; the left sensing element 21 of the intermediate axle 9 is i=3; the right sensing element 21 thereof is i=4; the left sensing element 21 thereof is i=5; and the right sensing element 21 thereof is i=6.

Upon completion of the error correction in step S19, the axle deflection values δ1 to δ3 are computed for the respective axles on the basis of the outputs M1 to M6 of the sensing elements 21 after the error correction and the weighting coefficients Q1 to Q3 inherent to the respective axles stored in the NVM 35 (step S21).

First, the axle deflection value δ1 can be computed by the equation δ1=(M1−M2)÷(M1+M2) using the outputs M1 and M2 from the two sensing elements 21 arranged left and right of the front axle 9.

Likewise, the axle deflection value δ2 of the intermediate axle 9 is computed by the equation δ2=(M3−M4)÷(M3+M4) using the outputs M3 and M4 from the two sensing elements 21 arranged left and right of the intermediate axle 9.

Further, likewise, the axle deflection value δ3 of the intermediate axle 9 is computed by the equation δ3=(M5−M6)÷(M5+M6) using the outputs M3 and M4 from the two sensing elements 21 arranged left and right of the rear axle 9.

If the denominators of the respective equations, i.e. (M1+M2), (M3+M4) and (M5+M6) are zero, respectively, the corresponding axle deflection values δ1 to δ3=0.

In step S23, the axle deflection values δ1 to δ3 for the respective axles 9 computed in step S21 are multiplied by the weighting coefficients Q1 to Q3 inherent to the respective axles 9, respectively, and the weighted axle deflection values δ1×Q1, δ2×Q2 and δ3×Q3 are totaled to provide the above vehicle deflection value δ (step S23).

It is decided whether or not the vehicle deflection value δ is within the range of −5≦δ≦5 (step S25). If step S25 is "YES", the routine proceeds to step S27. In step S27, the uniform load indicating lamp 40b is put on, and the other indicating lamps 40a and 40c are put off. In this case, the routine proceeds to step S35 described later.

If step S25 is "NO" (the vehicle deflection value δ is within the range of −5≦δ≦5), the routine proceeds to step S29. In step S29, it is decided whether or not the vehicle deflection value is plus. If step S29 is "YES", the left deflection load indicating lamp 40a is put on and the other indicating lamps 40b and 40c are put off (step S31). The routine proceeds to step S35. If step S29 is "NO", the right deflection load indicating lamp 40c is put on and the other indicating lamps 40a and 40b are put off (step S33). The routine proceeds to step S35.

In step S35, the indication on the-deflection value indicating area 40d is updated to the vehicle deflection value δ computed in step S23. The routine is returned to step S3.

Figure 8:
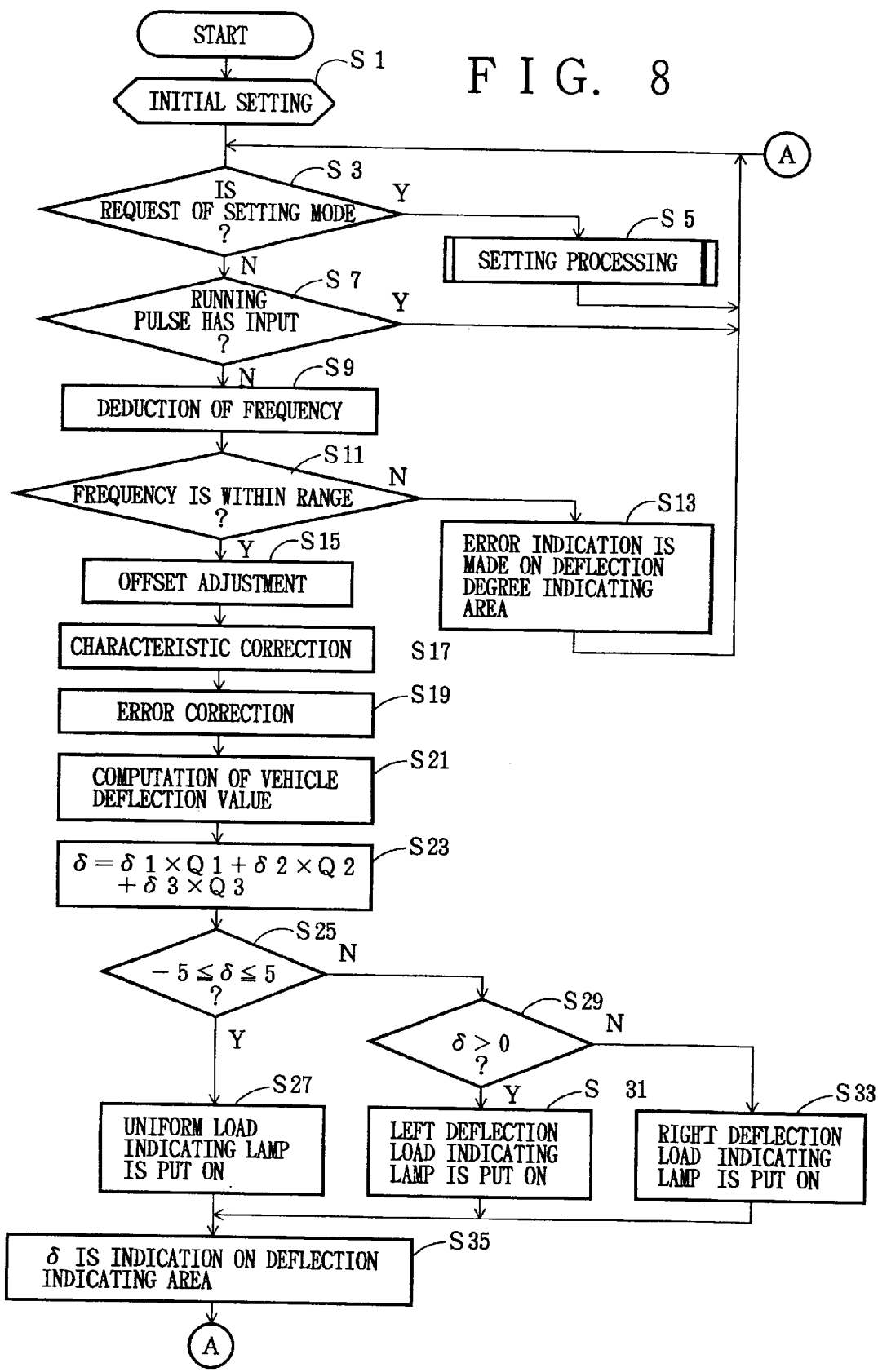
FIG. 8 is a flowchart showing the processing carried out by CPU in accordance with the control program stored in ROM of the microcomputer shown in FIG. 6.

As apparent from the above explanation, in this embodiment, the output characteristic correcting means 33A in claims of this application is constructed by step S17 in the flowchart of FIG. 8, and the axle deflection value computing means 33B is constructed by step S21 in the flowchart of FIG. 8.

An explanation will be given of the operation of computing the vehicle deflection value δ by the carrying weight meter 31 according to this embodiment thus configured.

When the offset adjustment value setting key 45 is operated, inputting of the offset adjustment value is on standby. A numerical value is inputted by operating the ten-digit key pad 53 and the setting key 55. This value is adopted as an offset adjustment value which is stored in the NVM35.

In a state where the offset adjustment value key 45 is not operated, and the running pulse from the running sensor 57 is not inputted, the frequency of each of the pulse signals from the sensing elements 21 on both ends of each axle 9, which corresponds to the load applied thereto, is corrected by the corresponding offset adjustment value stored in the NVM 35. Thus, variations in the output frequencies among the sensing elements in a tare state can be eliminated.

The frequency of the output pulse signal thus obtained is corrected in terms of the corresponding characteristic correction value stored in the NVM 35. Thus, the output from each sensing element 21 has a linear characteristic converted from a non-linear characteristic. As a result, the frequency of the output pulse signal from the sensing element 21 will not have a value corresponding to an unrealistic negative load under the influence of hysterisis that it becomes higher when the load increases than the load decreases.

The output pulse signal from each sensing element 21 thus obtained is further corrected in terms of the corresponding error correction value. Thus, variations in the characteristics on the correlation between the load and output pulse signal are eliminated.

Thereafter, the axle deflection values $\delta 1$ to $\delta 3$ are computed on the basis of output signals for each axle 9. Also using the weighting coefficients Q1 to Q3 inherent to the respective axles 9, the vehicle deflection value $\delta$ which is a deflection of lead about the entire vehicle 1.

The vehicle deflection value computed is numerically indicated on the deflection value indicating area 40$d$. The corresponding one of the left, uniform and right deflection load indicating lamps 40$a$ to 40$c$ is lit according as the vehicle deflection value $\delta$ is in any of the ranges $5<\delta$, $-5 \leq \delta \leq 5$ and $\delta<-5$.

Thereafter, for example, the frequencies of the output pulse signals from the respective sensing elements 21 are totaled. In order to correct the error between at the times of deflective loading and uniform loading, the total frequency is corrected in terms of a gain correction value corresponding to the vehicle deflection value $\delta$. The reference frequency of 200 Hz of the pulse signal at the carrying weight=0 ton is subtracted from the corrected total frequency. The frequency corresponding to the carrying weight thus obtained is multiplied by 0. 01 ton which is a unit conversion weight for 1 Hz to compute the carrying weight on a vehicle. The computed value is indicated on the carrying weight indicating area 3.

If the computed carrying weight is beyond a prescribed carrying weight, the excessive carrying indicating light 41 is lit or the warning buzzer 43 is caused to sound, thus informing a driver of an excessive carrying state.

In this way, in the load deflection computing apparatus according to this embodiment, on the basis of the outputs from the sensing elements 21 arranged on both ends of the front, intermediate and rear axles 9, the axle deflection values $\delta 1$ to $\delta 3$ which represent the deflections of the loads on the respective axles in the vehicle width direction. These axle deflection values $\delta 1$ to $\delta 3$ are weighted by the weighting coefficients Q1 to Q3 inherent to the respective axles 9. In this way, in computing the vehicle deflection value $\delta$ which is a deflection of load on the entire vehicle 1, the output characteristic of each sensing element 21 is corrected from a non-linear characteristic to a linear characteristic using the characteristic correction value. As a result, the frequency of the output pulse signal from the sensing element 21 will not have a value corresponding to an unrealistic negative load under the influence of hysterisis that it becomes higher when the load increases than the load decreases. Thus, the accuracy of the axle deflection values $\delta 1$ to $\delta 3$ and the vehicle deflection $\delta$, which have been computed on the basis of the outputs from the sensing elements 21 can be improved remarkably.

Figure 10:
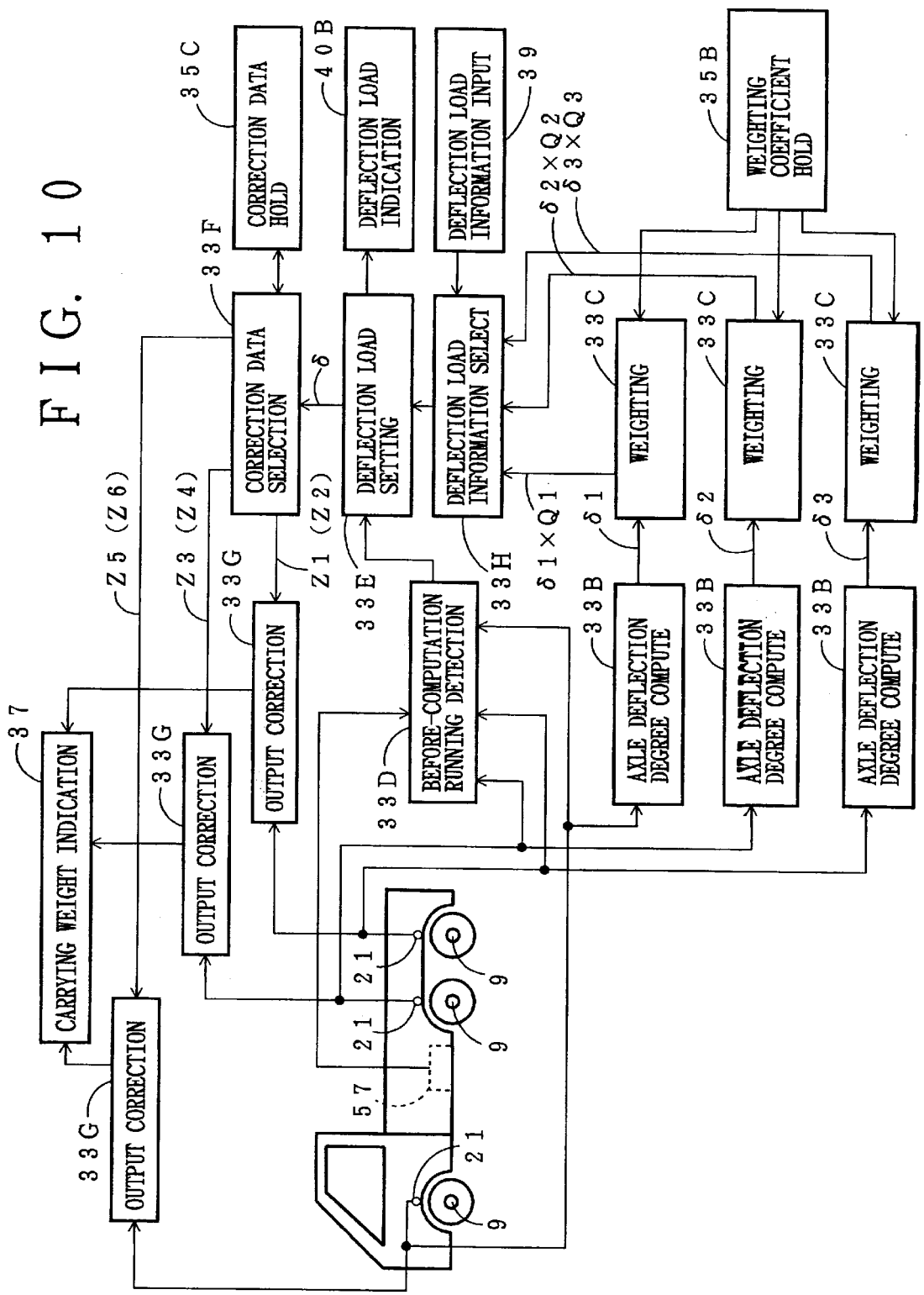
FIG. 10 is a basic arrangement view of a first aspect of a carrying weight computing apparatus according to the present invention.

Schematic Structure of a Carrying Weight Computing Device according to the First Aspect of the Invention Now referring to the basic structural view shown in FIG. 10, an explanation will be given of the schematic arrangement of the carrying weight computing device according to the first aspect of the invention.

The carrying weight computing device computes the carrying weight of the vehicle 1 on the basis of the outputs from the plural weight sensors 21 arranged at intervals in at least the width direction of the vehicle 1. The carrying weight computing device according to the first aspect of the present invention includes a running detecting means 33D, a deflective load setting means 33E, a corrected value data holding means 35C, a corrected value selecting means 33F and an output correcting means 33G. The running detecting means 33D serves to detect the presence or absence of the running of the vehicle 1 on the basis of the output from the running sensor 57 for detecting the running of the vehicle 1 and the carrying weight computed previously. The deflective load setting means 33E serves to set the orientation of the deflection in the vehicle width direction of the load biased to the vehicle. The corrected value data holding means 35C serves to hold plural corrected values Z1 to Z6 for gain correction. The corrected value data selecting means 33F serves to select the corresponding corrected value data Z1 to Z6 from the corrected value data holding means 35C on the basis of the detection result by the running detection means 33D and the orientation of deflection in the vehicle width direction set by the deflective load setting means 33E. The output correcting means 33G serves to correct the outputs from the plural weight sensors in terms of the corrected value data Z1 to Z5 selected by the corrected value data selecting means 33F. In this way, the carrying weight computing device computes the carrying weight on the basis of the outputs from said plural weight sensors 21 which have been corrected by the output correcting means 33G.

In the carrying weight computing device according to the first aspect of the present invention, the corrected value data Z1 to Z6 corresponding to the above presence or absence and the orientation of deflection are selected from the correction value data holding means 35C. The carrying weight is computed on the basis of the above corrected outputs in terms of the selected correction value data. For this reason, even if the outputs from the respective weight sensors are changed owing to the deflection of load biased to the vehicle 1, particularly in the vehicle width direction, which varies because of the profile of vehicle 1 and the carrying balance of baggage during computation of the carrying weight, and owing to the vibration involved with the running of the vehicle 1, the output from each weight sensor 21 is corrected to the normal value corresponding to the actual load. Thus, the correct carrying weight can be computed on the basis of the output from each weight sensor 21 with improved accuracy.

In the carrying weight computing device according to the first aspect of the present invention, the above weight sensors 21 are arranged on both ends in the vehicle width direction of each axle 9. This carrying weight computing device further comprises an axle deflection computing means 33B, a weighting coefficient holding means 35B, and a weighting means 33C. The axle deflection computing means 33B serves to compute the axle deflections $\delta 1$ to $\delta 3$ each representative of the orientation and degree of the deflection in the vehicle width direction of the load biased on each axle 9. The weighting coefficients holding means 35B serves to hold the weighting coefficients Q1 to Q3 each inherent to each axle 9 corresponding to the arrangement of each axle 9. The weighting means 33C weighs the above axle deflections δ1 to δ3 by the weighting coefficients Q1 to Q3, respectively.

The deflection load setting means 33E sets the orientation of deflection for that in the vehicle width direction deduced from the axle deflection value δ.

In the carrying weight computing device according to the first aspect of the present invention having such a configuration, when the output from each of the weight sensors 21 is corrected in terms of correction data Z1 to Z6 corresponding to the deflection orientations in the vehicle width direction, the axle deflection values δ1 to δ3 for the respective axles 9 are computed by the axle deflection value computing means 33B so that the orientation and value of the load for each axle 9 can be acquired accurately.

Since the vehicle deflection value δ applied to the vehicle is computed on the basis of the deflection values δ1 to δ3 for the respective axles 9 after having been weighted, it can be acquired accurately taking into consideration the dispersion of load applied to each axle 9 in the vehicle length direction.

Therefore, the influence from the deflection of the load applied to the vehicle 1, particularly in a vehicle width direction, which varies according to the profile of the vehicle 1 and the carrying balance of baggage, can be surely canceled using the correction data Z1 to Z6 so that the carrying load can be acquired accurately and surely.

The carrying weight computing device according to the present invention further comprises a deflective load information inputting means 39 and a deflective load information selecting means 33H. The deflective load information inputting means 39 serves to input the orientation of deflection in the vehicle width direction of the load applied to the vehicle. The deflective load information selecting means 33H serves to select either one of the above orientation deduced from the vehicle deflection value δ and that inputted to the deflective load information inputting means 39. The deflective load setting means 33E sets the orientation of the deflection for that selected by the deflective load information selecting means 33H.

For this reason, when the deflection degree of the load can be visually decided from the carrying load, the carrying weight, which is taken in consideration the dispersion of the loads applied to axles 9 in the vehicle length direction, can be computed accurately by a simple operation. In addition, a manual operation function for resetting of the device or instructing the record of the computed carrying weight.

The carrying weight computing device according to the first aspect of the present invention further includes a deflective load indicating means 40B for indicating the orientation of deflection in the vehicle width direction of the load applied to the vehicle 1 set by the deflective load setting means 33E. For this reason, it is possible to make easily visible and recognizable in which direction of the vehicle width the carrying load deflects wholly on the basis of the deflection of load indicated in the deflective load indicating means 40B.

The carrying weight computing apparatus according to the first aspect of the present invention further includes carrying weight indicating means 37 for indicating the carrying weight computed on the basis of the outputs from the plurality of weight sensors 21 after corrected by the output correcting means 33G. Therefore, it is possible to not only record the computed carrying weight as information, but inform a driver of a present accurate carrying weight and use it as a reference in adjusting the carrying weight.

Concrete structure of the first aspect of the carrying weight computing device according to the present invention.

Now referring to FIGS. 11 to 18, a detailed explanation will be given of the concrete structure of the first aspect of the carrying weight computing device according to the present invention.

Figure 11:
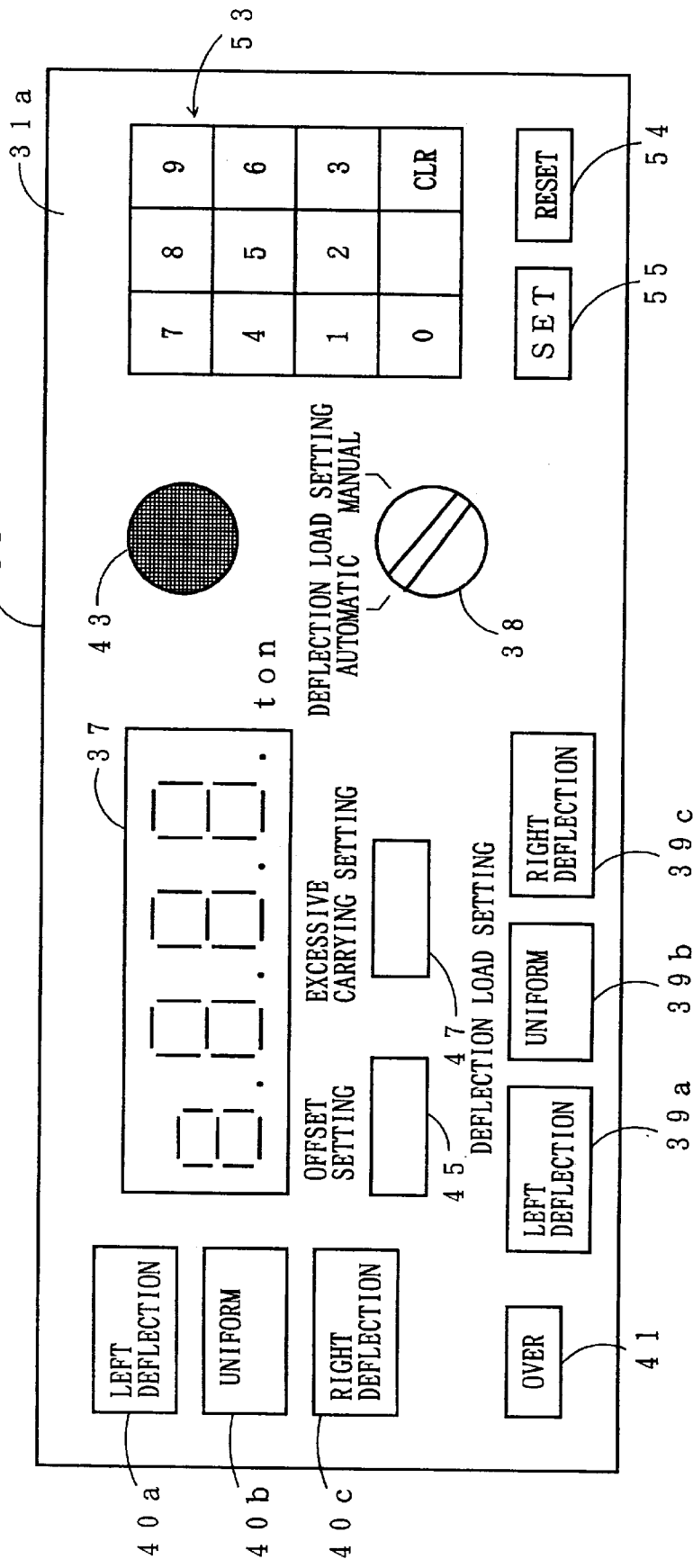
FIG. 11 is a front view of a second embodiment of the carrying weight meter which constitutes the first aspect of a carrying weight computing apparatus according to the present invention.

The carrying weight computing device according to the first aspect of the present invention has the second embodiment of a carrying weight meter 31 as shown in FIG. 11. This carrying weight meter 31 in FIG. 11 is partially different from that in FIG. 6 in their appearance. The structure of the microcomputer 33 is partially different from that in the first embodiment of the carrying weight meter 31.

The second embodiment of the carrying weight meter 31 is different from the first embodiment thereof in appearance in that it does not have the area 40d for indicating the vehicle deflection degree δ, but instead of this, includes, on its front surface 31a, a switch 38 for switching the deflection state of load between an automatic setting mode and a manual setting mode, and three load input keys 39a to 39c (corresponding to the deflective load information inputting means 39) of "left deflection", "uniform" and "right deflection" for inputting the deflection state of load in the manual setting mode.

The remaining appearance of the carrying weight meter 31 is the same as that of the first embodiment thereof.

In the second embodiment, the respective load indicating lamps 40a to 40c of "left deflection", "uniform" and "right deflection" correspond to the deflective load indicating means 40B in claims.

Figure 12:
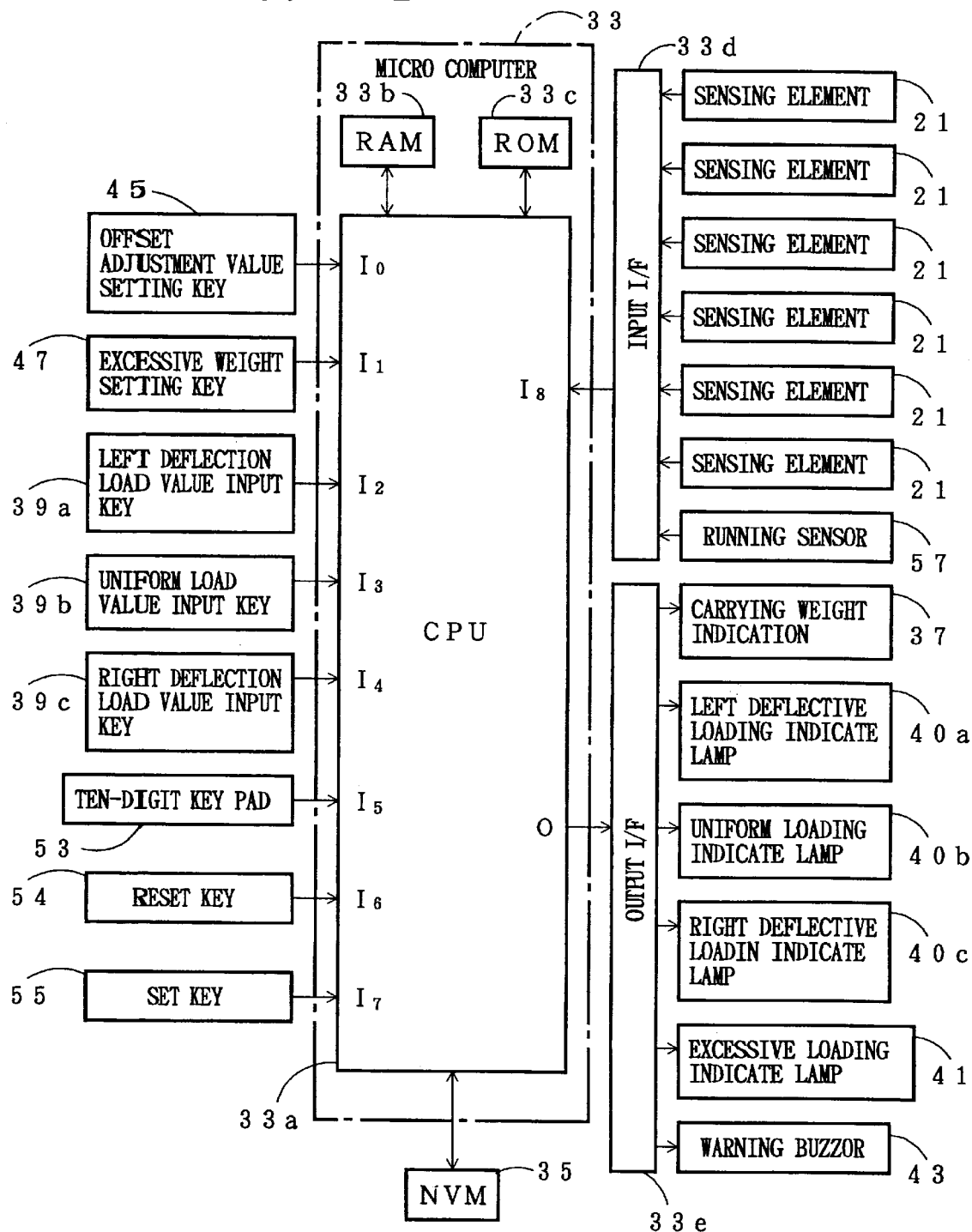
FIG. 12 is a block diagram showing the hardware configuration of the microcomputer shown in FIG. 11.

As seen from the block diagram of FIG. 12, the configuration of the microcomputer 33 provided in the second embodiment of the carrying weight meter 31 is different from that in the first embodiment thereof in that CPU 33a is directly connected to the setting mode changing switch 38 and the load input switches 39a to 39c as well as the NVM 35 (which correspond to the weighting coefficient holding means 35B and correction value data holding means 35C), offset adjustment value setting key 45, excessive carrying weight setting key 47, ten-digit key pad 53, reset key 54 and set key 55.

Figure 13:
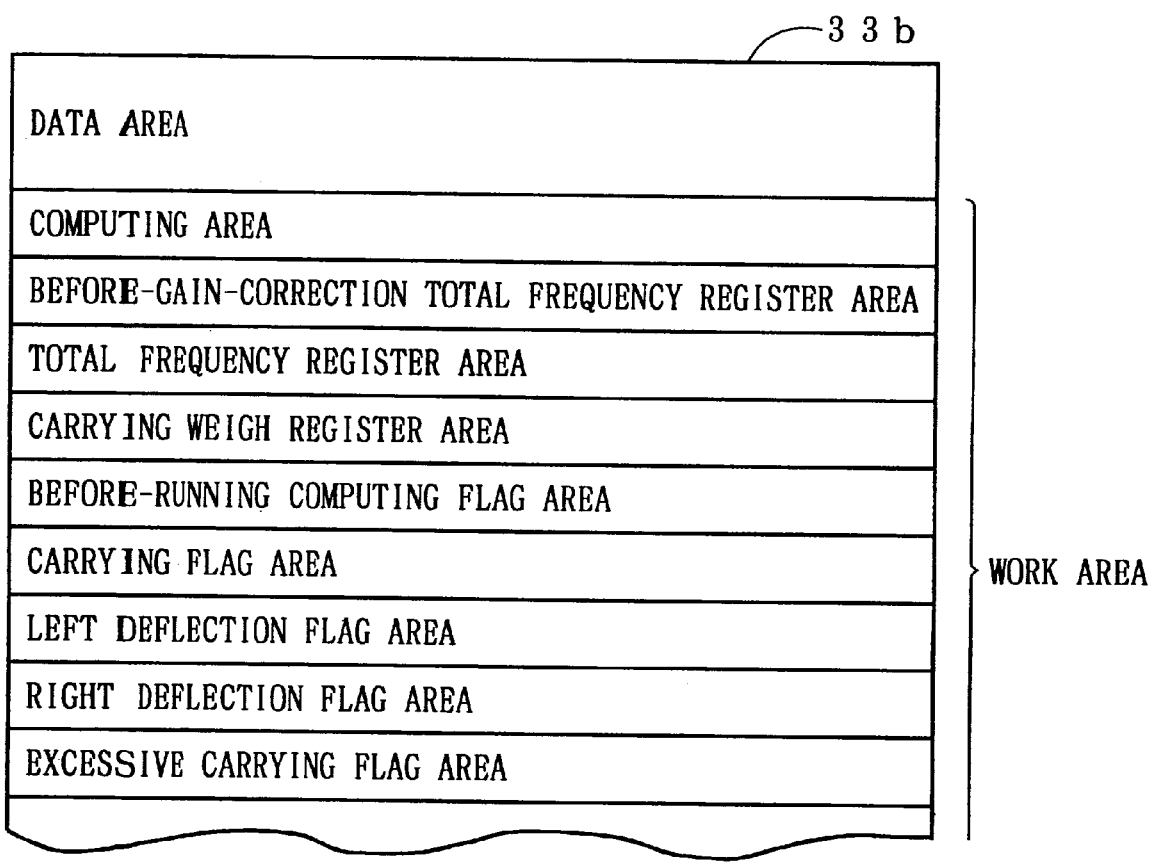
FIG. 13 is a memory area map of an RAM of the microcomputer shown in FIG. 12.
Figure 14:
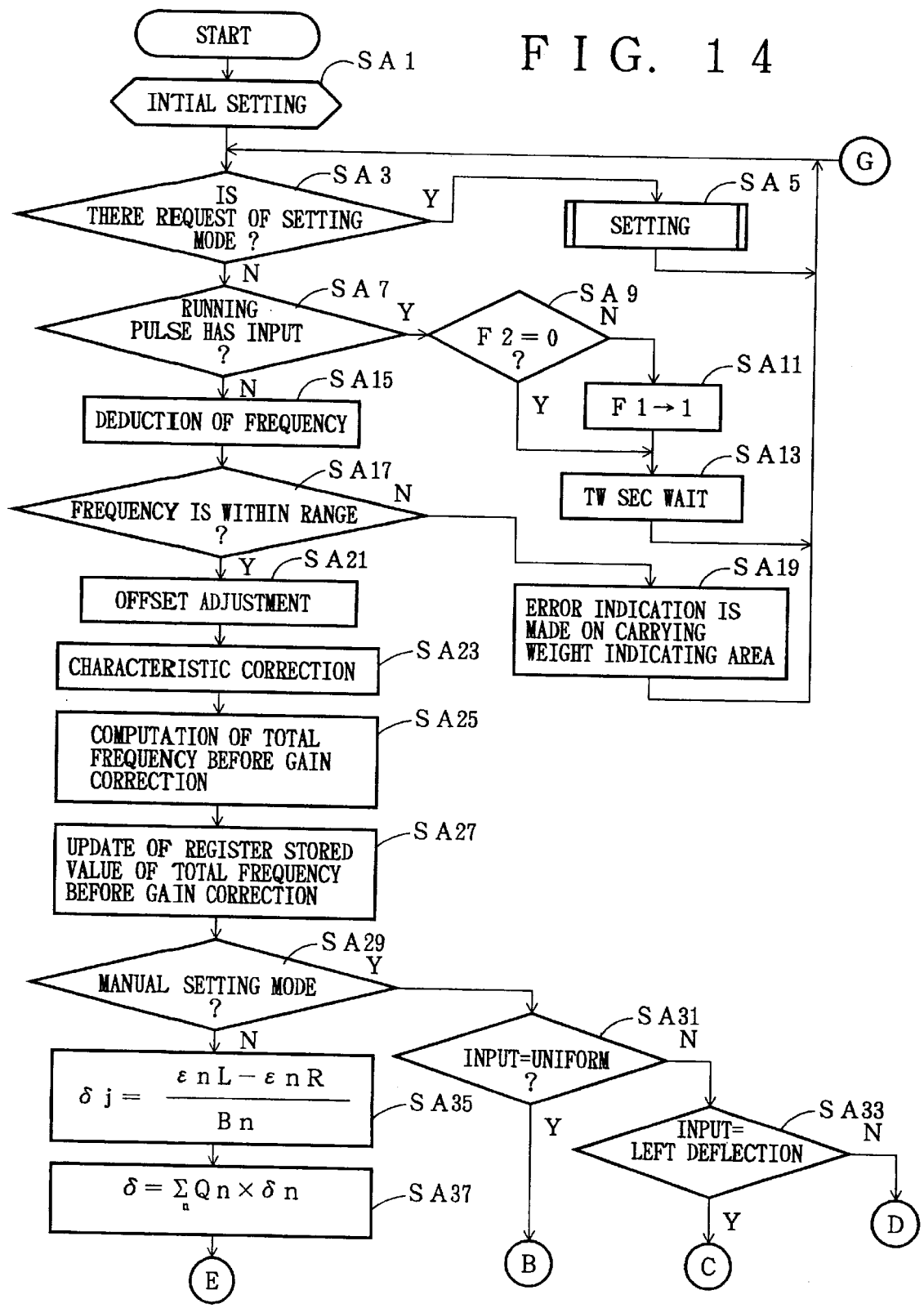
FIGS. 14 to 16 are flowcharts showing the processing carried out by CPU in accordance with the control program stored in an ROM of the microcomputer shown in FIG. 12.

Further, the microcomputer 33 in the second embodiment of the carrying weight meter 31 is different from that in the first embodiment thereof in that the work area of the RAM 33b, as seen from FIG. 13, includes areas for processing, a total frequency register before gain correction, a total frequency register after gain correction, and a carrying weight register and flag areas of computing before running, carrying, left deflection, right deflection and excessive carrying; and the ROM 33c stores a control program for causing the CPU 33a to perform several kinds of processing, which is different from that stored in the ROM in the first embodiment of the carrying weight meter 31.

Further, in the second embodiment of the carrying weight meter 31, NVM 35 previously stores respective tables of the offset adjustment value and characteristic correction value for the output pulse signal from each sensing element 21, weighting coefficients Q1 to Q3 inherent to the respective axles 9, a gain correction value table for the total value of the frequencies of the output pulse signals from the sensing elements 21, a weight conversion equation, an excessive loading weight and a deflection decision value.

Among them, the adjustment values on the offset adjustment table, the characteristic correction values on the characteristic correction value table, weighting coefficients Q1 to Q3 inherent to the axles 9 and weight conversion equation are the same as those in the first embodiment of the carrying weight meter 31.

In this embodiment, unlike the first embodiment, the numerical values of the weighting coefficients Q1 to Q3 inherent to the respective axles 9 are set at Q1=0.1 for the front axle 9, Q2=0.3 for the intermediate axle 9 and Q3=0.6 for rear axle 9.

Of the other data stored in NVM 35 in the second embodiment, the gain correction value table located on the gain correction value table area therefor serves to correct the output from each of the sensing elements 21 for its gain adjustment in accordance with an error between the total of the frequencies of the pulse signals actually produced from the six sensing elements and that of the frequencies of the pulse signals to be essentially produced therefrom according to the loads applied to the six sensing elements 21.

The gain correction value table stores first to sixth correction value data Z1 to Z6 which are selected as required in combination of the deflection of the load applied to the vehicle 1 in the vehicle width direction, i.e. any one of "left deflection", "uniform" and "right deflection" and decision ("after running" or "before running") on whether the vehicle 1 has run after the previous computing of the carrying weight.

The first, third and fifth correction values Z1, Z3 and Z5 can be acquired as follows. Before the vehicle 1 is caused to run, weights with known weight values (not shown) are successively placed at the position where the load is uniformly applied to each sensing element 21 on the platform 7 and those where the load is applied to each sensing element 21 in left deflection and right deflection. The total of the frequencies of the output pulse signals produced from the sensing elements 21 is acquired in each of the placing states. These totals are divided by the total of the frequencies of the pulse signals to be essentially produced from the sensing elements 21 so that the correction values Z1, Z3 and Z5 are obtained.

The second, fourth and sixth correction values Z2, Z4 and Z6 can be acquired as follows. Before the vehicle 1 is caused to run, weights with known weight values (not shown) are successively placed at the position where the load is uniformly applied to each sensing element 21 on the platform 7 and those where the load is applied to each sensing element 21 in left deflection and right deflection. With this state, the vehicle is caused to run and stopped. The total of the frequencies of the output pulse signals produced from the sensing elements 21 is acquired in each of the placing states. These totals are divided by the total of the frequencies of the pulse signals to be essentially produced from the sensing elements 21 so that the correction values Z2, Z4 and Z6 are obtained.

The weight of the excessive carrying represents the value for deciding "excessive carrying" when carrying weight is beyond it. In this embodiment, it can be set in steps of 0.1 ton in the range from 3.0 ton to 17.9 ton.

Now referring to the flowcharts shown in FIGS. 14 to 17, an explanation will be given of the processing performed by the CPU 33 in accordance with the control program stored in the ROM 33c.

When power for the load measuring device 31 is turned on by initial turn-on of an accessory ACC switch (not shown) of the vehicle, the microcomputer 33 is actuated to start the program. Then, CPU 33a performs initial setting in accordance with the main routine shown in FIG. 14 (step SA1).

At the initial setting, the storage value of each area of the total frequency register and carrying weight register of the RAM 33b is zero-reset, and the flags F1 to F5 of "computation before running", "carrying", "left deflection", "right deflection" and "excessive carrying" are set for zero (step SA1).

In step SA3, decision is made whether or not there is a requirement of mode setting by operation of the offset adjustment value setting key 45 and the excessive carrying weight value setting key 47. If step SA3 is "No", the programming routine proceeds to step SA7 described later. If step SA3 is "Yes", it proceeds to step SA5 for the setting processing.

Figure 17:
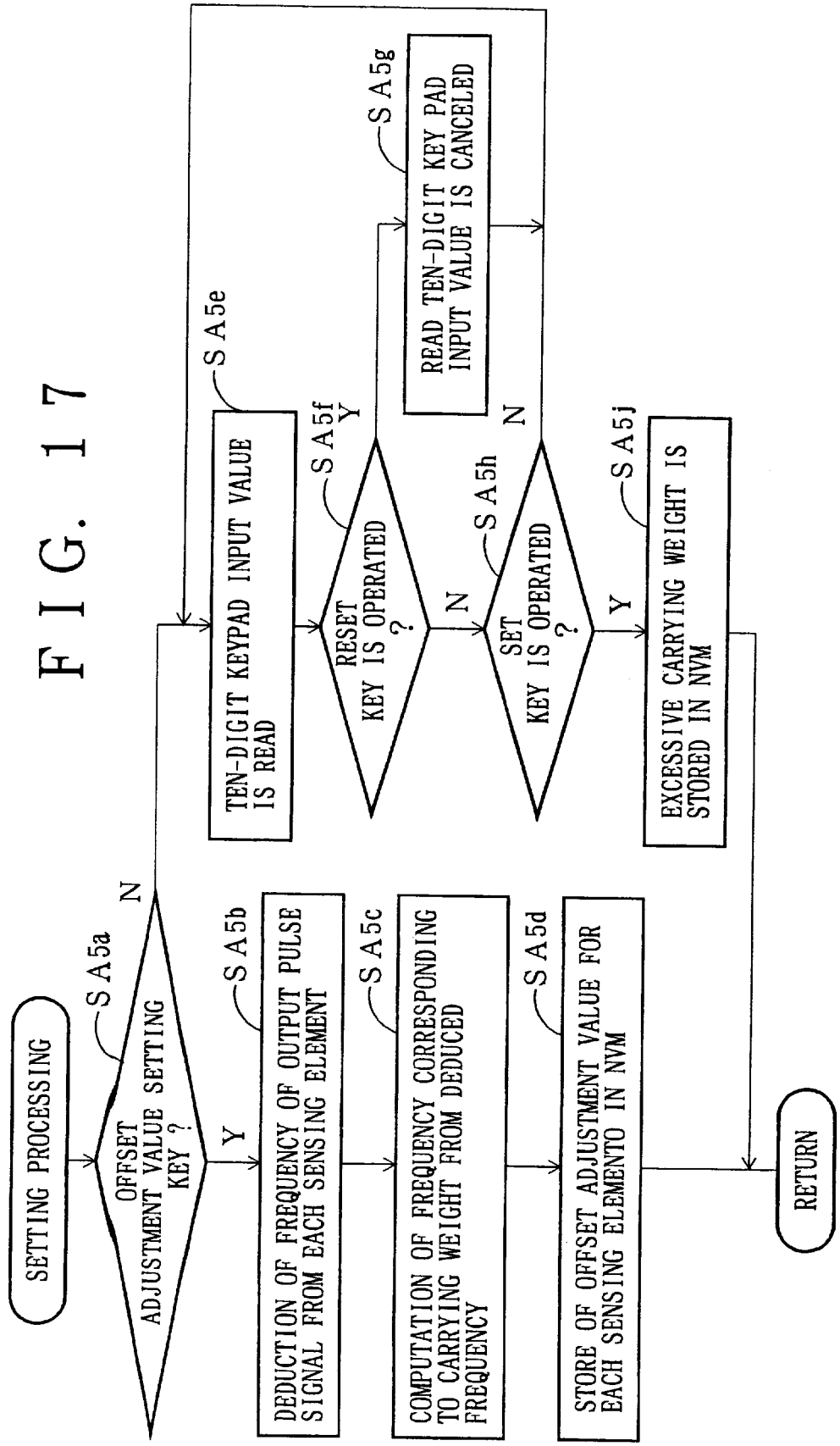
FIG. 17 is a flowchart showing the subroutine of setting processing shown in FIG. 14.

In the setting processing, as seen from the flowchart of FIG. 17, decision is made on whether the requirement comes from the operation of the offset adjustment value setting key 45 (step SA5a). If step SA5a is "Yes", the setting processing proceeds step SA5b in which the frequency of the pulse signal from each sensing element 21 is acquired through the input interface 33d with the vehicle 1 being in a tare state.

Next, the reference frequency of 200 Hz at the carrying weight of 0 ton is subtracted form the frequency of the output pulse signal from each sensing element 21 acquired in step SA5b, thereby providing the frequency corresponding to the carrying weight (this computation is performed in the computation area of the RAM 33b) (step SA5c). The computed six frequencies each with polarity of plus or minus inverted are stored, as the offset adjustment values for the sensing element 21, in the NVM 35. The setting processing is returned to step SA3 of the main routine of FIG. 14.

On the other hand, if step SA5 is "No" (the requirement does not come from the offset adjustment value setting key 45), an input value inputted by the ten-digit key pad 10 is read (step SA5c). Successively, decision is made on whether or not the resetting key 54 has been operated (step SA5f).

If step SA5f is "Yes", the input value inputted by the ten-digit key pad 53 in step SA5e is canceled (step SA5g) and the processing routine is returned to step SA5e. If step SA5f is "No", decision is made on whether or not the setting key 55 has been operated (step SA5h).

If step SA5h is "No" (setting key 55 has not been operated), the processing routine is returned to step SA5e. If step SA5h is "Yes" (setting key 55 has been operated), the input value read in step SA5e is stored as standard weight for deciding excessive carrying (step SA5j). The processing routine is returned to step SA3 in the main routine.

If step SA3 is "No" (there is no requirement of setting the mode), in step SA7, decision is made on whether or not an running pulse has been input by the running sensor 57. If step SA7 is "Yes", decision is made on whether or not the flag F2 of the carrying flag area of RAM 33b is '0' (step SA9).

If step SA9 is "No" (flag F2 is not '0'), the flag F1 in the before-running area of RAM 33b is set for '1'(SA11), and thereafter, the processing proceeds to step SA13. If step SA9 is "Yes" (flag F2 is '0'), the processing skips SA11 and proceeds to step SA13 directly.

In step SA13, a prescribed time Tw sec is caused to elapse. Therefore, the processing is returned to step SA3.

Returning to SA7, if SA7 is "No" (no running pulse is inputted), the frequency of the pulse signal from each sensing element is deduced (step SA15). In step SA17, decision is made on whether or not each of the output pulse signal from each sensing element 21 is within a range of 30 Hz to 700 Hz adjustable in terms of the offset adjustment value (step SA17).

If step SA17 is "No" (at least one of the output pulse signals from the sensing elements 21 has a frequency outside the range of 30 Hz to 700 Hz), an error indication such as alphabet "E. Lo" is made on the carrying weight indicating area (step SA19). The processing routine proceeds to step SA3. On the other hand, if step SA17 is "YES" (all the frequencies of the output pulse signals from the sensing elements 21 are within the range of 30 Hz to 700 Hz), the processing routine proceeds to step SA21.

In step SA21, the frequency of the pulse signal from each sensing element 21 deduced in step SA15 is offset-adjusted in the computing area in terms of the offset adjustment value stored in the NVM 35, and in step SA23, the frequency of the pulse signal thus obtained is characteristic-adjusted in the computing area in terms of the characteristic adjustment value in the NVM 35.

The total of the pulse signal frequencies from the sensing elements 21 thus obtained, i.e. the total frequency before gain correction is computed (step SA25). Further, in step SA27, the storage value of the total frequency register area before gain correction of the RAM 33b is updated to the total frequency before gain correction computed in step SA25.

In step SA29, decision is made on whether or not the setting mode changing switch 38 has been switched into the manual setting mode. If step SA29 is "Yes", whether or not the uniform load inputting key 39b has been operated is decided (step SA31).

If step SA31 is "Yes" (uniform load input key 39b has been operated), the processing routine jumps to step SA41 described later. If step SA31 is "No" (uniform load input key 39b has not been operated), whether or not the left deflection load key 39a has been operated (step SA33).

If step SA33 is "Yes" (right deflection loading key 39a has been operated), the processing routine jumps to step SA53 described later. If step SA33 is "No" (right deflection loading key 39a has not been operated), the processing routine jumps to step SA63 described later.

Returning to step SA29, if step SA29 is "No", in the computing area, on the basis of the output frequency from each sensing element 21 deduced in step SA15, each of the axle deflection values δ1 to δ3 representative of the degree and orientation in the vehicle width direction of the load applied to each of the front, intermediate and rear axles 9 is computed using Equation $\delta n=(\epsilon nL-\epsilon nR)\div Bn$ (step SA35).

In the above equation, n denotes the axis number of the axle 9 (n=1 for front axle 9, n=2 for the intermediate axle 9 and n=3 for the rear axle 9); E L and εR denote frequencies before gain correction of the output pulse signals from the left and right sensing elements 21; B denotes the frequency band width (maximum frequency−minimum frequency) of the pulse signal which can be outputted from each sensing element 21.

Next, in step SA35, the axle deflection degrees δ1 to δ3 computed by step SA35 are weighted by being multiplied by the weighting coefficients Q1 to Q3 stored in the NVM 35. The axle deflection degrees δ1×Q1, δ2×Q2 and δ3×Q3 thus weighted are totaled to acquire the above vehicle deflection degree δ(step SA37).

Figure 15:
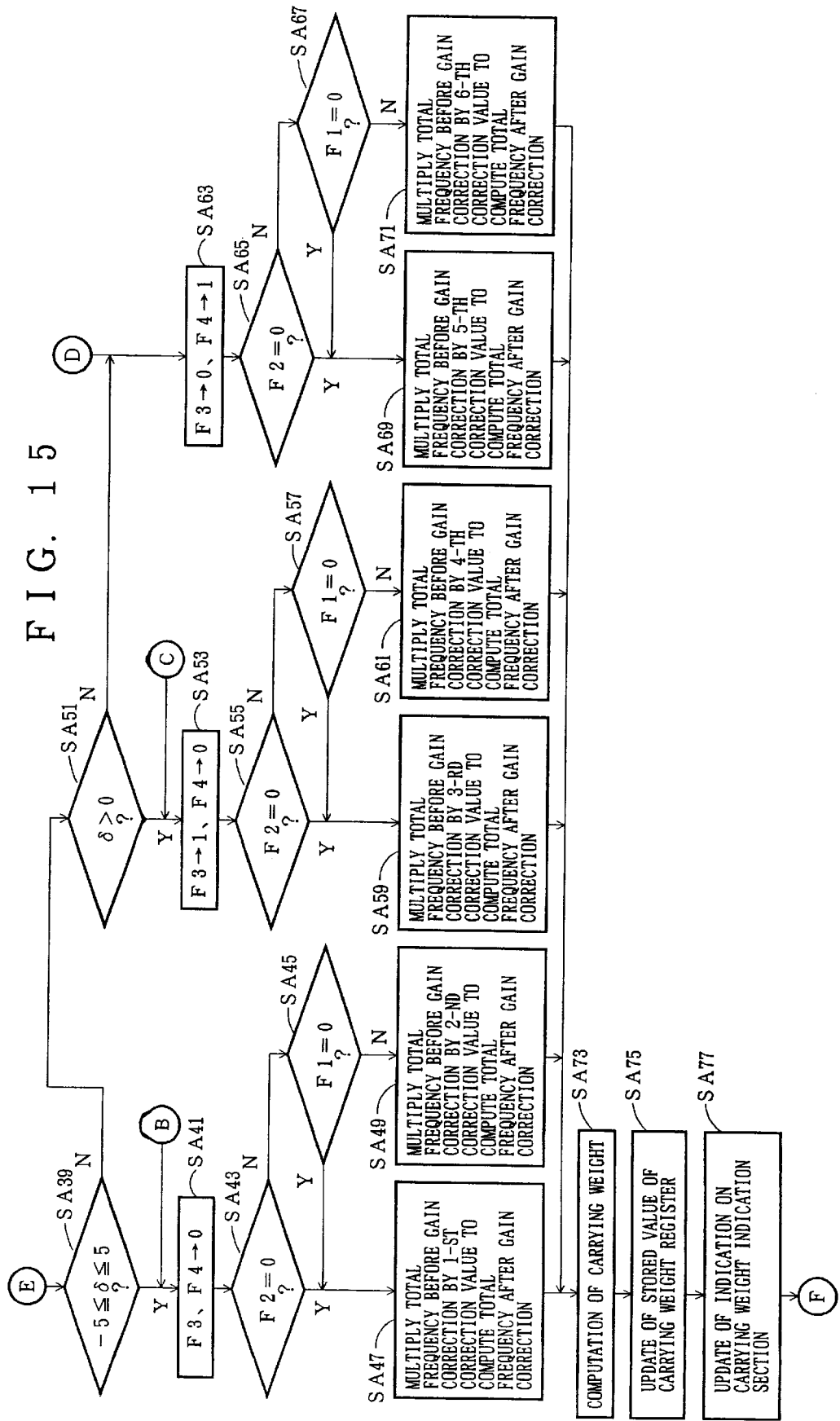

Subsequently, as shown in the flowchart of FIG. 15, in step SA39, decision is made on whether or not the vehicle deflection value δ is within the range of −5≦δ<5.

If step SA39 is "No", the processing routine proceeds to step SA51 described later. If step SA39 is "Yes", it proceeds to step SA41.

In step SA41 to which the processing routine proceeds when step SA31 is "Yes" (uniform loading input key 39b has been operated) or step SA37 is "Yes" (the vehicle deflection value δ is within the range of −5≦δ≦5), the flags F3 and F4 of the left and right deflection flag of the RAM 33b are set for '0'. Subsequently, in step SA43, whether or not the flag F2 of the carrying flag area is '0' is decided.

If step SA43 is "Yes", the processing routine proceeds to step SA47 described later. If step SA43 is "No", whether or not the flag F1 in the before-running computing area is '0' (step SA45) is decided.

If step SA45 is "No", the processing routine proceeds to step SA49 described later, whereas if step SA49 is "Yes", it proceeds to step SA47.

In step SA47 to which the processing routine proceeds when step SA43 is "Yes" and step SA45 is "No", the total frequency before the gain correction stored in the corresponding register area is multiplied by the first correction value Z1 stored in the gain correction value table of the NVM 35 to acquire the total frequency after gain correction. Thereafter, the processing routine proceeds to step SA73 described later.

On the other hand, in step SA49 to which the processing routine proceeds when SA45 is "No", the total frequency before the gain correction stored in the corresponding register area is multiplied by the second correction value Z1 stored in the gain correction value table of the NVM 35 to acquire the total frequency after gain correction. Thereafter, the processing routine proceeds to step SA73 described later.

In step SA51 to which the processing routine proceeds when step SA39 is "No" (vehicle deflection value δ acquired in step SA37 is not within a range of the deflection decision value of −5≦δ≦5), whether or not the above vehicle deflection value δ is plus (+)) is decided. If "No", the routine proceeds to step SA63 described later, and if "Yes", it proceeds to step SA53.

In step SA53 to which the processing routine proceeds when SA33 is "Yes" (left deflection loading key 39a has been operated) and step SA51 is "Yes" (vehicle deflection value δ is plus (+), the flag F3 of the left flag area is set for '1', and the flag F4 of the right flag area is set for '0'. In step SA55, whether or not the flag F2 of the carrying flag area is '0' is decided (step SA55).

If step SA55 is "Yes", the processing routine proceeds to step SA59 described later. If not, it proceeds to step SA57 in which whether or not the flag of the before-running computing flag area is '0' is decided (step SA57).

If step SA57 is "No", the processing routine proceeds to step SA61 described later. If step SA57 is "Yes", it proceeds to step SA59.

In step SA59 to which the processing routine proceeds when step SA55 is "Yes" (flag F2 of the carrying flag area is 0) and step SA57 is "Yes" (flag F1 of the before-running computing flag area is 0), the total frequency before the gain correction is multiplied by the third correction value Z3 stored in the gain correction value table of the NVM 35 to acquire the total frequency after gain correction. Thereafter, the processing routine proceeds to step SA73 described later.

In step SA61 to which the processing routine proceeds when step SA57 is "No" (flag F1 of the before-running flag area is 0), the total frequency before the gain correction is multiplied by the fourth correction value Z4 stored in the gain correction value table to acquire the total frequency after gain correction. Thereafter, the processing routine proceeds to step SA73 described later.

In step SA63 to which the processing routine proceeds when SA33 is "No" (left deflection loading key 39a has not been operated) and step SA51 is "No" (vehicle deflection value δ is not plus (+), the flag F4 of the right flag area is set for '1', and the flag F3 of the left flag area is set for '0'. In step SA65, whether or not the flag F2 of the carrying flag area is '0' is decided (step SA65).

In SA69 to which the processing routine proceeds when step SA65 is "Yes" (flag F2 of the carrying flag area is 0), and step SA67 is "Yes" (flag F1 of the before-running flag area is 0), the total frequency before the gain correction is multiplied by the fifth correction value Z5 stored in the gain correction value table to acquire the total frequency after gain correction. Thereafter, the processing routine proceeds to step SA73 described later.

In step SA71 to which the processing routine proceeds when step SA67 is "No" (flag F1 of the before-running computing flag area is not '0'), the total frequency before the gain correction is multiplied by the sixth correction value Z6 stored in the gain correction value table of the to acquire the total frequency after gain correction. Thereafter, the processing routine proceeds to step SA73 described later.

In step SA73 to which the processing routine proceeds after the total frequency after gain correction is acquired in each of steps of SA47, SA49, SA59, SA61, SA69 and SA71, the carrying weight is computed in the computing area using the weight conversion equation stored in the NVM 35. Subsequently, in step SA75, the storage value in the carrying weight register area of RAM 33b is updated to the carrying weight computed in step SA73. Further, in step SA77, the indication at the carrying weight indicating section 37 is updated to the carrying weight stored in the carrying weight register area in step SA75.

Figure 16:
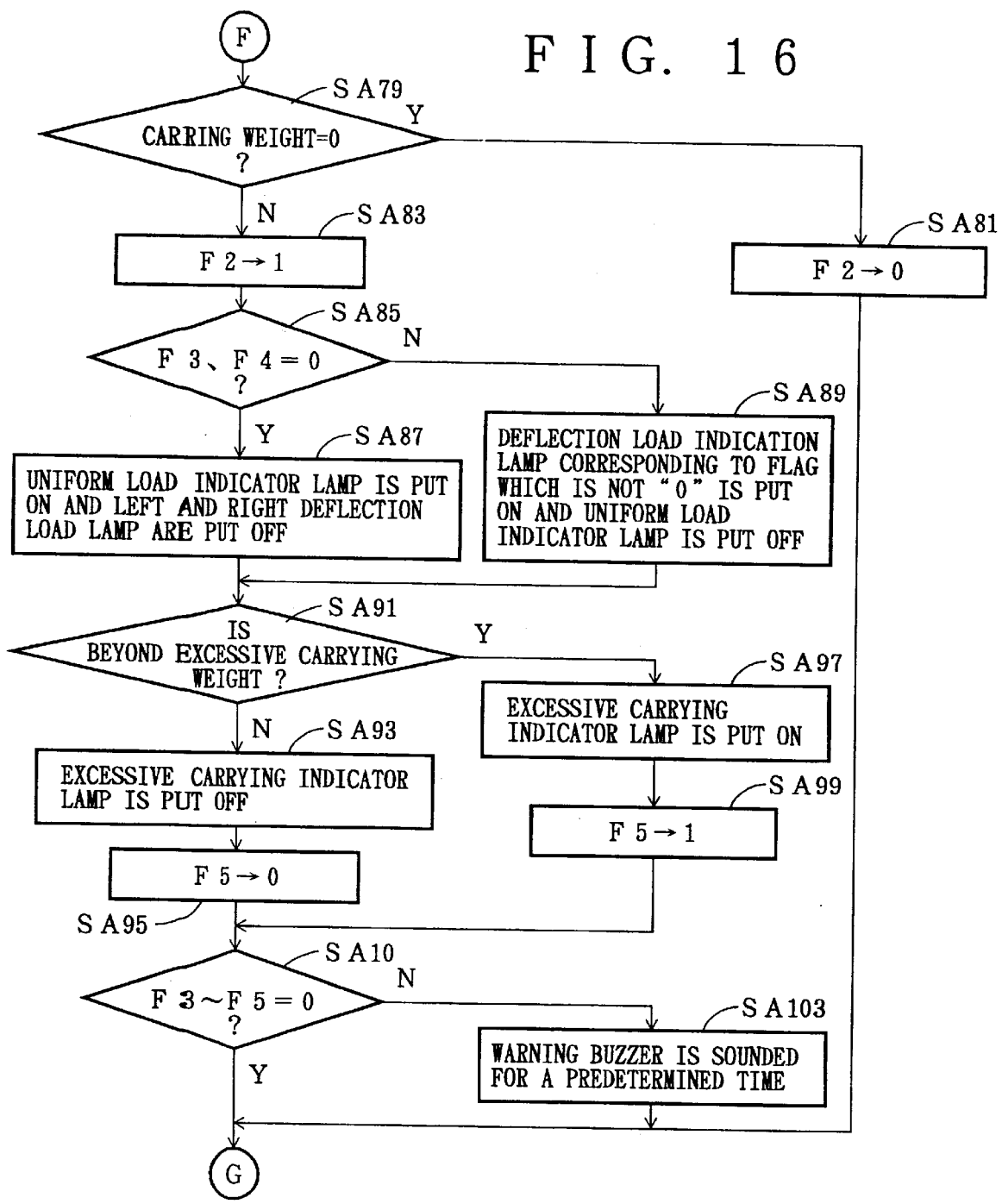

Further, as shown in the flowchart of FIG. 16, in step SA79, decision is made on whether or not the carrying weight stored in the carrying weight register area instepSA75 is '0'. If step SA 79 is "Yes" (carrying weight is '0'), in step SA81, the flag F2 in the carrying flag area is set for '0'. The processing routine returns to step SA3. On the other hand, if step SA79 is "No", the flag F2 in the carrying flag area is '0', in step SA83, the flag F2 in the carrying flag area is set for '1'.

In step SA85, decision is made on whether or not the flags F3 and F4 in the left and right deflection flag areas are both '0'. If step SA85 is "Yes", (both flags F3 and F4 are '0'), in step SA87, the uniform load indicating lamp 40b is put on and the left and right deflection load indicating lamp 40a and 40c are put off. The processing routine proceeds to step SA91.

On the other hand, if step SA 87 is "No" (at least one of the flags F3 and F4 is not '0'), the deflection load indicating lamp 40a and/or 40b corresponding to the flags which are not '0' are put on and the uniform load indicating lamp 40b is put off. The processing routine proceeds to step SA91.

In step SA91, decision is made on whether or not the carrying weight stored in the carrying weight register area in step SA75 exceeds the excessive carrying weight in the NVM 35. If step SA91 is "No" (the carrying weight does not exceed the excessive carrying weight), in step SA93, the excessive carrying indicating lamp 41 is put off. In step SA95, the flag F5 of the excessive flag area is '0', and the processing routine proceeds to step SA101. If step SA91 is "Yes" (the carrying weight exceeds the excessive carrying weight), in step SA97, the excessive carrying indicating lamp 41 is put on. In step SA99, the flag F5 of the excessive flag area of the RAM 33b is set for '1', and the processing routine proceeds to step SA101.

In step SA101, decision is made on whether or not the flags F3 to F5 of the flag areas of the left deflection, right deflection and excessive carrying are all "0". If step SA101 is "No", in step SA103, the warning buzzer 43 is sounded for a predetermined time. The processing routine returns to step SA3. If step SA101 is "Yes" (all the flags F3 to F5 are 0), the processing routine returns to step SA3 directly.

As understood from the description hitherto made, in this embodiment, the before-computing running detecting means 33D defined in claims includes steps SA45, SA57 and SA67 in the flowchart of FIG. 15. The deflection load setting means 33E includes steps SA31, SA33 and SA37 in the flowchart of FIG. 14 and steps SA39, SA41, SA51, SA53 and SA63 of the flowchart of FIG. 15.

In this embodiment, the correction value data selecting means 33F and output correction means 33G include steps SA47, SA49, SA59, SA61, SA69 and SA71. The axle deflection value computing means 33B is constructed by step SA35 in FIG. 15, and the weighting means 33c is constructed by step SA37 in FIG. 14. The deflection load information selecting means 33H is constructed by step SA29 in FIG. 14.

An explanation will be given of the operation of the carrying weight meter 31 according to this embodiment having the above configuration.

When the vehicle 1 stops and no running pulse is inputted from the running sensor 57, the pulse signal at the frequency corresponding to the load applied to both ends of each of the axles 9 is produced from the sensing elements 21 at both ends of each axle 9. Then, the frequency of the pulse signal from each sensing element 21 is offset-corrected and characteristic-corrected, and the total frequency before the gain correction is computed.

Where the setting mode changing switch 38 has been changed into the automatic setting mode, the axle deflection values $\delta 1$ to $\delta 3$ are computed in the manner as described below. They are multiplied by the weighting coefficients Q1 to Q3 of the NVM 35, respectively so that they are weighted according to the rate of load dispersion for each axle.

Decision is made on whether load is uniformly applied or deflected right and left in a lateral direction of the vehicle 1 according to whether the totaled vehicle deflection value $\delta$ of the axle deflection values $\delta 1$ to $\delta 3$ weighted by the weighing coefficients Q1 to Q3 is within the deflection decision value relative to the width direction of the NVM 35 or below or beyond it.

Where no baggage is carried on the platform 7, or the carrying weight is computed first after the baggage is carried from the state where it has not been carried, on the basis of the decision result of the vehicle deflection value $\delta$ for the deflection decision value, the total frequency before the gain correction is corrected using the corresponding correction value of the first, third and fifth correction values Z1, Z3 and Z5. The carrying weight of the vehicle 1 is computed from the total frequency after the gain correction using the weight conversion equation in the NVM 35 and indicated on the carrying weight indicating area 37.

On the other hand, in order to compute the carrying weight in a state where the baggage has been already carried, and the carrying weight is indicated on the carrying weight indicating area 37, on the basis of the decision result of the vehicle deflection value $\delta$ for the deflection decision value, the total frequency before the gain correction is corrected using the corresponding correction value of the second, fourth and sixth correction values Z2, Z4 and Z6. Like the above case, the carrying weight of the vehicle 1 is computed from the total frequency after the gain correction using the weight conversion equation in the NVM 35 and indicated on the carrying weight indicating area 37.

Where the setting mode changing switch 38 has been switched into the side of manual setting mode, any one of three load input keys 39a to 39c of "left deflection", "uniform" and "right deflection" is operated by a driver (not shown) of the vehicle 1 so that the deflection degree in the vehicle width direction of the load applied to the vehicle 1 is manually set on the basis of the experience and sense of the driver.

Figure 18A:
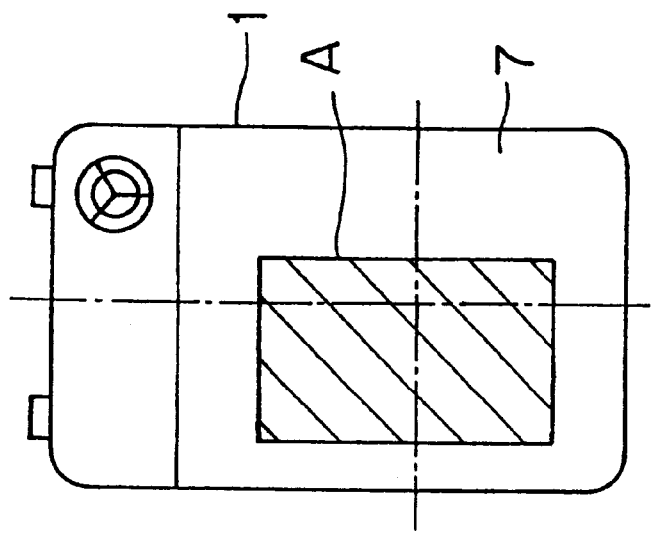
FIG. 18A is an explanation view showing the carrying state where the load on a platform shown in FIGS. 2A and 2B deflects left.
Figure 18B:
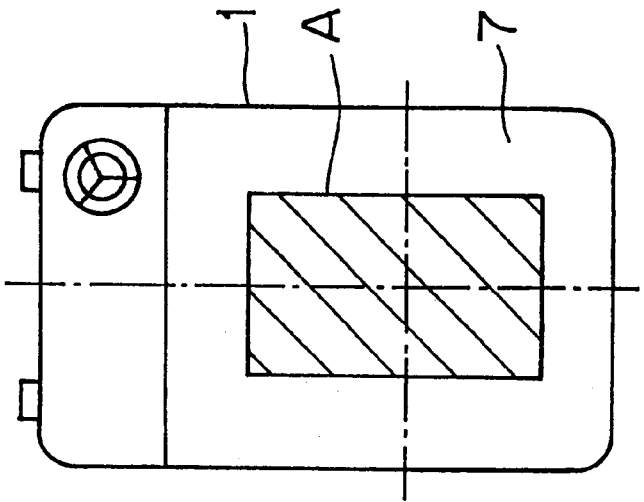
FIG. 18B is an explanation view showing the carrying state where the baggage on a platform is uniformly carried.
Figure 18C:
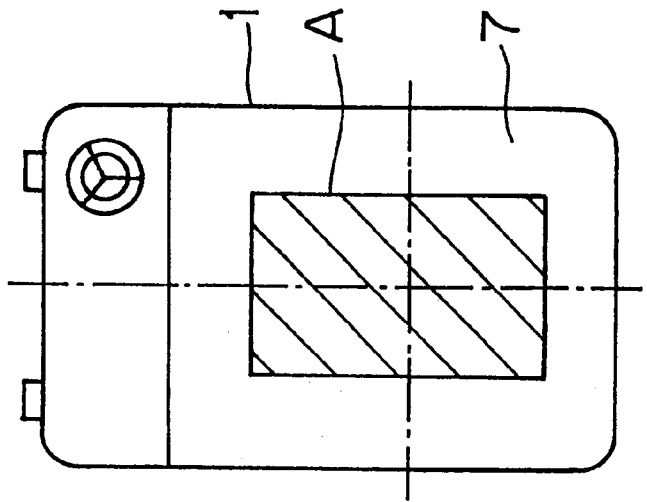
FIG. 18C is an explanation view showing the carrying state where the load on a platform deflects right.

Specifically, when the driver decides that baggage A on the platform 7 is deflected left as shown in FIG. 18(a), the left deflection load input key 39a is operated; when he decides that the baggage A is loaded uniformly as shown in FIG. 18(*b*), the right deflection load input key 39b is operated; and when he decides that the baggage A is deflected right as shown in FIG. 18(*c*), the right deflection load input key is operated.

Thus, at the time of manual setting mode of the setting mode changing switch 38, decision is made on which has been operated of three load input keys 39a to 39c of "left deflection", "uniform" and "right deflection".

Where no baggage is carried on the platform 7, or the carrying weight is computed first after the baggage is carried from the state where it has not been carried, on the basis of the decision result of the vehicle deflection value $\delta$ for the deflection decision value, the total frequency before the gain correction is corrected using the correction value of the operated key of three load input keys 39a to 39c of the first, third and fifth correction values Z1, Z3 and Z5 stored in the NVM 35, thus acquiring the total frequency after gain correction.

On the other hand, in order to compute the carrying weight in a state where the baggage has been already carried, and the carrying weight is indicated on the carrying weight indicating section 37, on the basis of the decision result of the vehicle deflection value $\delta$ for the deflection decision value, the total frequency before the gain correction is corrected using the correction value corresponding to the operated key of the second, fourth and sixth correction values Z2, Z4 and Z6, thus acquiring the total frequency after gain correction.

Thereafter, on the basis of the total frequency after gain correction thus acquired, the carrying weight of the vehicle 1 is computed by the weight conversion equation in the NVM 35, and is indicated on the carrying weight indicating area.

Concurrently with the indication of the above computed carrying weight, when the vehicle deflection value $\delta$ is beyond the deflection decision value or the driver operates the left deflection load input key 39a, the left deflection load indicating lamp 40a is put on; when the vehicle deflection value $\delta$ is within the range of the deflection decision value or the driver operates the uniform load input key 39b, the uniform load indicating lamp 40b is put on; and when the vehicle deflection value $\delta$ is below the deflection decision value or the driver operates the right deflection input key 39c, the right deflection indicating lamp 40c is put on.

Where the carrying weight of the vehicle 1 computed using the weight conversion equation in the NVM 35 is above the excessive carrying weight in the NVM 35, the excessive carrying indicating lamp 41 is put on. Where the excessive carrying weight lamp 41 and the any one of the left deflection and right deflection load indicating lamps 40a and 40c are put on, the warning buzzer 43 is sounded for a prescribed time, thereby informing the driver of the state of deflection loading and/or excessive carrying.

The operation described above is not carried out when the vehicle 1 is running or the running pulse is produced from the running sensor. While the vehicle is running, the indication of the carrying weight indicating area 37, and the blinking state of the load indicating lamps 40a to 40c and excessive carrying indicating lamp 41 remain the previous state when the vehicle 1 stops.

Thereafter, when the vehicle 1 stops and hence production of the running pulse is stopped, in accordance with a change of the load or the loading or unloading of the baggage A, the indication of the carrying weight indicating area 37 and the blinking state of the load indicating lamps 40a to 40c and excessive carrying indicating lamp 41 start to change.

In this way, the correction values Z1 to Z6 for gain adjustment are selected on the basis of the total of the frequencies the pulse signals outputted from the six sensing elements arranged on both left and right ends of the front, intermediate and rear axles 9 according to the deflection in the lateral direction of the load applied to the vehicle 1 and its orientation of left or right and according to the state of the baggage A in computing the carrying weight. Specifically, each of the above six sensing elements is arranged within the shackle pin 19 for connecting the bracket 13 and the shackle 17. The correction values serve to correct the total frequency before gain correction acquired from the output pulse signals from the sensing elements. The correction values are selected according to the case of computing the carrying weight where the baggage A is not carried on the platform 7 or it has been first carried, or the baggage A has been already carried and its weight has been indicated on the indicating area 37.

For this reason, even if the output from each of the sensing elements 21 is changed owing to the deflection of the load in the vehicle width direction, which varies in accordance with the profile of the vehicle or carrying balance of the baggage A while the carrying weight is being computed, or vibration attendant on the running of the vehicle, the output from each sensing element 21 is corrected to the normal value corresponding to the actual load. Therefore, the correct carrying weight can be computed from the total of the outputs from the sensing elements irrespectively of the deflection of the load applied to the vehicle 1 and the presence or absence of the vehicle 1, thus improving the measuring accuracy.

At the time of the automatic setting mode of the setting mode changing switch 38, the orientation of the deflection of the load applied to the vehicle 1 is deduced from the vehicle deflection value. In computing the vehicle deflection value $\delta$, the axle deflection values $\delta1$ to $\delta3$ acquired from the two sensing elements 21 of each axle 9 are multiplied by the weighting coefficients Q1 to Q3 stored in the NVM 35.

Thus, in accordance with the dispersion of the load applied to the vehicle 1 to each axle 9, the deflection degree of the load for each axle 9 is weighted. Therefore, the state of the deflection load of the vehicle 1 can be deduced accurately and surely.

Further, in the embodiment, the state of the vehicle 1 deduced on the basis of the output from each sensing element 9 and that inputted in such a manner that the driver of the vehicle 1 operates three load input keys 39a to 39c on the basis of his experience and sense can be selected by the setting mode changing switch 38.

Thus, for example, at the time of manual setting mode, with the baggage A having a known weight carrying, after any one of the three load input keys 39a to 39c is operated, decision is made on whether or not the carrying weight indicated on the carrying weight indicating area 37 and the actual carrying weight coincide with each other. If not, another one of the load input keys is operated to cause the carrying weight indicated on the indicating section to coincide with the actual carrying weight, thus confirming the orientation of the deflection of the baggage A.

Provision of the manual setting mode is advantageous in that it can easily deal with the addition of the functions requiring the manual operation by the driver such as the instruction of reset of the carrying weight meter or recording of the computed carrying weight.

In addition, by providing the load indicating lamps 40a to 40c and the excessive carrying indicating lamp 41, the deflection of the load in the vehicle width direction applied to the vehicle and the excessive carrying state can be easily recognized through their blinking state, thereby taking countermeasure of loading the baggage A again swiftly.

Schematic configuration of the second aspect of the carrying weight computing apparatus according to the present invention.

Now referring to the basic arrangement of FIG. 19, an explanation will be given of the schematic arrangement of the second aspect of the carrying weight computing apparatus according to the present invention.

Figure 19:
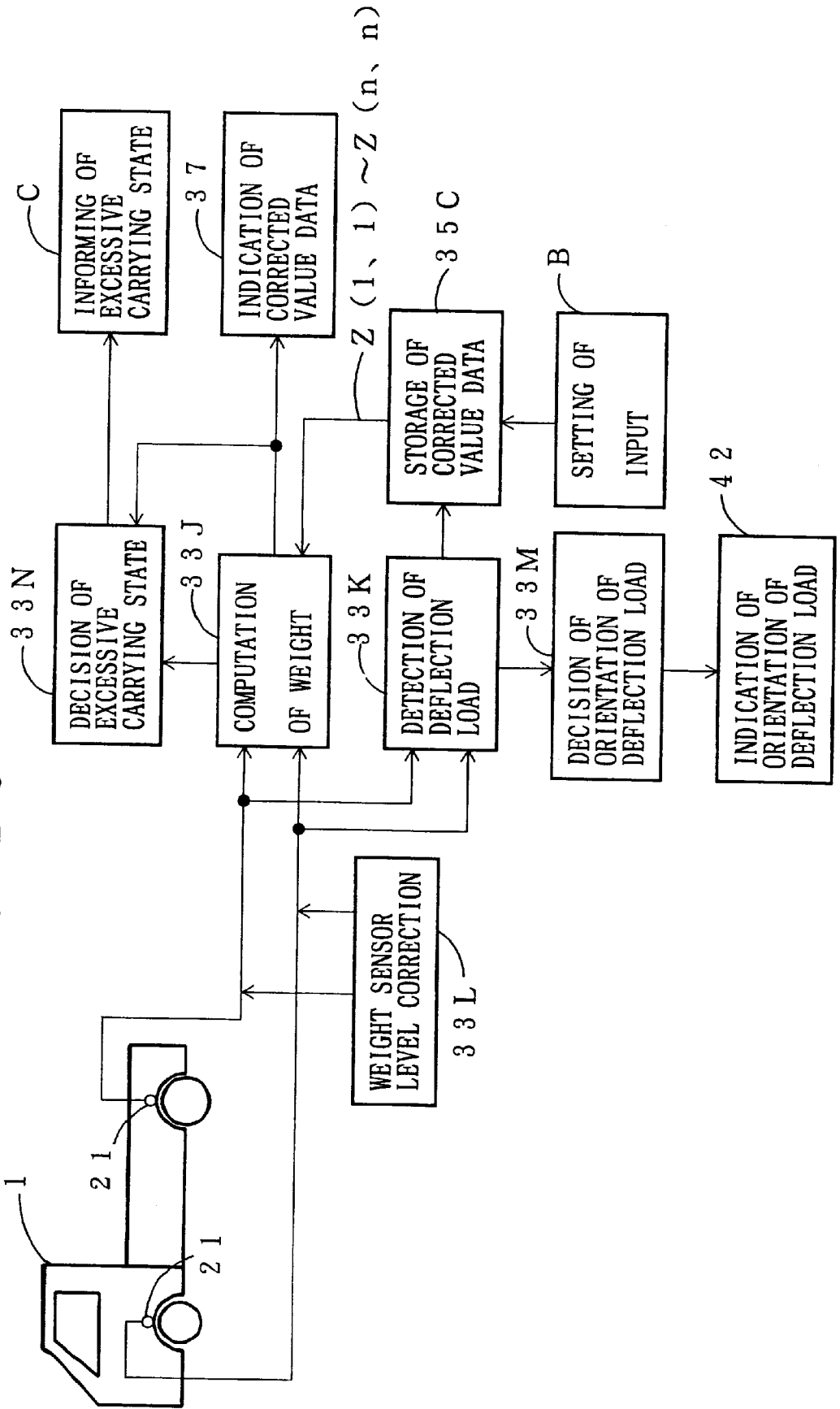
FIG. 19 is a basic arrangement view of a second aspect of a carrying weight computing apparatus according to the present invention.

For convenience of illustration, the carrying weight computing apparatus according to the second aspect of the present invention will be explained using the vehicle 1 with two (front and rear) axes as shown in FIG. 19.

The carrying weight computing apparatus according to the second aspect includes a plurality of weight sensors attached to the vehicle 1 and weight computing means 33J for computing the weight on the basis of the outputs from the weight sensor 21 and computes the carrying weight of the vehicle 1 on the basis of the computed weight. The carrying weight computing apparatus further includes means for detecting deflection weight for deducing the deflection of the load applied to the vehicle 1 on the basis of the output signal from each weight sensor 21, and correction value data storage holding means for holding the correction value data Z(1, 1)–Z (n, n) for the weight computed by the weight computing means 33J corresponding to the deflection of the load applied to the vehicle 1 and corrects the weight computed by the weight computing means to compute the carrying weight of the vehicle 1.

Even if the weight computed by the weight computing means 33J differs from the actual carrying weight of the vehicle 1 because of the influence due to the deflection of the load applied to the vehicle 1 or characteristic of the weight dispersion of the vehicle itself, the carrying weight computing apparatus according to the second aspect of the present invention corrects the weight computed by weight computing means 33j using the above correction values Z (1, 1) to Z (n, n) to cancel an error between the weight after correction and the actual carrying weight of the vehicle 1.

In the carrying weight computing apparatus according to this aspect, the deflection load detecting means 33K deduce the dispersion(rate) of the above load in the vehicle length direction and that in the vehicle width direction orthogonal to it, and the correction value data holding means 35C holds the plurality of correction data Z (1, 1) to Z (n, n) correlated with the dispersion in the vehicle width and length directions.

By holding the above plurality of correction data Z (1, 1) to Z (n, n) in the correction data holding means 35C, the correction data Z (1, 1) to Z (n, n) to be applied can be specified using the load dispersions in the above two directions as address pointers.

The carrying weight computing apparatus according to this aspect further comprises weight sensor level correcting means 33L for correcting the output signal from each weight sensor 21 so that the characteristics of the respective weight sensors 21 coincide with one another. The deflection load detecting means 33K serves to deduce the deflection of the load applied to the vehicle 1 on the basis of each corrected output signal so that it is possible to prevent an error in the computed carrying error due to fluctuation in the characteristic among the weight sensors 21 from occurring.

The carrying weight computing apparatus according to this aspect further includes carrying weight indicating means 37 for indicating the corrected carrying weight of the vehicle 1. For this reason, the computed carrying weight can be used to not only leave recorded information but also to inform the driver or the like of the vehicle 1 of the present correct carrying weight and to take the countermeasure such as adjustment of the carrying weight as required.

The carrying weight computing apparatus according to this aspect further includes means B of inputting/setting the correction data Z (1, 1) to Z (n, n). For this reason, it is possible to set the correction value data Z (1, 1) to Z (n, n) in accordance with the kind of the vehicle 1 and the weight sensor 21.

The carrying weight sensor apparatus according to this embodiment includes means 33M for deciding the orientation of the deflection of load applied to the vehicle 1 and means for indicating the above decided direction. Therefore, it is possible to inform the driver of to which orientation the load is entirely deflected so that he can recognize it legibly and easily from the orientation of the deflection of the load indicated. Thus, the information which is reference for correcting the deflected load can be obtained.

The carrying weight sensor apparatus according to this embodiment includes excessive carrying state deciding means 33N for deciding the presence or absence of the excessive carrying state on the basis of the difference between the computed carrying weight of the vehicle 1 and a prescribed excessive weight thereof, and excessive carrying state informing means C for informing the excessive carrying state. For this reason, the driver can easily recognize the excessive carrying and can take the countermeasure for canceling the excessive carrying state.

Concrete Structure of the carrying weight computing apparatus according to the second embodiment of the present invention.

Now referring to FIGS. 20 to 27, an explanation will be given of the concrete structure of the second aspect of the carrying weight computing apparatus according to the present invention.

Figure 20A:
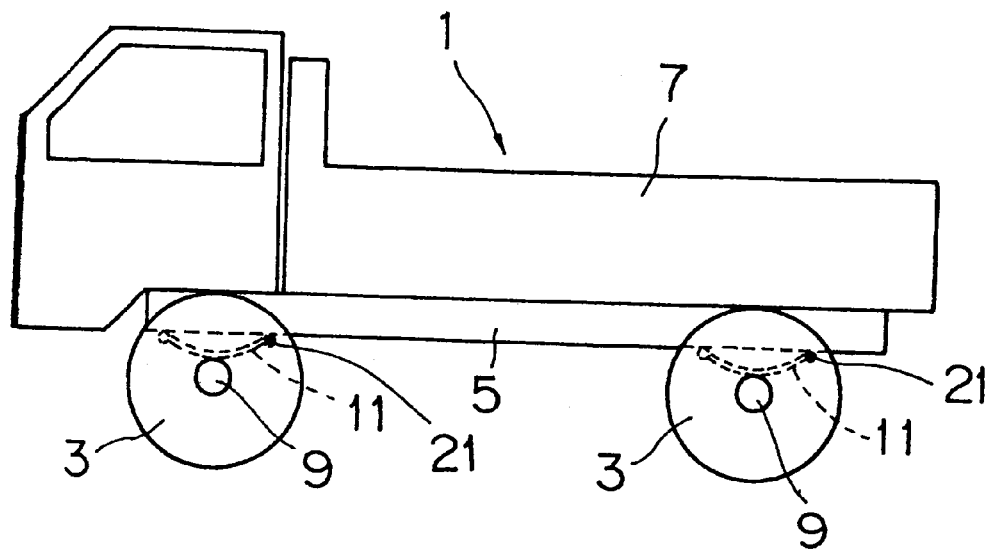
FIG. 20A is a side view showing vehicle positions where sensing elements of a carrying weight computing apparatus according to the second aspect of the present invention are arranged.
Figure 20B:
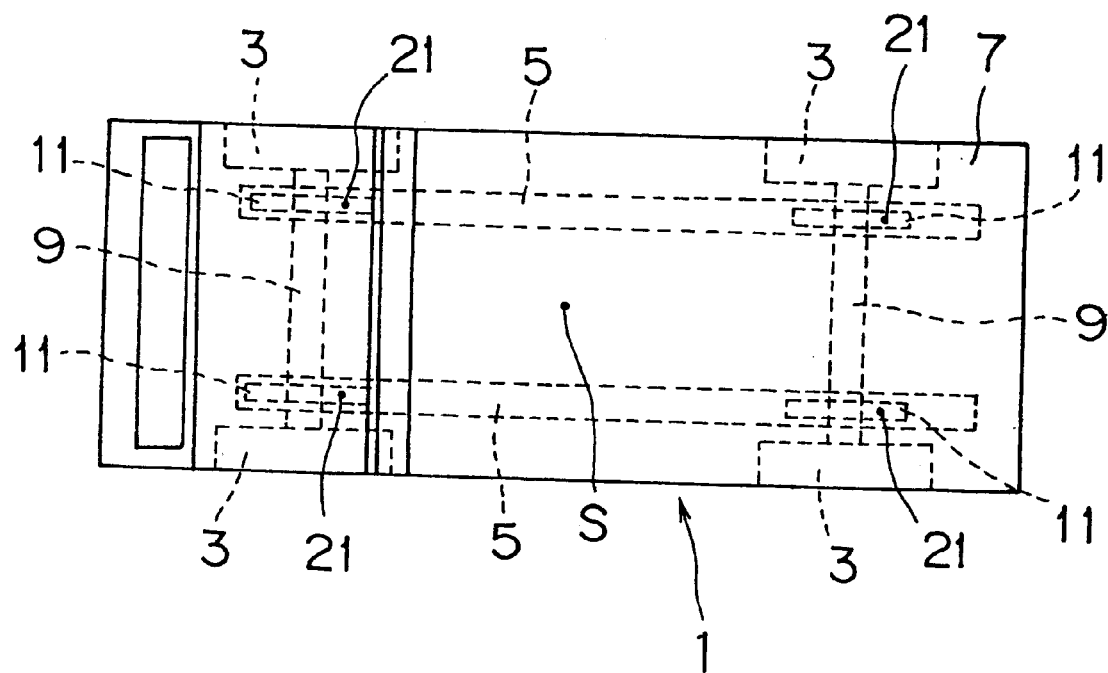
FIG. 20B is a plan view of vehicle positions where sensing elements are arranged in the second aspect of a carrying weight computing apparatus according to the present invention.

FIG. 20 is a view showing the positions where the sensing elements of the carrying weight computing apparatus are located; FIG. 20A is a side view and FIG. 20B is a plan view.

In a preferred embodiment of the second aspect of the carrying weight computing apparatus according to the present invention, as described above, four (front and rear; left and right) wheels 3 of the vehicle 1 and the front two wheels and rear two wheels are supported at both ends of the front and rear axles 9, and the sensing elements 21 (corresponding to the sensors) for measuring the load are located within the shackle pins 17 coupling the leaf springs 11 supported at both left and right ends with the shackle 15 of four brackets 13 of the platform frame 5 (see FIG. 3).

Figure 21:
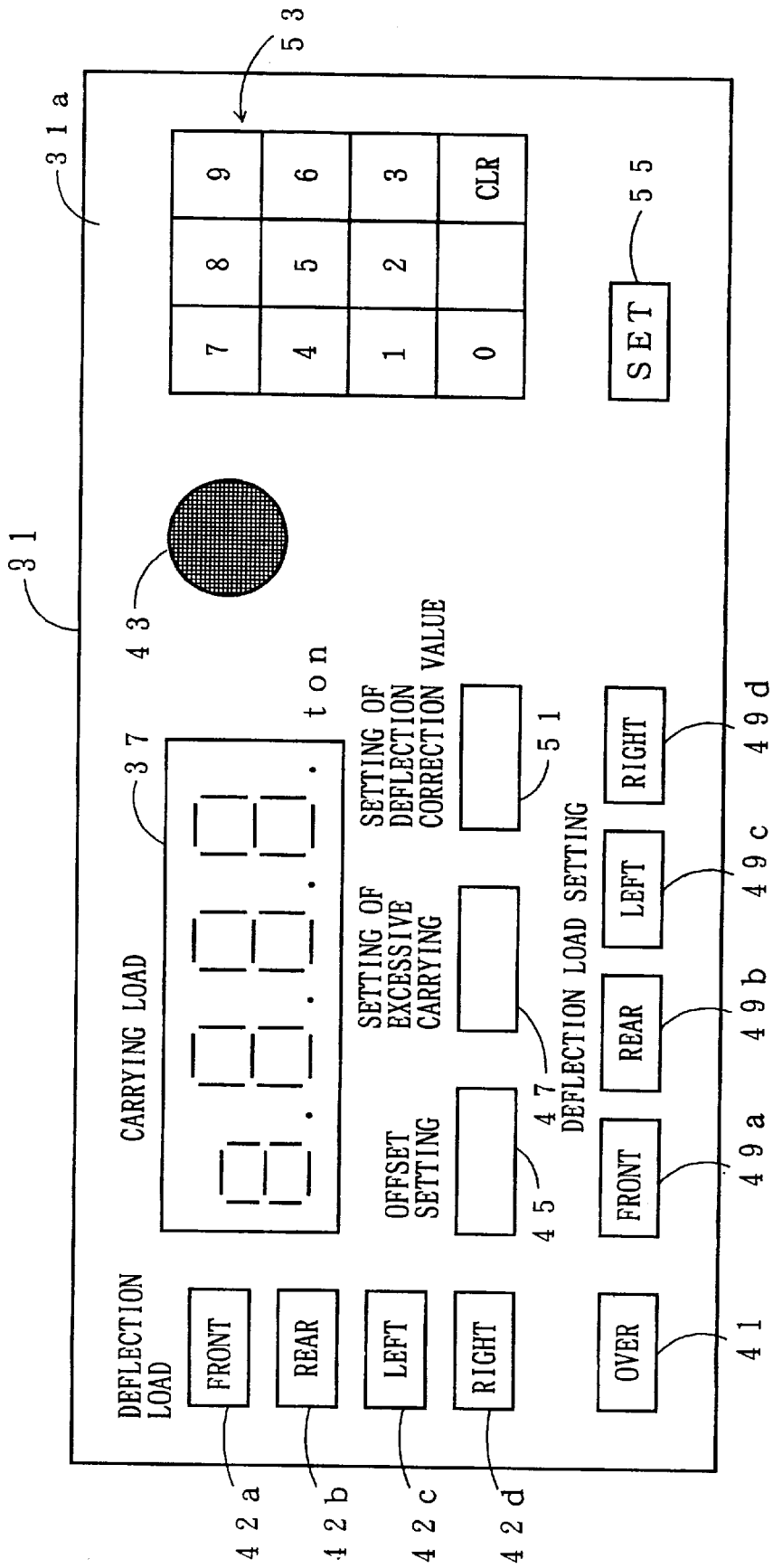
FIG. 21 is a front view of the carrying weight meter according to the third embodiment which constitutes a carrying weight computing apparatus according to the second aspect of the present invention.

FIG. 21 is a front view of the third embodiment of the carrying weight meter 31 used in the second aspect of the carrying weight computing apparatus according to the present invention. The carrying weight meter 31 according to the present invention is different from that of the first embodiment shown in FIG. 6 in appearance in cancellation of the deflection value indicating section 40d for indicating the vehicle deflection degree δ and reset key 54 and comprising deflection load decision value setting keys 49a to 49d (front and rear; left and right) used to decide whether or not the load is deflected front/rear and left/right and correction value setting key 51 operated when the correction value for correcting the output from each sensing element 21 attendant on the deflection of the load (keys 49a to 49d and the key 51 are arranged on the front face 31a).

Figure 6:
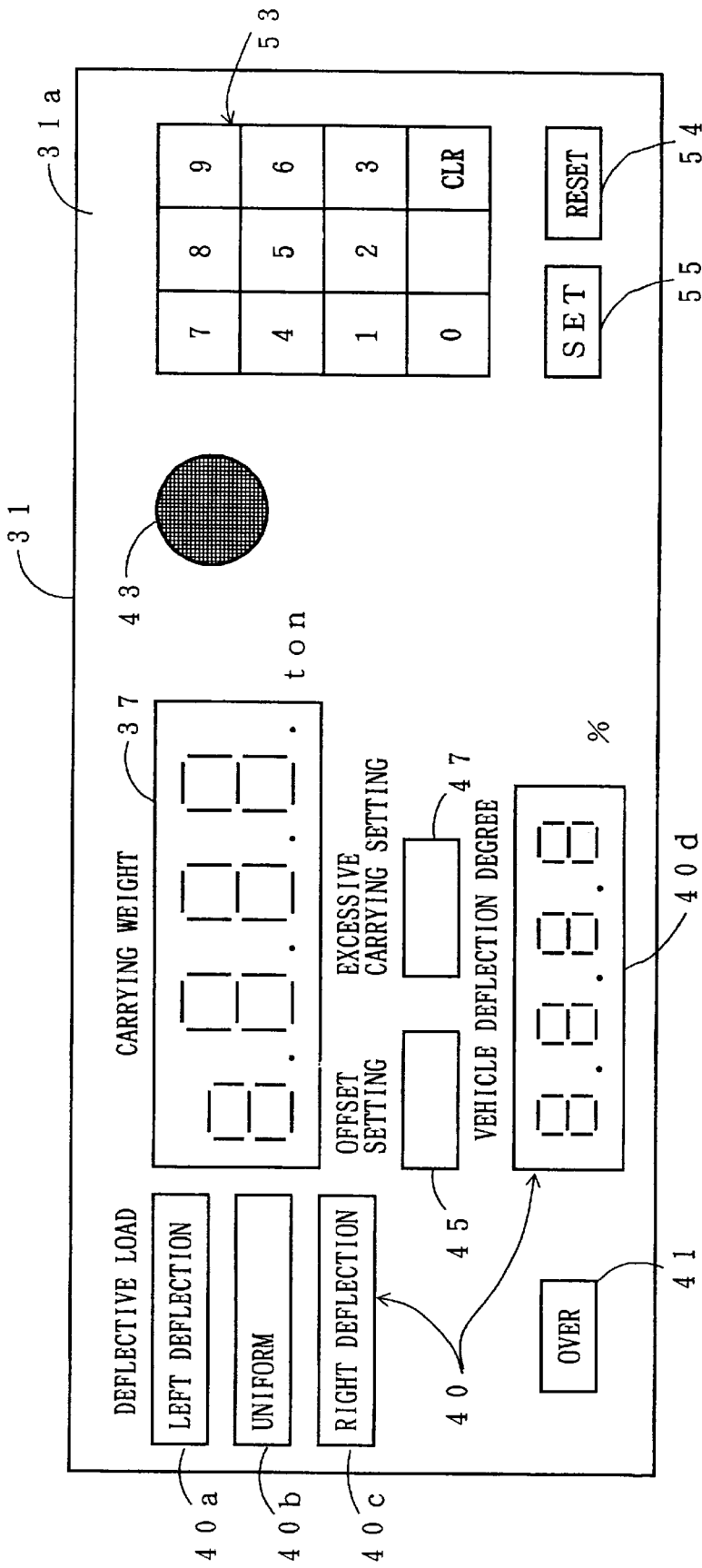
FIG. 6 is a front view of a first embodiment of the carrying weight meter which constitutes a load deflection computing apparatus according to the present invention.

The carrying weight meter 31 according to the third embodiment is also different from the embodiment of FIG. 6 in appearance in only comprising in place of load indicating lamps 40a to 40c of "left deflection", "uniform" and "right deflection", front/rear and left/right deflection load indicating lamps 40a to 40d (corresponding to deflection load direction indicating means 42) arranged on the front panel 31a.

Figure 22:
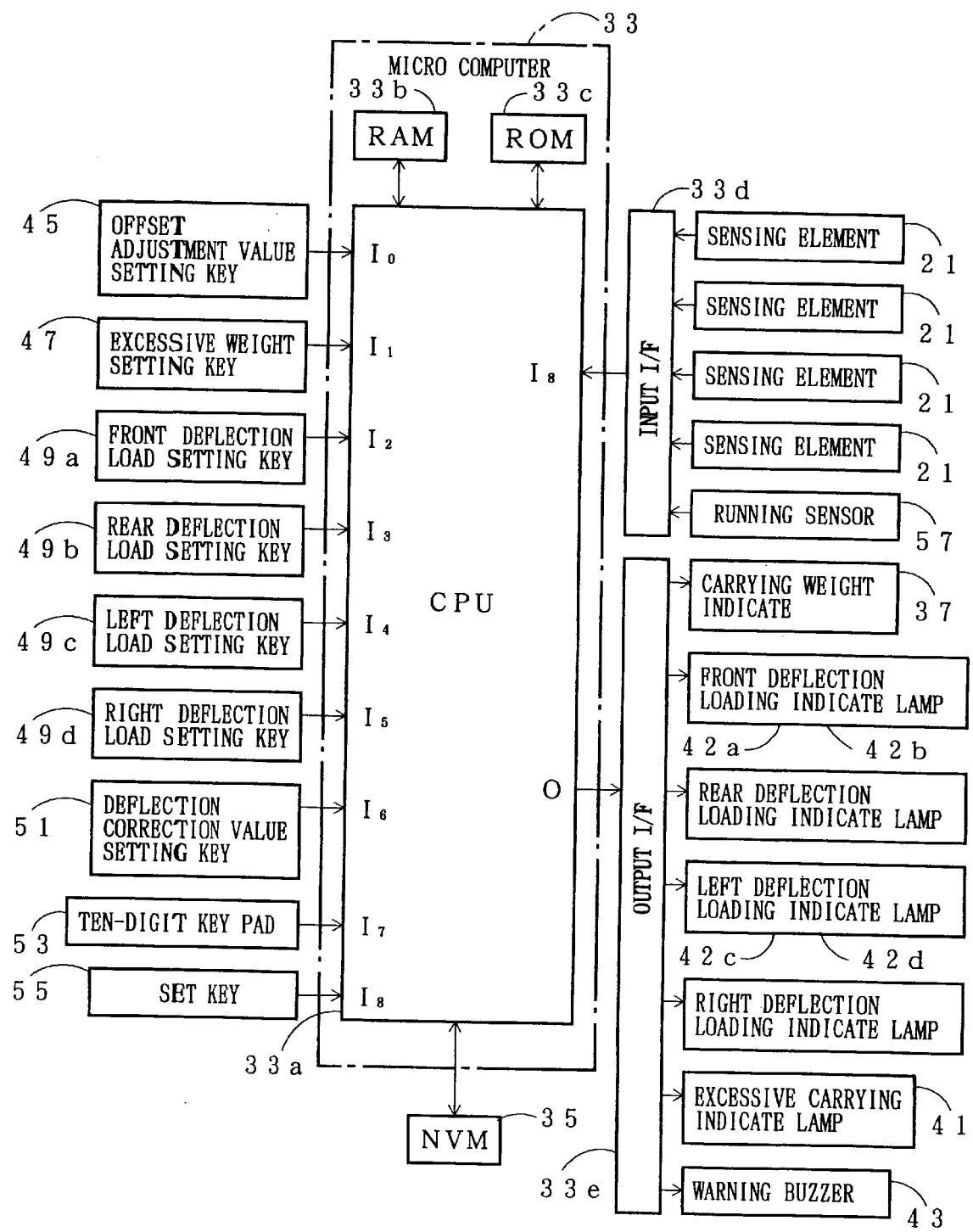
FIG. 22 is a block diagram showing the hardware configuration of a microcomputer shown in FIG. 21.
Figure 23:
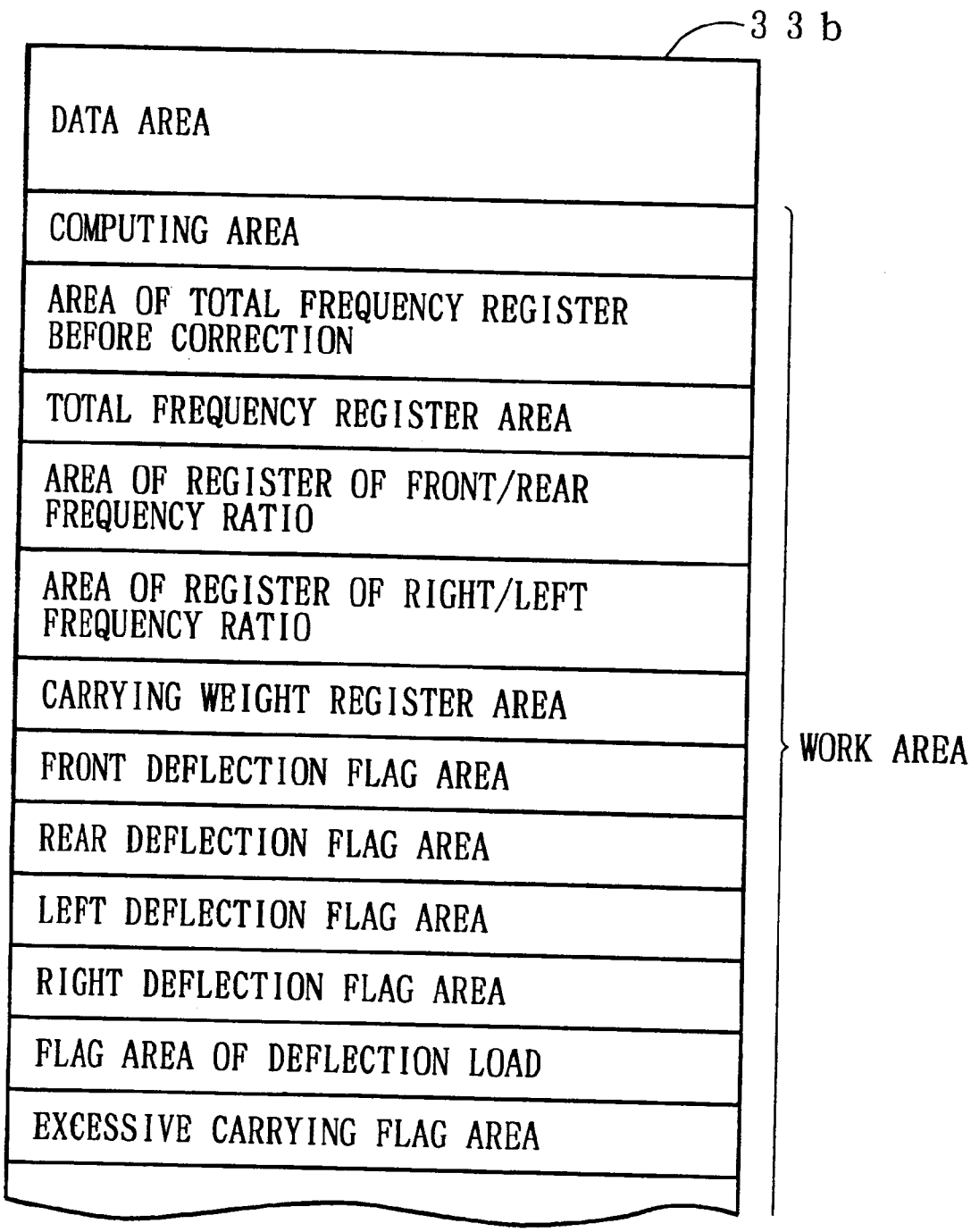
FIG. 23 is a memory area map of RAM of a microcomputer shown in FIG. 22.

The microcomputer 22 provided in the carrying weight meter 31 according to the third embodiment, as shown in FIG. 22, is different from the that of the first embodiment (FIG. 7), in that the CPU 33a is directly connected to the deflection load decision value setting keys to 49d, and deflection correction value setting key 51 as well as NVM 35 (corresponding to the correction value data holding means 35C), offset adjustment value key 45, excessive carrying weight value setting key 47, ten-digit key pad 53 and setting key 55, and front/rear and right/left deflection indicating lamps 42a to 42d are also connected to the CPU 32a through the output I/F 33d.

The microcomputer 33 according to the third embodiment is different from that of the first embodiment in structure in that the RAM 33b has work areas of an operation, a total frequency register before deflection correction, another total frequency register, a register for taking a front/rear frequency ratio, another register for taking a right/left frequency ratio and a carrying weight register and four deflection flag areas of front, rear, left and right, and flag areas of deflection load and excessive carrying. The microcomputer 33 is also different from the first embodiment in that the ROM 33c stores a control program for causing the CPU 33a to operate several kinds of processing operations unlike the ROM 33c of the first embodiment.

In the third embodiment of the carrying weight meter 31, the NVM 35 previously stores tables of the offset adjustment value and characteristic correction value for the output pulse signal from each of the sensing elements, a deflection correction value table for the total value of the frequencies of the output pulse signals from the sensing elements, weight conversion equation, excessive carrying weight value and four (front, rear, left and right) deflection decision values.

Of these storage contents, the adjustment values of the offset adjustment value table, characteristic correction tables on the characteristic correction value table and weight conversion equation are identical to the carrying weight meter 31 of the first embodiment.

Of the other data stored in the NVM 35 in the third embodiment of the carrying weight meter, the deflection correction table of the said deflection correction table area serves to correct the error between the total of the frequencies of the pulse signals actually produced from the four sensing elements 21 and that of the frequency of the pulse signals to be essentially produced by the four sensing elements 21 according to the load biased to the four sensing elements. As shown in FIG. 24, the deflection correction values Z(1, 1)–Z(n, 1), Z(1, 2)–Z(n–1, n), Z(n, n) are set for each vehicle type by the setting processing in the tare state of the vehicle.

The deflection correction table is formed in a matrix shape having those corresponding to areas of the platform 7 sectioned at regular intervals two-dimensionally. The area indicated by double frames of the table as shown in FIG. 24 corresponds to the area of the platform 7 at the center of gravity S above the platform frame 5 in the tare state as shown in FIG. 20(b).

The deflection correction values (1, 1)–Z (n, n) (corresponding to the correction value data) allotted to the areas of the table in the matrix shape can be acquired.

With the mass having a known weight (not shown) located at the area of the platform 7 corresponding to the allotted area of the table, the output pulse signals from the four sensing elements 21 are offset-adjusted in terms of their inherent adjustment values, and thereafter the total frequency of the four frequencies before gain correction is acquired.

Assuming that the total of the weight of the above mass and that of the vehicle 1 above the platform 5 in the tare state is applied dispersively (e.g. uniformly), the total of the frequencies of the pulse signals to be inherently produced from the respective sensing elements 21, i.e. a reference total frequency is acquired.

By dividing the above total frequency before the deflection correction by the reference total frequency, the deflection values (1, 1) to Z (n, n) to be allotted at that on the correction value table corresponding to the area on the platform 7 are acquired.

Incidentally, it should be noted that on the deflection value table, the deflection correction value Z (a, a) allotted at that of the table indicated by the double frame corresponding to the area on the platform 7 is "1".

This is because the load is uniformly applied to each of the sensing element with no deflection of load.

While the carrying weight meter 31 is used, as address pointers for specifying the deflection correction values Z (1, 1)–Z (n, n) on the deflection correction table from the total frequency before the deflection correction, front/rear frequency ratios X1 to Xn and front/rear frequency ratios Y1 to Yn listed outside the table of FIG. 24.

The front/rear frequency ratios Y1 to Yn are values obtained by dividing the total of the frequencies of the pulse signals produced from the front two sensing elements of the platform 7 by the total frequency before the deflection correction. These two frequencies are selected from the frequencies of the output pulse signals of the sensing elements after offset adjustment and characteristic correction which are computed in acquiring the deflection correction values Z (1, 1) to Z(n, n) at the respective areas of the table.

Likewise, the front/rear frequency ratios X1–Xn are values obtained by dividing the total of the frequencies of the pulse signals produced from the two left sensing elements of the platform 7 by their total frequency after deflection correction.

It should be noted that the branch numbers 1–n of the right/left frequency ratios X1–Xn and those of the front/rear ratios Y1–Yn represent the positions of the areas of the platform 7 and the corresponding positions on the deflection correction value table, but not large-small relation.

Further, the front deflection load decision value serves to decide that the load deflects towards the front side of the vehicle 1 when the front/rear frequencies Y1–Yn are lower than this value.

Likewise, the rear deflection load decision value serves to decide that the load deflects towards the rear side of the vehicle 1 when the front/rear frequencies Y1–Yn are lower than this value. The left deflection load decision value serves to decide that the load deflects towards the left side of the vehicle 1 when the front/rear frequencies X1–Xn are lower than this value. The right deflection load decision value serves to decide that the load deflects towards the right side of the vehicle 1 when the longitudinal frequencies X1–Xn are lower than this value.

In this embodiment, by the processing of setting in the tare state of the vehicle 1, each of the front and left deflection decision values can be set for each 1% in the range of 51% to 60%, and each of the rear and right deflection decision values can be set for each 1% in the range of 40% to 49%.

Now referring to the flowchart of FIGS. 25 to 27, an explanation will be given of the processing performed by the CPU 33a in accordance with the control program stored in the ROM 33c.

When power for the load measuring device 31 is turned on by initial turn-on of an accessory ACC switch (not shown) of the vehicle, the microcomputer 33 is actuated to start the program. Then, CPU 33a performs initial setting in accordance with the main routine shown in FIG. 25 (step SB1).

At the initial setting, the storage value of each area of the total frequency register, front/rear frequency ratio register, right/left frequency ratio register and carrying weight register of the RAM 33b is zero-reset, and the flags F1 to F6 of the four (front, rear, left and right) deflection flag areas, and the flag areas of deflection load and excessive carrying are set for zero.

Instep SB3, decision is made whether or not there is a requirement of mode setting by operation of the offset adjustment value setting key 45, excessive carrying weight value setting key 47, front, rear, left and right deflection load decision setting keys 49a to 49d, and deflection correction value setting key 51.

If step SB3 is "No", the programming routine proceeds to step SB7 described later. If step SB3 is "Yes", it proceeds to step SB5 for the setting processing.

Figure 27:
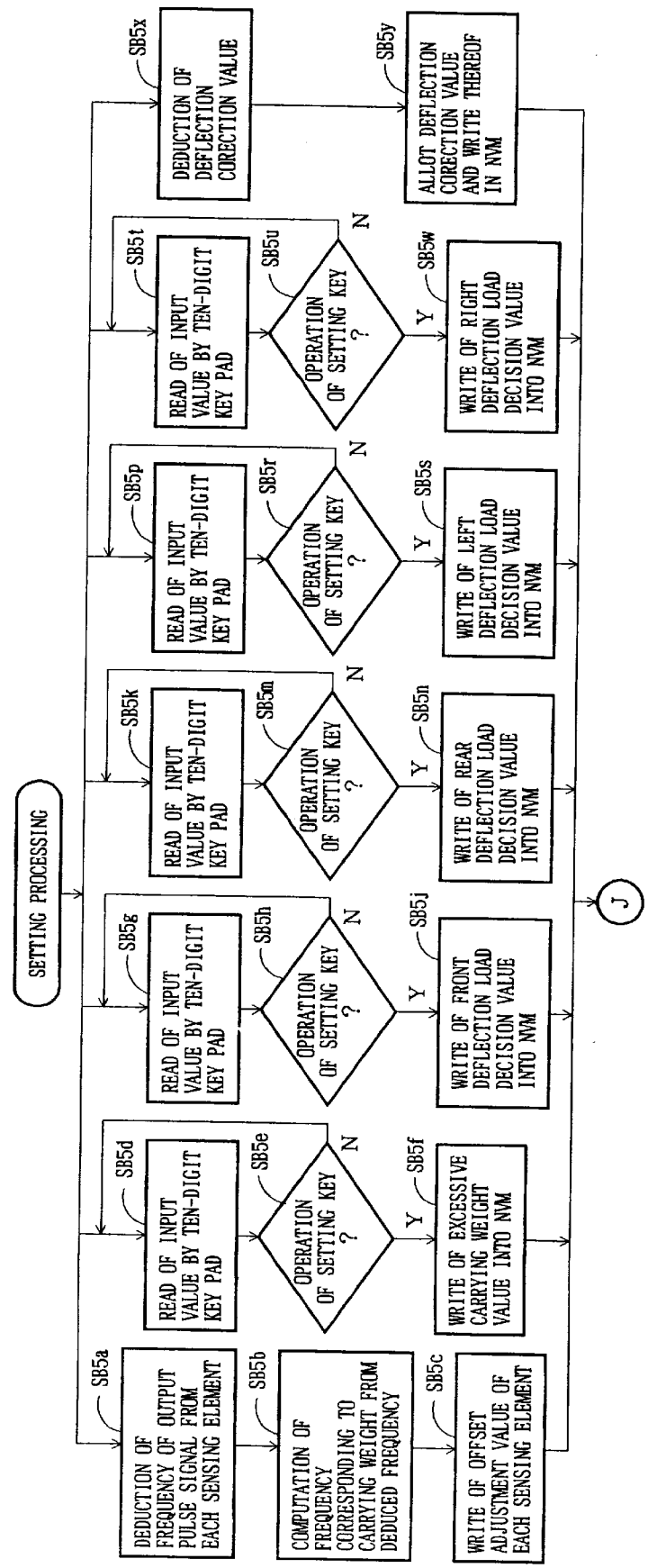
FIG. 27 is a flowchart showing the subroutine of the setting processing shown in FIG. 25.

In the setting processing, as seen from the flowchart of FIG. 27, decision is made from which of the offset adjustment key 45, excessive weight value setting key 47, front deflection load decision value 49a, rear deflection load decision value 49b, left deflection load decision value 49c and left deflection load decision value 49d, the request has come.

In step SB5a to which the processing proceeds when the offset adjustment value setting key 45 has been operated, with the vehicle 1 being in the tare state, the frequency of the pulse signal inputted from each of the sensing elements through the input interface 33d is deduced. In step SB5b, the reference frequency of 200 Hz at the time of carrying weight=0 ton is reduced from the deduced frequency of the output pulse signal from each sensing element 21 to acquire the frequency corresponding to the carrying weight. These computations are carried out in the operation area of the RAM 33b.

The four computed frequencies computed by step SB5b are inverted in their polarity (+, −) and these frequencies with the inverted polarities are stored in the NVM 35 as the offset adjustment values for the sensing elements 21 (step SB5c). The processing returns to step SB3 in the main routine of FIG. 25.

In step SB5d to which the processing proceeds when the excessive carrying weight setting key 47 has been operated, an input value by the ten-digit key pad 53 is read, and thereafter, decision is made on whether or not the setting key 55 has been operated (step SB5e).

If step SB5e is "No" (the setting key 55 has not been operated), the processing returns to step SB5d. If step SB5e is "Yes" (the setting key 55 has been operated), the input value read in step SB5d is stored in the NVM 35 as the reference value for decision of the excessive weight carrying (step SB5f). The processing returns to step SB3 in the main routine of FIG. 25.

In step SB5g to which the processing proceeds when the front deflection load decision value setting key 49a has been operated, an input value by the ten-digit key pad 53 is read, and thereafter, decision is made on whether or not the setting key 55 has been operated (step SB5h).

If step SB5h is "No" (the setting key 55 has not been operated), the processing returns to step SB5g. If step SB5h is "Yes" (the setting key 55 has been operated), the input value read in step SB5g is stored in the NVM 35 as the reference value for decision of the front deflection for the excessive weight carrying (step SB5j). The processing returns to step SB3 in the main routine of FIG. 25.

Also when the rear, left and right deflection decision value setting keys 49b to 49d have been operated, like when the front deflection decision value setting key 49a has been operated, in steps SB5k, SB5m and SB5n; and steps SB5p, SB5r and SB5s; and steps SB5t, SB5u, and SB5j, the same processing as steps SB5g to SB5j is performed. The input values are stored in the NVM 35 as the reference values for decision of the rear, left and right deflection. Thereafter, the processing returns to step SB3 in the main routine.

In step SB5x to which the processing proceeds when the deflection correction value setting key 51 has been operated, with the vehicle 1 in the tare state, the correction values Z (1, 1)–Z (n, n) to be allotted to the respective areas of the deflection correction value table will be computed in the operation area using the mass having a known weight.

The deflection correction values (1, 1)–Z (n, n) thus acquired are allotted to the corresponding areas of the deflection correction value table. This operation is repeated until these correction values are allotted to all the areas of the table. The allotted correction values are stored in the NVM 35 (step SB5y). Thereafter, the processing is returned to step SB3 in the main routine.

The allotment of the deflection correction values can be performed by operating the setting key 55 in a stationary state of the vehicle 1 while moving the location of the mass of the known weight in the order of the areas on the platform 7 corresponding to the address pointers of X1, Y1–Yn, Y1–X1, Y2–Xn, Y2–X1, Yn–Xn and Yn on the deflection correction value table.

In this case, therefore, the deflection correction value setting key 51 and the setting key 55 constitute the input setting means B.

Instep SB7 to which the processing proceeds when there is no requirement of setting the mode in step SB3, the frequency of the pulse signal produced from each sensing element 21 is deduced. Subsequently, in step SB9, decision is made whether or not a running pulse has been inputted from the running sensor 57. If step SB9 is "Yes", after standby for a prescribed time Tw sec (step SB1), the processing returns to step SB3 in the main routine.

On the other hand, if step SB9 is "No" (no running pulse has been inputted from the running sensor 57), decision is made on whether or not each of the output pulse signal from each sensing element 21 is within a range of 30 Hz to 700 Hz adjustable in terms of the offset adjustment value (step SB13).

If step SA1B is "No" (at least one of the output pulse signals from the sensing elements 21 has a frequency outside the range of 30 Hz to 700 Hz), an error indication such as alphabet "E. Lo" is made on the carrying weight indicating area 37 (step SB15). The processing routine proceeds to step SB3. On the other hand, if step SA15 is "Yes" (all the frequencies of the output pulse signals from the sensing elements 21 are within the range of 30 Hz to 700 Hz), the processing routine proceeds to step SB17.

In step SB17, the frequency of the pulse signal from each sensing element 21 deduced in step SB7 is offset-adjusted in the computing area in terms of the offset adjustment value stored in the NVM 35, and in step SB19, the frequency of the pulse signal thus obtained is characteristic-adjusted in the computing area in terms of the characteristic adjustment value in the NVM 35.

The total of the pulse signal frequencies from the sensing elements 21 thus obtained, i.e. the total frequency before deflection correction is computed (step SB21). Further, in step SB23, the storage value of the total frequency register area before deflection correction of the RAM 33*b* is updated to the total frequency before deflection correction computed instep SB21.

In the operation area, the front/rear frequency ratios Y1 to Yn are computed by dividing the total of the frequencies of the pulse signals from the two front sensing elements on the platform 7 by the storage value in the total frequency register area before deflection correction to acquire the above longitudinal frequency ratios Y1 to Yn (step SB25). In step SB27, the storage value of the right/left frequency ratio register area in the RAM 33*b* is updated to the front/rear frequency ratios Y1 to Yn computed in step SB25.

Further, in the operation area, the right/left frequency ratios X1 to Xn are computed by dividing the total of the frequencies of the pulse signals from the two left sensing elements on the platform 7 by the storage value in the total frequency register area before deflection correction to acquire the above right/left frequency ratios X1 to Xn (step SB29). In step SB31, the storage value of the right/left frequency ratio register area in the RAM 33*b* is updated to the right/left frequency ratios X1 to Xn computed in step SB29.

Next, decision is made on whether or not the storage value of the front/rear frequency ratio register area is beyond the front deflection load decision value in the NVM 35. If step SB33 is "Yes", the flag F1 at the front flag area in the RAM 33*b* is set for '1' and the processing proceeds to step SB37. If step SB33 is 'No', the routine skips over step SB35 to proceed to step SB37.

Next, in step SB37, decision is made on whether or not the storage value of the front/rear frequency ratio register area is below the rear deflection load decision value in the NVM 35. If step SB33 is "Yes", the flag F2 at the rear flag area in the RAM 33*b* is set for '1' (step SB39) and the processing proceeds to step SB41. If step SB37 is 'No', the routine skips over step SB39 to proceed to step SB41.

In step SB41, decision is made on whether or not the storage value of the right/left frequency ratio register area is beyond the left deflection load decision value in the NVM 35. If step SB41 is "Yes", the flag F3 at the left flag area in the RAM 33*b* is set for '1' and the routine proceeds to step SB45. If step SB41 is 'No', the routine skips overstep SB43 to proceed to step SB45.

In step SB45, decision is made on whether or not the storage value of the right/left frequency ratio register area is below the right deflection load decision value in the NVM 35. If step SB45 is "Yes", the flag F4 at the right flag area in the RAM 33*b* is set for '1' and the processing proceeds to step SB49. If step SB45 is 'No', the routine skips over step SB47 to proceed to step SB49.

Figure 26:
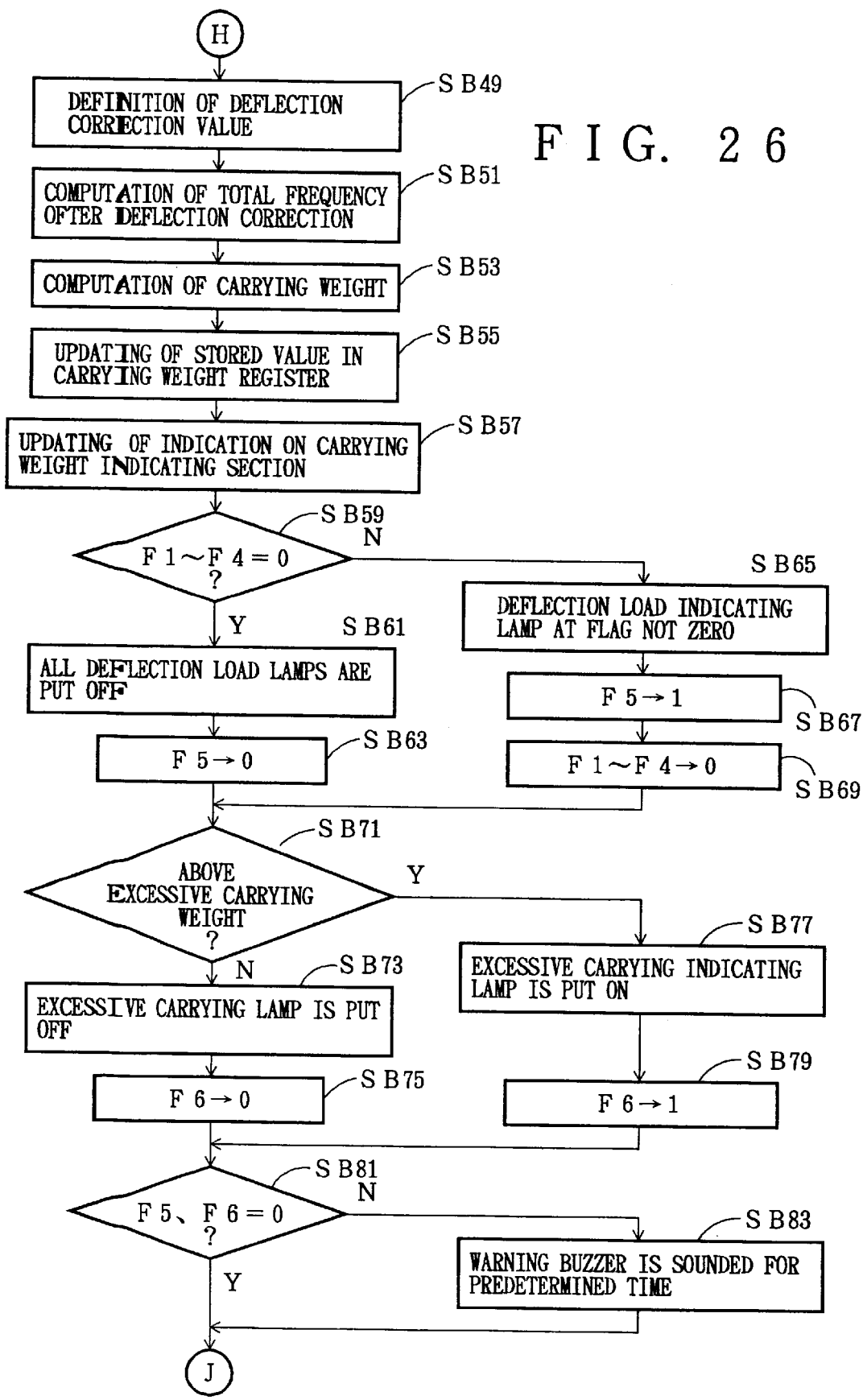

In step SB49, as seen from the flowchart of FIG. 26, the deflection correction values Z(1, 1)–Z (n, n) to be used for computing the carrying weight are specified using from the deflection correction value table of the NVM 35 using the address pointers of storage values Y1–Yn of the front/rear frequency ratio register area and those X1–Xn of the right/left frequency ratio register area using the address pointers of storage values Y1–Yn of the front/rear frequency ratio register area and those X1–Xn of the right/left frequency ratio register area.

In step SB51, using the deflection correction values Z(1, 1)–Z (n, n) thus specified, in the operation area, the storage value of the total register area before deflection correction is corrected to acquire the total frequency after deflection correction.

In step SB53, in the operation area, the carrying weight is computed from the total frequency after correction computed in step SB51 using the weight conversion equation stored in the NVM 35. Instep SB55, the storage value of the carrying weight register area of the RAM 33*b* is updated to the carrying weight computed in step SB53. Further, in step SB57, the indication of the carrying weight indicating area 37 is updated to the carrying weight stored in the carrying weight register area.

Next, in step SB59, decision is made on whether or not all the flags F1 to F4 of the front, rear, left and right flag areas are '0'. If step SB59 is "Yes", all the deflection load indicating lamps 42*a* to 42*d* are put off (step SB61). Subsequently, the flag F5 of the deflection load flag area is set at '0' (step SB63). Thereafter, the processing proceeds to step SB71.

On the other hand, if step SB59 is "No" (at least one of the flags F1 to F4 is not '0'), the deflection load indicating lamp(s) corresponding to the flag(s) which is not '0' is put on (step SB65). The flag F5 of the deflection load flag area in the RAM 33*b* is set at '0' (step SB67). Subsequently, the all the flags F1 to F4 of the front, rear, right and left flag areas are set at '0' (step SB69). Thereafter, the processing proceeds to step SB71.

In step SB71, decision is made on whether or not the carrying weight stored in the carrying weight register area in step SB55 is beyond the carrying weight value stored in the NVM 35. If step SB71 is "No", the excessive carrying indicating lamp 41 is put off (step SB73). Subsequently, the flag F6 of the excessive carrying flag area is set at "0", (step SB75). Thereafter, the processing proceeds to step SB81. If step SB71 is "Yes", the excessive carrying indicating lamp 41 is put on (step SB77). Subsequently, the flag F6 of the excessive flag area of the RAM 33*b* is set at '1' (step SB79). The processing proceeds to step SB81.

In step SB81, decision is made on whether or not both the flags F5 and F6 of the flag areas of deflection load and excessive carrying. If step SB81 is "Yes" (at least one of both is not '0'), after the warning buzzer 43 is sounded for a prescribed time (step SB83), the processing returns to step SB3. If step SB81 is "No" (both are '0') the processing directly returns to step SB3.

Figure 25:
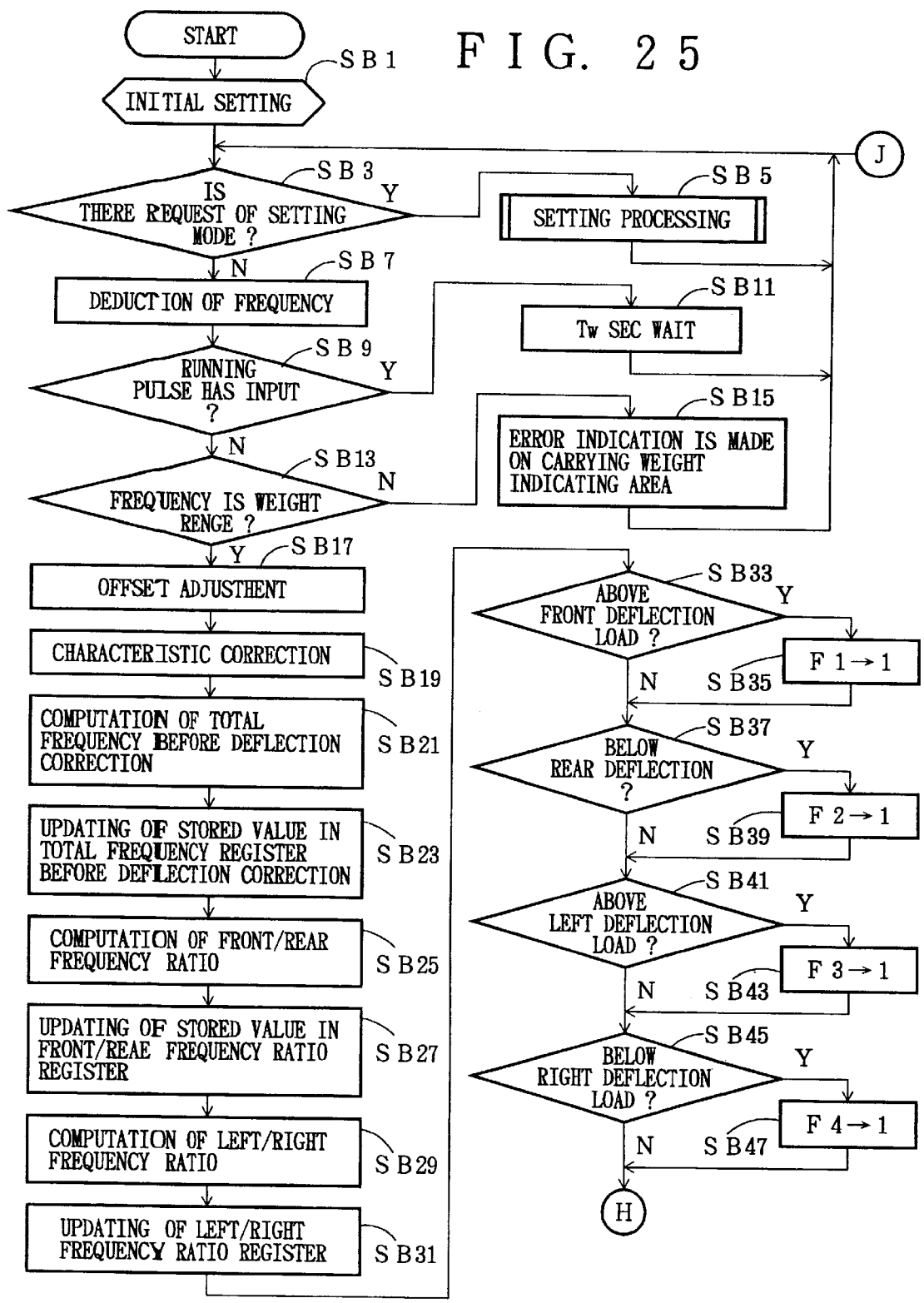
FIGS. 25 and 26 are flowcharts of the processing carried out by CPU in accordance with a control program stored in the ROM of a microcomputer shown in FIG. 22.

As described above, in the embodiment, the weight computing means 33T defined in the claims appended to this specification includes steps SB3 and SB21 in the flowchart of FIG. 25; the deflection load detecting means 33K includes steps SB21 to SB31; the weight sensor level correcting means 33L includes steps SB17 and SB19 in FIG. 25, deflection correction value setting key 51 and setting key 55; and the deflection load orientation decision means 33M includes steps SB33 to SB47 in FIG. 25.

Further, in this embodiment, the excessive carrying state deciding means 33N includes steps SB71, SB75 and SB79, and the excessive carrying state informing means C includes the excessive carrying indicating lamp 41 and the warning buzzer 43.

An explanation will be given of the operation of the third embodiment of the carrying weight meter 31 having the above structure.

When the load such as baggage is placed on the platform 7, the pulse signals having the frequencies corresponding to the loads applied to the sensing elements 21 are produced from therefrom, respectively. Then, where the vehicle 1 is at a standstill so that no running pulse is inputted from the running sensor 57, the frequencies of the pulse signals from the sensing elements 21 are offset-adjusted and characteristic-corrected and totaled to acquire the total frequency before deflection correction.

On the basis of the rate of the total frequency of the pulse signals from the front two sensing elements to the above total frequency before deflection correction, the front/rear frequency ratios Y1 to Yn are acquired. Likewise, on the basis of the rate of the total frequency of the pulse signals from the left two sensing elements to the above total frequency before deflection correction, the right/left frequency ratios X1 to Xn are acquired.

When it is decided from these front/rear frequency ratios Y1 to Yn and right/left frequency ratios X1 to Xn that the load such as the platform 7 on the platform frame 5 and the baggage thereon is deflected front, rear, left and right from the center of gravity S and hence beyond (i.e. front and left) the front, rear, right and left deflection load values stored in the NVM 35 or below (i.e. rear and right) them, the corresponding front, rear, left and right deflection indicating lamps 42a to 42d are put on.

The total frequency before deflection correction is corrected by the deflection correction values Z(1, 1)–Z(n, n) on the NVM 35 specified by the front/rear frequency ratios Y1–Yn and the right/left frequencies X1–Xn and becomes a value with the error due to deflection load removed. It is converted into the carrying weight by the weight conversion equation stored in the NVM 35. The carrying weight is indicated on the carrying weight indicating area 37.

Further, when the carrying weight is beyond the excessive carrying weight stored in the NVM 35, the excessive weight carrying indicating lamp 41 is put on. When the excessive carrying weight indicating lamp 41 and at least one of the front, rear, right and left deflection indicating lamps 42a to 42d are put on, the warning buzzer 43 is sounded for a prescribed time, thereby informing a driver of that the vehicle is in the deflection load state or excessive weight carrying state.

The above operation is not performed while the vehicle 1 is running or the running pulse from the running sensor 57 is inputted, so that the indication on the carrying weight indicating area 37 while the vehicle 1 is running and the blinking state of the excessive carrying indicating lamp 41 remain in the previous state when the vehicle 1 is at a standstill.

Thereafter, when the vehicle 1 stops and inputting of the running pulse is ceased, according to the indication of the carrying weight indicating area 37 or the blinking state of the front, rear, left and right deflection load indicating lamps 42a to 42d and excessive carrying indicating lamp 41 becomes to change.

In this way, in computing the carrying weight of the vehicle 1 on the basis of the total of the frequencies of the pulse signals outputted from the four (front, rear, left and right) sensing elements, the presence or absence of the deflection toward front, rear, left and right of the vehicle 1 is decided on the basis of the frequency of the pulse signal from each sensing element, the above total frequency is corrected by the deflection correction values specified in accordance with the decided deflection.

For this reason, even if there is an error between the weight computed from the total of the frequencies of the pulse signals from the four sensing elements and the actual carrying weight, the error is canceled by correction using the deflection correction values, thus computing an accurate carrying weight.

In accordance with this embodiment, the deflection is decided on the basis of the front/rear frequency ratios Y1–Yn and the right/left frequency ratios X1–Xn, and the these ratios are used as the address pointers for the correction value table 35 of the NVM 35. For this reason, the deflection correction values used for the correction can be easily specified from the correction value table.

Further, differences among the offset amounts and characteristics of the sensing elements can be canceled by their offset adjustment and characteristic correction. Without being influenced from them, the carrying weight can be computed more accurately.

In addition, since the computed carrying weight can be indicated on the carrying weight indicating area 37, it can be not only left as recorded information, but also be used as a reference when the driver for a vehicle 1 is informed of a present correct carrying weight and the carrying weight is adjusted as necessity requires.

Further, in accordance with this embodiment, since deflection correction values can be stored on the deflection correction table of the NVM 35 by operating the deflection correction value setting key 51 and setting key 55, the contents of the deflection correction value table can be optionally set according to the type of a vehicle and different characteristics of the sensing elements 21.

Further, in accordance with this embodiment, the direction of deflection of load to the vehicle 1 is decided on the basis of the frequencies of the pulse signals from the four sensing elements 21, and one of the deflection load indicating lamps 42a to 42d is put on in accordance with the direction thus decided. This can be used as a reference as necessity requires when the degree of loading is adjusted. In addition, the front/rear frequency ratios Y1 to Yn and right/left frequency ratios X1 to Xn can be used to decide the orientation of the deflection of load.

Schematic configuration of the third aspect of the carrying weight computing device according to the present invention.

Figure 28:
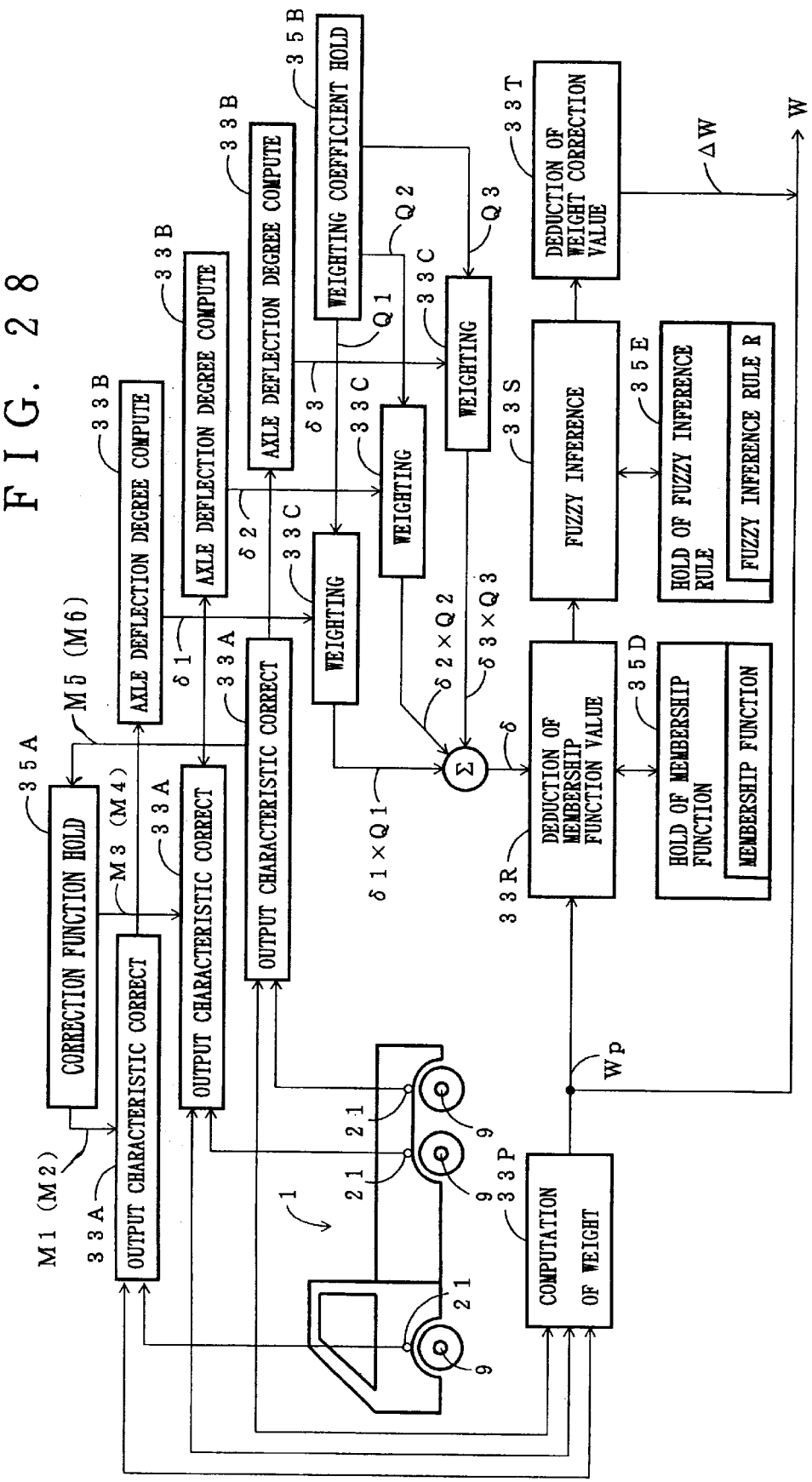
FIGS. 28 and 29 are a basic view of a third aspect of the carrying weight computing apparatus according to the present invention and a front view of the fourth embodiment of the carrying weight meter therefor.

Now referring to FIG. 28, an explanation will be given of the schematic configuration of the third aspect of the carrying weight computing apparatus according to the present invention.

Like the deflection degree computing apparatus and the first aspect of the carrying weight computing apparatus according to the present invention, this carrying weight computing apparatus will be explained as regards the vehicle 1 having three (front, intermediate and rear) axles.

This carrying weight computing apparatus is an apparatus in which the deflection degree $\delta$ in the vehicle width direction of the load applied to the vehicle 1 is computed on the basis of the outputs from a plurality of sensors 21 at least spaced from each other in the vehicle width direction, and the carrying weight W of the vehicle 1 can be computed on the basis of the deflection degree $\delta$ of the load. Specifically, as seen from FIG. 28, this carrying weight computing apparatus includes a weight computing means 33P for computing the provisional carrying weight Wp of the vehicle 1 on the basis of the outputs from the weight sensors 21, a membership function value deducing means 33R for deducing the membership function values corresponding to the provisional carrying weight Wp and the deflection degree $\delta$ on the basis of them, a fuzzy inferring means 33S for executing the fuzzy inference for the membership function value on the basis of the fuzzy inference rule R for fuzzy-correcting the above provisional carrying weight Wp, and a weight correction value deducing means 33T for deducing the corrected value $\Delta W$ of the provisional carrying weight Wp on the basis of the inference result of the fuzzy inference means 33S, whereby the provisional carrying weight Wp is corrected in terms of the corrected value $\Delta W$, thus computing the carrying weight W of the vehicle 1.

In the carrying weight computing apparatus having such a configuration, the fuzzy processing is executed for the provisional carrying weight. Specifically, the membership function values corresponding to the provisional carrying weight Wp and deflection degree δ are subjected to the fuzzy inference by the fuzzy inference means 33S, the corrected value ΔW of the provisional carrying weight Wp is deduced on the basis of the inference result by the weight corrected value deducing means 33T, and the provisional carrying weight Wp is corrected in terms of the corrected value ΔW. Thus, taking into consideration that the output from each weight sensor 21 varies under the influence of the deflection degree δ, the carrying weight of the vehicle 1 can be computed accurately on the basis of the outputs from the plural weight sensors 21 of the vehicle 1.

This carrying weight computing apparatus further a membership function holding means 35D for holding a membership function X for defining the membership function values corresponding to the provisional carrying weight Wp and the deflection degree δ, respectively, and a fuzzy inference rule holding means 35E for holding the fuzzy inference rule R. In this case, the above membership function values are deduced on the basis of the membership function X by the membership function deducing means 33R, and the fuzzy inference for the membership function values is made on the basis of the fuzzy inference rule R by the fuzzy inference means 33S. In addition, at least one of the membership function X and the fuzzy inference rule R is changed in accordance with the structure of the vehicle 1.

In this carrying weight computing apparatus, with the membership function X held in the membership function holding means 35D and the fuzzy inference rule R held in the fuzzy inference rule holding means 35, at least one of them is only changed according to the structure such as the number of axles of the vehicle 1 and maximum carrying weight to provide the versatility of computing the carrying weight of the vehicle having various structures.

This carrying weight computing apparatus further includes a correction function holding means 35A for holding output characteristic correction functions M1 to M6 each corresponding to the output from each weight sensor 21, which serves to correct the non-linear characteristic of each weight sensor 21 into the linear characteristic, and an output characteristic correction means 33A for correcting the output from each weight sensor 21 in terms of each of the output characteristic correction functions M1 to M6. The weight computing means 33P serves to compute the provisional carrying weight Wp on the basis of the outputs from the weight sensors 21 with their characteristics corrected by the output characteristic correcting means 33A. The membership deducing means 33R serves to deduce the membership function value corresponding to the deflection degree δ which is computed on the basis of the outputs from the weight sensors 21 with their characteristics corrected by the output characteristic correcting means 33A.

In the carrying weight computing device, the characteristic correcting means 33A correct the outputs from the weight sensors 21 in terms of the output characteristic correcting functions M1 to M6 corresponding to the weight sensors 21 so that the non-linear characteristic inclusive of hysterisis of the output from each of the weight sensors 21 is corrected into the linear characteristic. Thus, the outputs from the weight sensors 21 after correction by the output characteristic correction functions M1 to M6 are approximately equal to each other between the times of increase and decrease of load of the vehicle 1.

As compared with the case where the provisional carrying weight Wp of the vehicle 1 and membership function value are deduced on the basis of the original outputs from the weight sensors 21, the degree of coincidence of the provisional carrying weight Wp and deflection δ computed between the times of increase and decrease of the load is enhanced. Thus, accuracy of the correction value ΔW of the provisional carrying weight Wp and the carrying weight W obtained by correcting the provisional carrying weight Wp in terms of it can be improved remarkably.

In the third aspect of the carrying weight computing apparatus according to the present invention, the above weight sensors 21 are arranged on both ends in the vehicle width direction of each axle 9. This carrying weight computing apparatus further comprises an axle deflection computing means 33B, a weighting coefficient holding means 35B, and a weighting means 33C. The axle deflection computing means 33B serves to compute the axle deflections δ1 to δ3 each representative of the orientation and degree of the deflection in the vehicle width direction of the load biased on each axle 9 on the basis of the output from each weight sensor 21 corrected by the output characteristic correction means 33A. The weighting coefficients holding means 35B serves to hold the weighting coefficients Q1 to Q3 each inherent to each axle 9 corresponding to the arrangement of each axle 9 in the front/rear direction of the vehicle 1. The weighting means 33C weighs the above axle deflections δ1 to δ3 by the weighting coefficients Q1 to Q3, respectively. The membership function value deducing means 33R serves to deduce the membership function value on the basis of the deflection δ of the load which is computed by totaling the axle weighting values δ1 to δ3 for the axles 9 weighted by the weighting coefficients Q1 to Q3.

In this carrying weight computing apparatus, since the axle deflection degrees δ1 to δ3 are computed on the basis of the outputs from the weight sensors 21 whose influence by the non-linear characteristic inclusive of hysterisis has been canceled by the output characteristic correction coefficient functions M1 to M6, the orientation and degree of the deflection for each axle 9 can be computed. Further, the deflection degree δ is computed on the basis of the axle deflection values δ1 to δ3 weighted in terms of the weighting coefficient values Q1 to Q3, respectively, it can be accurately computed taking into consideration the dispersion of load applied to each axle 9 in the vehicle length direction.

Thus, the non-changablity of the computed deflection degree can be improved irrespectively with the dispersion of load in the vehicle length direction of the vehicle 1 as compared with the case of deducing the membership function without taking the dispersion of load applied to each axle 9 into consideration. Thus, the accuracy of the correction value ΔW for the provisional carrying weight Wp and hence that of the carrying weight can be remarkably improved.

Now referring to FIGS. 29 to 39, a detailed explanation will be given of the concrete configuration of the third aspect of the carrying weight computing apparatus according to the present invention described roughly.

In this carrying weight computing device, as shown in FIGS. 2(a) and 2(b), a total of six wheels 3 are provided on both right and left ends at the front, intermediate and rear positions. The six (front, intermediate and rear) wheels are supported at both ends in the vehicle width direction of the axles 9 at the front, intermediate and rear positions.

Six leaf springs 11 and shackles 15 for six brackets 13 are supported by both left and right ends of the axles 9, respectively. Each of the brackets 13 is coupled with each of shackles 15. Each of the sensing elements 21 is arranged within each of the shackle pins 17.

Figure 29:
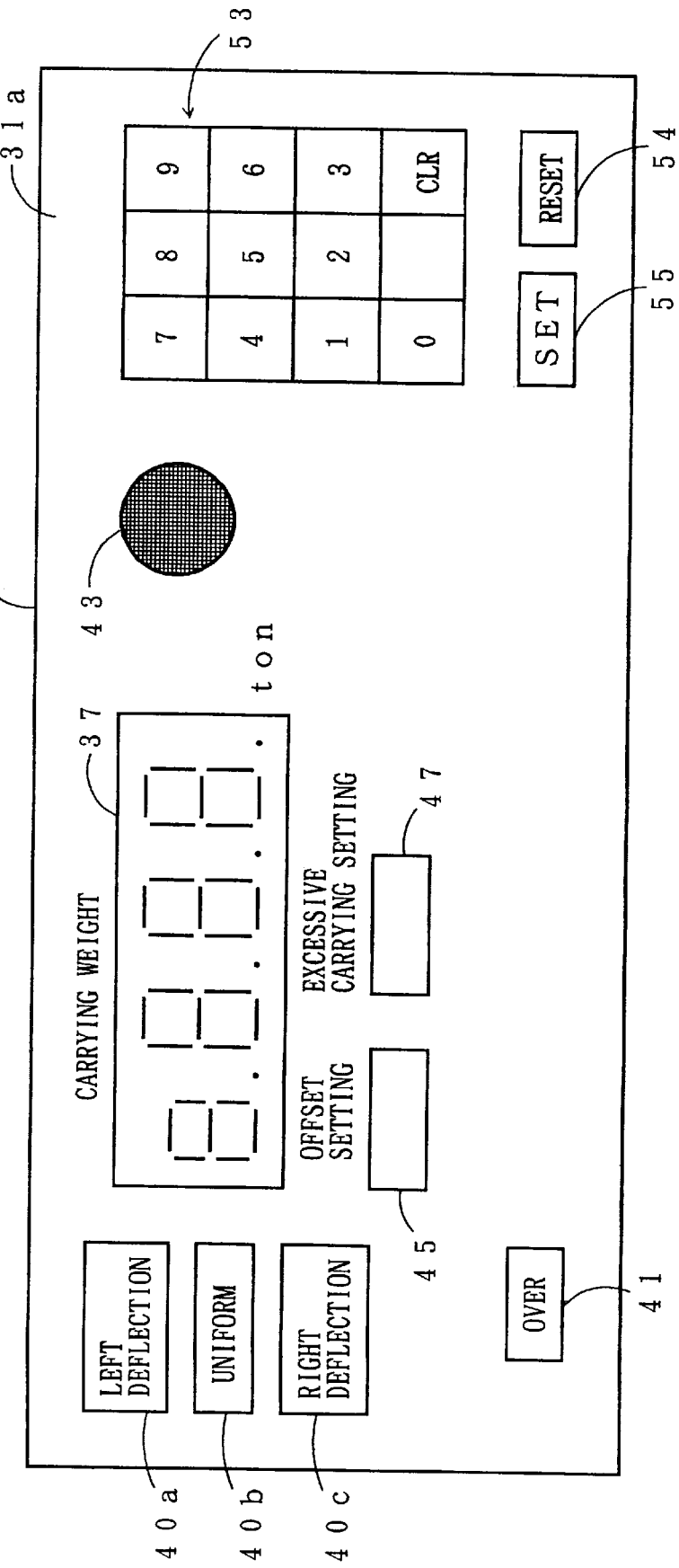
Figure 30:
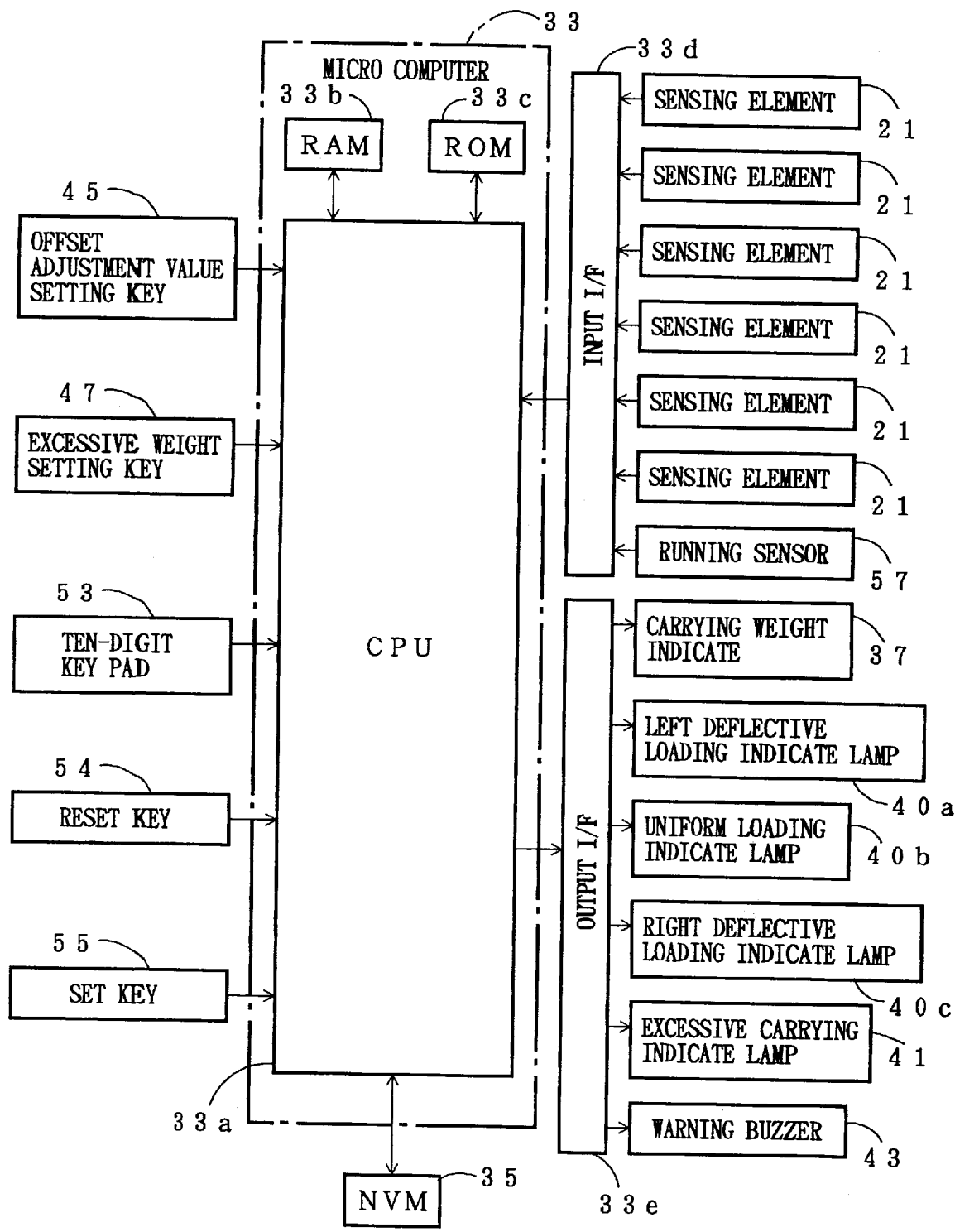
FIG. 30 is a block diagram of the hardware arrangement of a microcomputer provided in the carrying weight meter shown in FIG. 29.
Figure 31:
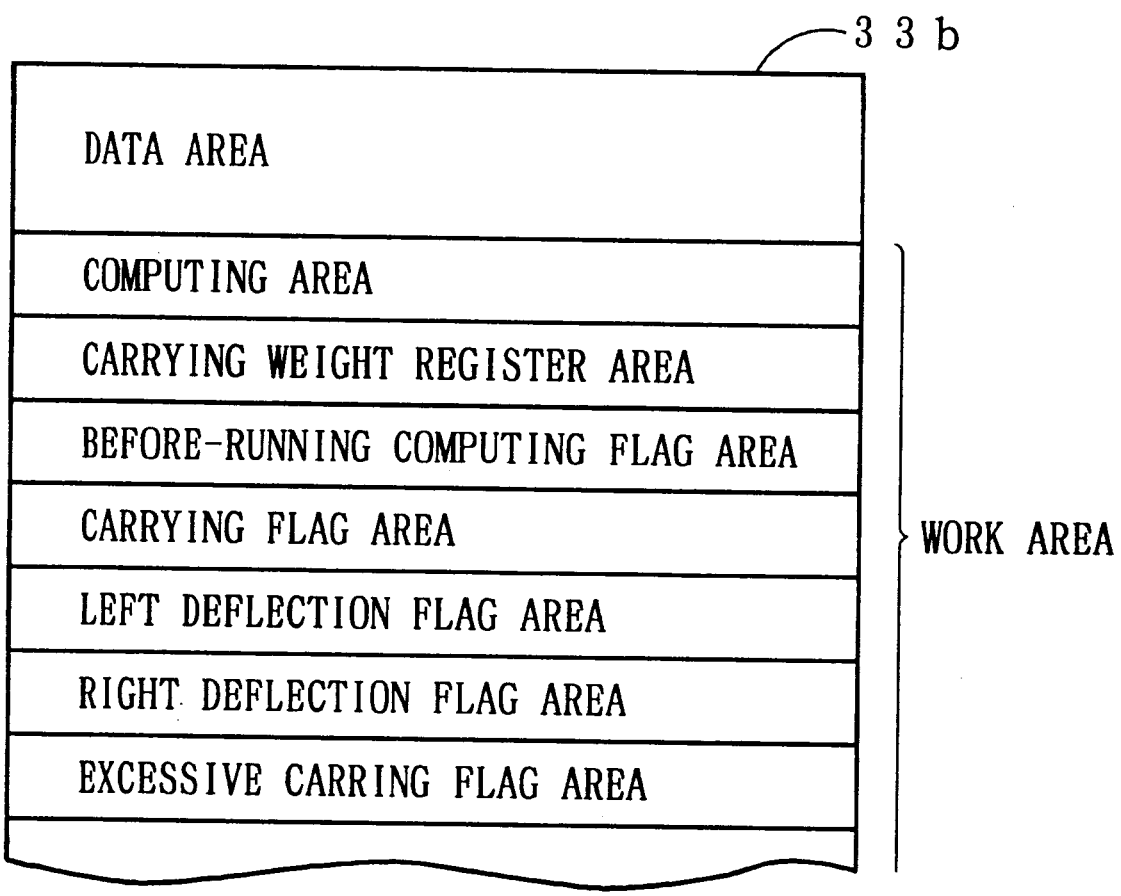
FIG. 31 is a memory area map of the RAM of the microcomputer shown in FIG. 30.

FIG. 29 is a front view of the third aspect of the carrying weight meter 31 according to the present invention. The carrying weight meter 31 is different from the first embodiment of the carrying weight meter 31 shown in FIG. 6 in that it does not include the deflection degree indicating section 40d for indicating the vehicle deflection degree δ and in the configuration of the microcomputer 33.

The configuration of the microcomputer 33 according to this embodiment is different from that in the first embodiment in that the work area of the RAM 33b includes areas of computation, carrying weight register, before-running computing flag, carrying flag, left-deflection flag, right-deflection flag and excessive flag, and the ROM33c stores a control program for causing the CPU 33a to make several kinds of processing operations which is different from that in the first embodiment.

Figure 35:
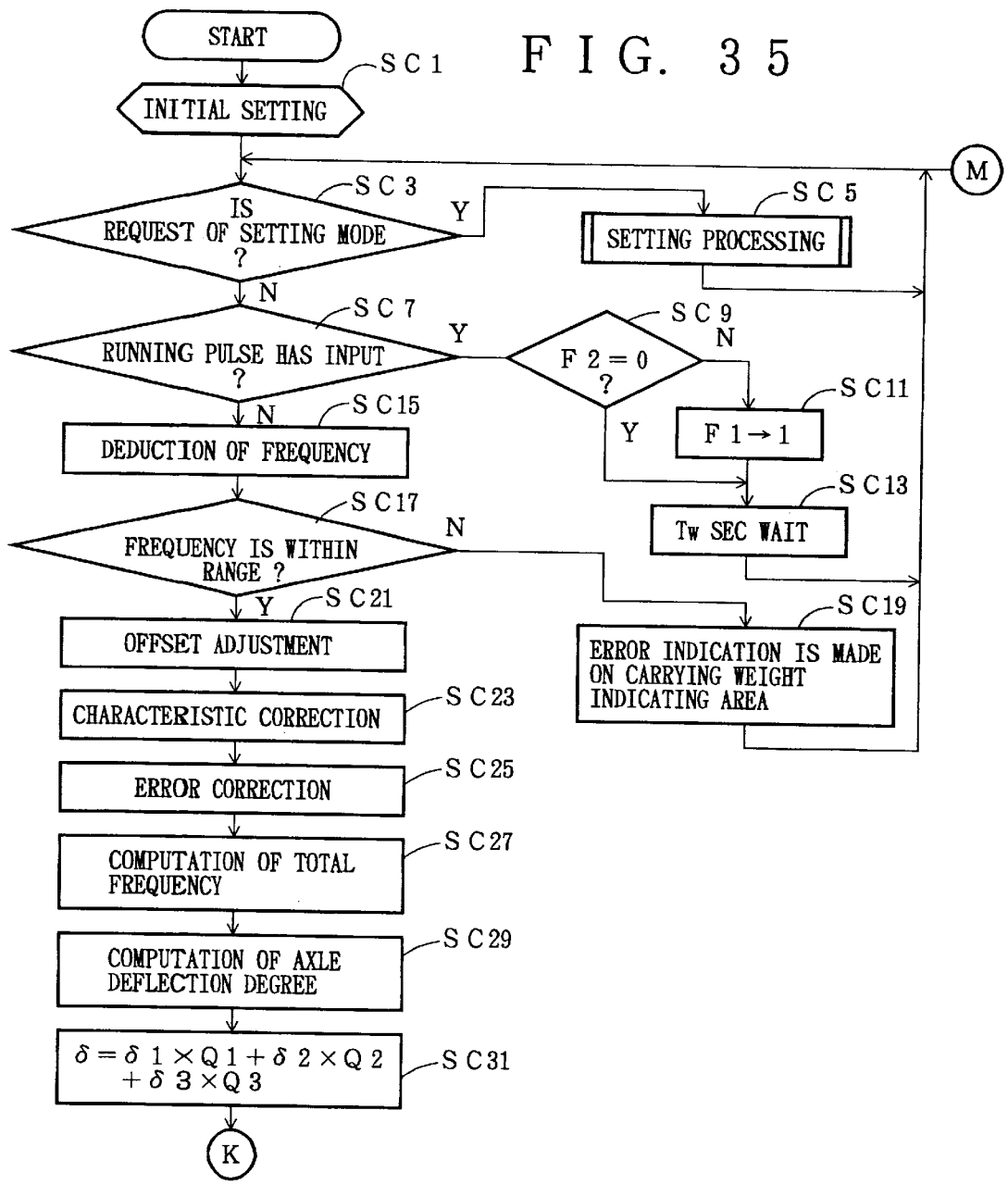
FIGS. 35 to 37 are flowcharts of the processing carried out by CPU in accordance with the control program stored in ROM of the microcomputer shown in FIG. 30.

The carrying weight meter 31 stores, in the NVM 35 shown in a block diagram of FIG. 35 which corresponds to the membership function holding means 35D, fuzzy inference rule holding means 35E, correction function holding means 35A and weighting coefficient holding means 35B, respective tables of offset adjustment values, characteristic correction values and error correction values of the output pulse signals from the sensing elements 21, weighting coefficients Q1 to Q3 inherent to the axles used for acquiring the vehicle deflection value δ, weight conversion data, excessive carrying weights and deflection decision values.

Incidentally, the above adjustment values, characteristic values, error correction values, weighting coefficients Q1 to Q3, deflection decision values and weight conversion equation are the same as in the carrying weight meter 31 according to the first embodiment, and the excessive weight value is the same as the second embodiment of the present invention.

In this embodiment, the weighting coefficients inherent to the axles 9 are set as in the second embodiment, in such a distribution that the weighting coefficient of the front axle Q1=0.1, that of the intermediate axle Q2=0.3 and that of the rear intermediate axle Q3=0.6.

The weight conversion data stored in the NVM 35 in the fourth embodiment of the carrying weight meter 31 includes two equations described below and a fuzzy inference rule base.

The first equation is to subtract 200 Hz, which is the reference frequency of the pulse signal at the time of carrying weight=0 ton, from the total frequency which is a total of the frequencies of the output pulse signals from the sensing elements 21 after the offset adjustment, characteristic correction and error correction, and multiplies the resultant frequency corresponding to the carrying weight by 0.01 ton which is the unit conversion weight for 1 Hz to compute the provisional carrying weight Wp.

The second equation is to correct the provisional carrying weight Wp using the corrected value ΔW computed using a fuzzy inference rule base described later, thereby computing the real carrying weight W.

Incidentally, if the above total frequency is 700 Hz, the provisional carrying weight Wp=5 ton is acquired from the first equation, and if it is 1200 Hz, the provisional carrying weight Wp=10 ton is acquired.

The second decimal place of the carrying weight W computed using the second equation is rounded off.

The above fuzzy inference rule is composed of a membership function and a fuzzy inference rule which are used to compute the correction value ΔW according to the provisional carrying weight Wp and vehicle deflection value δ through fuzzy inference.

Figure 32A:
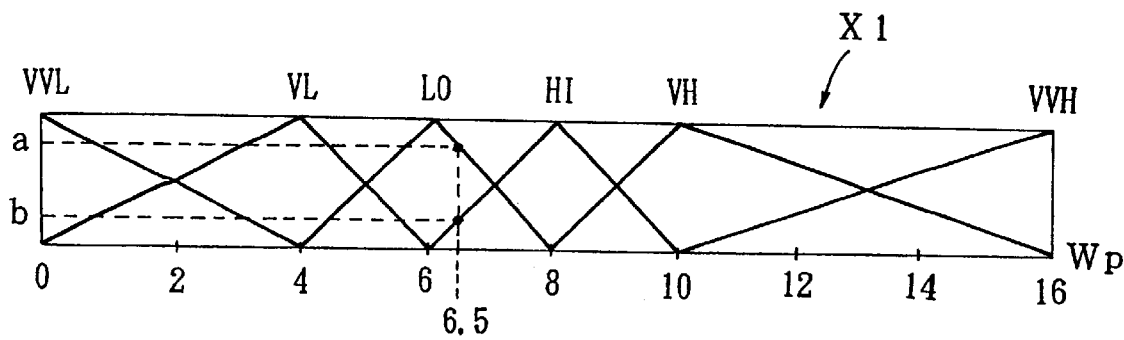
FIGS. 32A to 32C are explanation views of the membership function of carrying converted data stored in NVM of the microcomputer shown in FIG. 30.
Figure 32B:
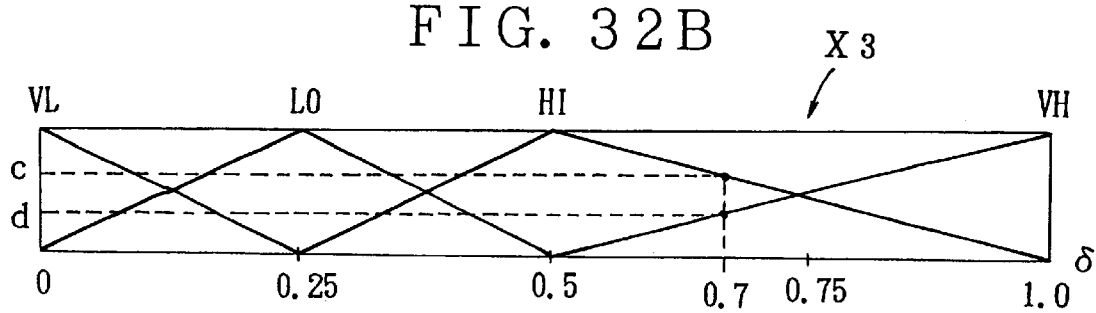
Figure 32C:
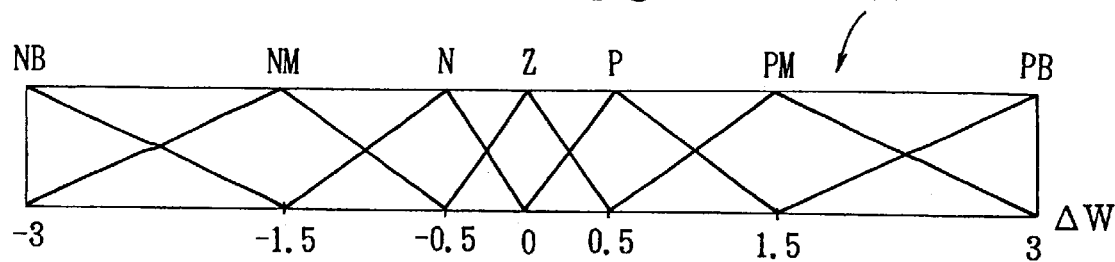

The membership function includes a membership function X1 for acquiring a membership function value X1 (Wp) of the provisional carrying weight Wp as illustrated in FIG. 32A, a membership function value X3 (δ) as illustrated in FIG. 32B and a membership function X3 for acquiring the correction value ΔW from at most four control parameters Y1, Y3, Y5 and Y7 described later, as illustrated in FIG. 32C.

The membership function X1, as illustrated in FIG. 32A, is represented by a grade in the ordinate and a fuzzy scale of six stages of VVL (Very Very Low), VL (Very Low), LOW, HIGH, VH (Very High) and VVH (Very Very High) in the abscissa.

The membership function X3, as illustrated in FIG. 32B, is represented by a grade in the ordinate and a fuzzy scale of four stages of VL, LOW, HIGH and VH, which represent the norm of the vehicle deflection value δ, in the abscissa.

The membership function X5, as illustrated in FIG. 32C, is represented by a grade of the control parameter and a fuzzy scale of seven stages of NB (Negative Big), NM (Negative Medium), N (Negative), Z (zero), P (Positive), PM (Positive Medium) and PB (Positive Big) in the abscissa. It should be noted that at most four control parameters Y1, Y3, Y5 and Y7 are given by as a result of fuzzy inference of application of both membership functions X1 (Wp) and X3 (δ) to the fuzzy inference rule.

The correction value ΔW can be acquired in such a manner that the fuzzy scales corresponding to the at most four control parameters Y1, Y3, Y5 and Y7 are developed using the membership function X5 according to their grades, the development result is applied to the rule of center of gravity to provide the center of gravity and the fuzzy scale value corresponding to the center of gravity is acquired from the abscissa.

Figures 33, 34:
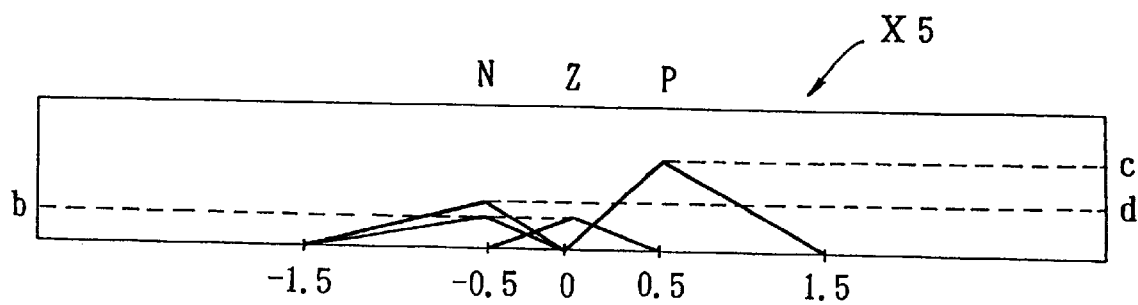
FIG. 33 is an explanation view of a table of a fuzzy inference rule of carrying converted data stored in NVM of a microcomputer shown in FIG. 30.
FIG. 34 is an explanation view of the membership function which develops the control parameter acquired from the fuzzy inference rule shown in FIG. 33 in accordance with grades to provide correction values.

The fuzzy inference rule indicated by "R" in FIG. 33 is shown as a table of rules of inferring the above seven fuzzy scales representative of the control parameter inferred in combination with the membership function value X1 (wp) and membership X3 (δ), i.e., the correction value ΔW.

The inference by the fuzzy inference rule R is executed for each combination of the membership function values X1 (Wp) and X3 (δ) where at least one of them are plural.

Incidentally, as seen from FIG. 33t the fuzzy inference may not be applied in a certain case, e.g. where the function value X1 is VVL and the function value X3 is VH.

Therefore, as a result of fuzzy inference, four control parameters Y1, Y3, Y5 and Y7 can be provided, but as the case may be, three control parameters may be provided.

The four control parameters obtained from inference by the fuzzy inference rule R are represented in the form of the fuzzy scales of the membership function X5 weighted by the lower grades of both membership function values X1 (Wp) and X3 (δ).

Now referring to the flowcharts of FIGS. 35 to 39, an explanation will be given of the processing executed by the CPU 33a along the control program stored in the ROM 33c.

When power for the load measuring device 31 is turned on by initial turn-on of an accessory ACC switch (not shown) of the vehicle, the microcomputer 33 is actuated to start the program. Then, CPU 33a performs initial setting in accordance with the main routine shown in FIG. 35 (step SC1).

At the initial setting, the storage value of each area of the total frequency register and carrying weight register of the RAM 33b is zero-reset, and the flags F1 to F5 of "computation before running", "carrying", "left deflection", "right deflection" and "excessive carrying" are set for zero (step SA1).

In step SC3, decision is made whether or not there is a requirement of mode setting by operation of the offset adjustment value setting key 45 and the excessive carrying weight value setting key 47. If step SC3 is "No", the programming routine proceeds to step SC7 described later. If step SC3 is "Yes", it proceeds to step SC5 for the setting processing.

Figure 38:
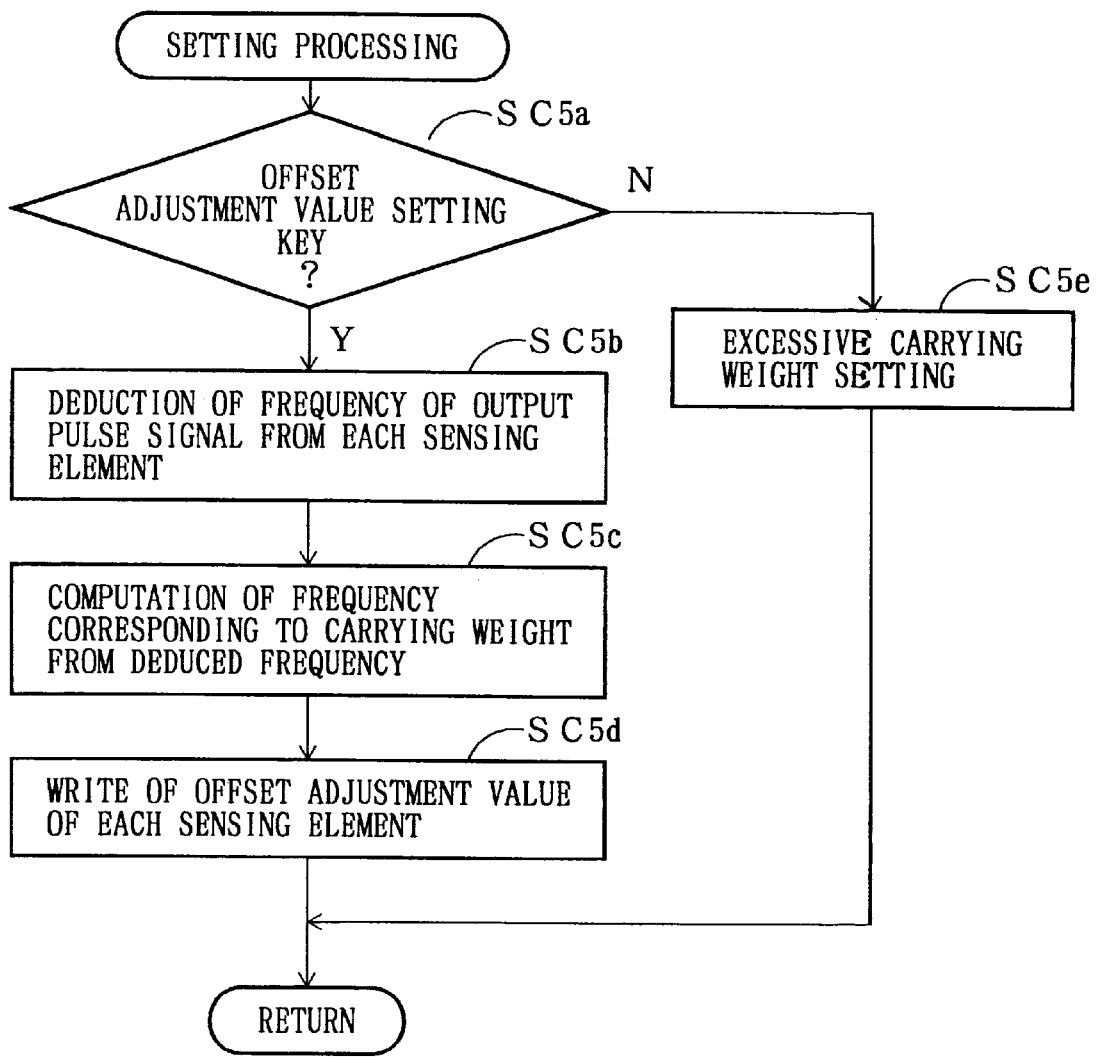
FIG. 38 is a flowchart showing the subroutine of the setting processing shown in FIG. 35.

In the setting processing, as seen from the flowchart of FIG. 38, decision is made on whether the requirement comes from the operation of the offset adjustment value setting key 45 (step SC5*a*). If step SC5*a* is "Yes", the setting processing proceeds step SC5*b* in which the frequency of the pulse signal from each sensing element 21 is acquired through the input interface 33*d* with the vehicle 1 being in a tare state.

Next, the reference frequency of 200 Hz at the carrying weight of 0 ton is subtracted from the frequency of the output pulse signal from each sensing element 21 acquired in step SC5*b*, thereby providing the frequency corresponding to the carrying weight (this computation is performed in the computation area of the RAM 33*b*) (step SC5*c*). The computed six frequencies each with the polarity of plus or minus inverted are stored, as the offset adjustment values for the sensing element 21, in the NVM 35. The setting processing is returned to step SC3 of the main routine of FIG. 35.

On the other hand, if step SC3 is "No" (the requirement does not come from the offset adjustment value setting key 45), setting of an excessive carrying value is performed (step SC5*e*).

In the processing of setting an excessive carrying value, although not explained in detail, the input value by the ten-digit key pad 53 is canceled and defined by the operation of the setting key 54. The input value is written in the NVM 35 as a weight for deciding the excessive carrying.

After step SC5*e*, the processing routine returns to step SC3.

If step SA3 is "No" (there is no requirement of setting the mode), in step SA7, decision is made on whether or not an running pulse has been input by the running sensor 57. If step SA7 is "Yes", decision is made on whether or not the flag F2 of the carrying flag area of RAM 33*b* is '0' (step SC9).

If step SC9 is "No" (flag F2 is not '0'), the flag F1 in the before-running area of RAM 33*b* is set for '1' (SC11), and thereafter, the processing proceeds to step SA13. If step SC9 is "Yes" (flag F2 is '0'), the processing skips SC11 and proceeds to step SC13 directly.

In step SC13, a prescribed time Tw sec is caused to elapse. Therefore, the processing is returned to step SC3.

Returning to SC7, if SA7 is "No" (no running pulse is inputted), the frequency of the pulse signal from each sensing element is deduced (step SC15). In step SC17, decision is made on whether or not each of the output pulse signal from each sensing element 21 is within a range of 30 Hz to 700 Hz adjustable in terms of the offset adjustment values (step SC17).

If step SC17 is "No" (at least one of the output pulse signals from the sensing elements 21 has a frequency outside the range of 30 Hz to 700 Hz), an error indication such as alphabet "E. Lo" is made on the carrying weight indicating area (step SC19). The processing routine proceeds to step SC3. On the other hand, if step SC17 is "YES" (all the frequencies of the output pulse signals from the sensing elements 21 are within the range of 30 Hz to 700 Hz), the processing routine proceeds to step SC21.

In step SC21, the frequency of the pulse signal from each sensing element 21 deduced in step SC15 is offset-adjusted in the computing area in terms of the offset adjustment value stored in the NVM 35, and in step SC23, the frequency of the pulse signal thus obtained is characteristic-adjusted in the computing area in terms of the characteristic adjustment value in the NVM 35. Further, the frequency of the pulse signal from each sensing element 21 is error-corrected in the computing area in terms of the error correction value in the NVM 35.

The output Mi from each sensing element 21 after the characteristic correction is defined by different equations according to whether the output Wi from each sensing element 21 is Wi>0 or Wi<0.

Specifically, if Wi>0, the output Mi after the characteristic correction Mi=Wi. If Wi$\leq$0, Mi=0.

Incidentally, i denotes the position number of the sensing element 21. The left sensing element 21 of the front axle 9 is i=1, the right sensing element 21 thereof is i=2, left sensing element 21 of the intermediate axle 9 is i=3, right sensing element 21 thereof is i=4, left sensing element of the rear axle 9 is i=5, and right sensing element 21 thereof is i=6.

The total of the frequencies of the pulse signals from the sensing elements is computed (step SC27). On the basis of the outputs from the sensing elements 21 after the error correction and the weighting coefficients Q1 to Q3 inherent to the axles in the NVM 35, the vehicle deflection values $\delta 1$ to $\delta 3$ are computed (step SC29).

First, the axle deflection value $\delta 1$ can be computed by the equation $\delta 1=(M1-M2)\div(M1+M2)$ using the outputs M1 and M2 from the two sensing elements 21 arranged left and right of the front axle 9.

Likewise, the axle deflection values $\delta 2$ of the intermediate axle 9 is computed by the equation $\delta 2=(M3-M4)\div(M3+M4)$ using the outputs M3 and M4 from the two sensing elements 21 arranged on the left and right sides of the intermediate axle 9. Further, likewise, the axle deflection value $\delta 3$ of the intermediate axle 9 is computed by the equation $\delta 3=(M5-M6)\div(M5+M6)$ using the outputs M3 and M4 from the two sensing elements 21 arranged left and right of the rear axle 9.

If the denominators of the respective equations, i.e. (M1+M2), (M3+M4) and (M5+M6) are zero, respectively, the corresponding axle deflection values $\delta 1$ to $\delta 3=0$.

In step SC31, the axle deflection values $\delta 1$ to $\delta 3$ for the respective axles 9 computed in step SC29 are multiplied by the weighting coefficients Q1 to Q3 inherent to the respective axles 9, respectively, and the weighted axle deflection values $\delta 1 \times Q1$, $\delta 2 \times Q2$ and $\delta 3 \times Q3$ are totaled to provide the above vehicle deflection value d (step SC31).

Figure 36:
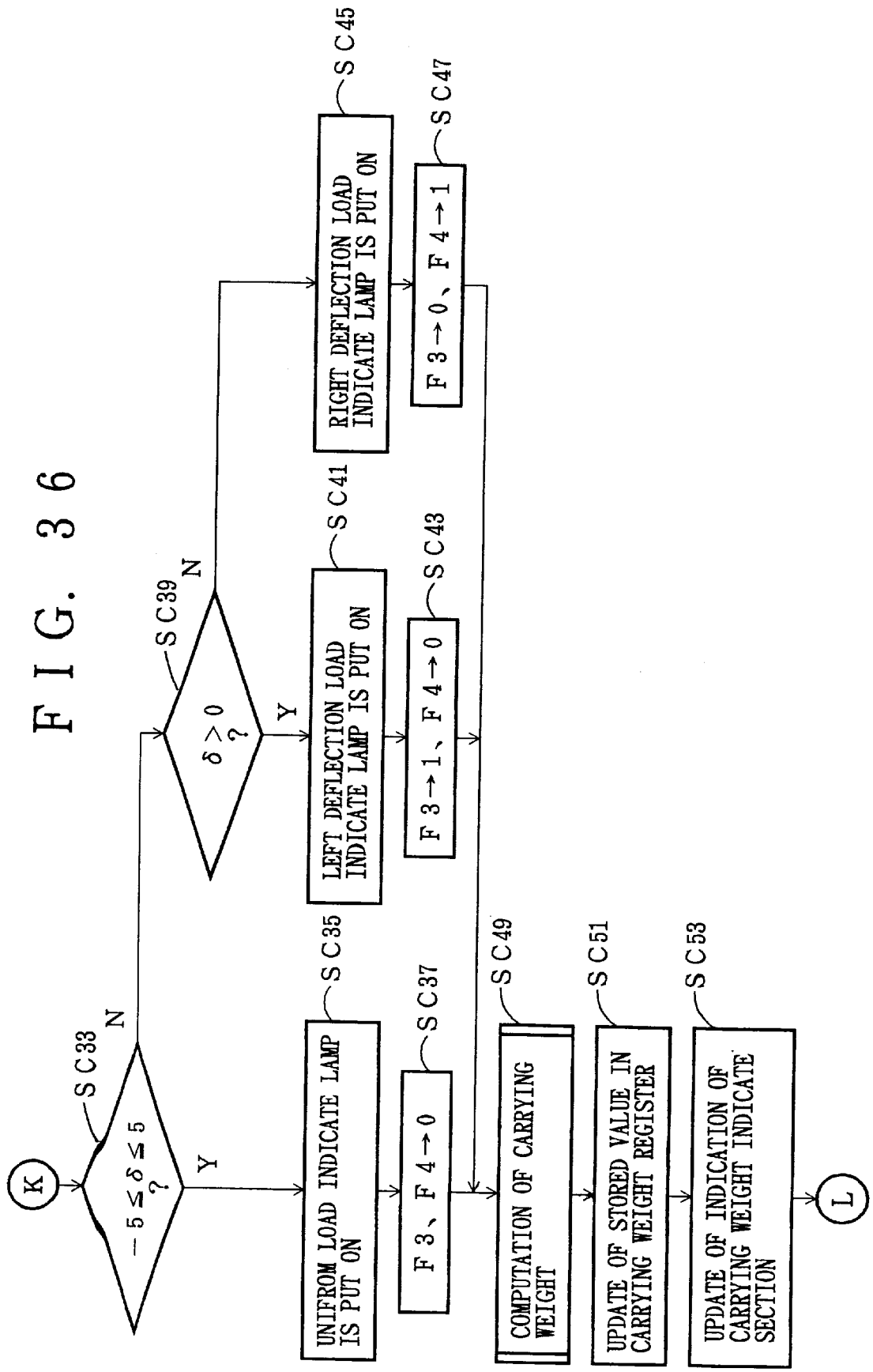

As shown in the flowchart of FIG. 36, it is decided whether or not the vehicle deflection value $\delta$ is within the range of $-5 \leq \delta \leq 5$ (step SC33). If step SC33 is "YES", the routine proceeds to step SC39 described later. In step SC35, the uniform load indicating lamp 40*b* is put on, and the other indicating lamps 40*a* and 40*c* are put off. Subsequently, the flags F3 and F4 of the left and right flag area in the RAM 33*b* are set at "0" (step SC37), and the processing routine proceeds to step SC49.

If step SC33 is "NO" (the vehicle deflection value $\delta$ is within the range of $-5 \leq \delta \leq 5$), the routine proceeds to step SC39. In step SC39, it is decided whether or not the vehicle deflection value & is plus. If step S39 is "YES", the left deflection load indicating lamp 40*a* is put on and the other indicating lamps 40*b* and 40*c* are put off (step SC41). The routine proceeds to step SC45. If step S39 is "NO", the right deflection load indicating lamp 40*c* is put on and the other indicating lamps 40*a* and 40*b* are put off (step S33). Subsequently, the flags F3 of the left flag area in the RAM 33*b* are set at "1" and the flag F4 of the right flag area therein is set at "0" (step SC43), and the processing routine proceeds to step SC49.

If step S39 is "YES", the right deflection load indicating lamp 40c is lit and the other indicating lamps 40a and 40b are put off (step SC45). Subsequently, the flag F4 of the right flag area in the RAM 33b are set at "1" and the flag F3 of the left flag area therein is set at "0" (step SC47), and the processing routine proceeds to step SC49.

In step SC49, the carrying weight W is computed using the carrying weight data of the NVM 35 on the basis of the total frequency of the pulse signals from the sensing elements having been subjected to offset adjustment, characteristic correction and error correction.

FIG. 39 is a flowchart showing the sub-routine of the processing of computing the carrying weight.

First, 200 Hz which is the reference frequency at the time of the carrying weight=0 to n is subtracted from the total frequency of the pulse signals from the sensing elements 21. The frequency corresponding to the carrying weight thus obtained is multiplied by 0.01 ton which is a unit conversion weight for 1 Hz, thus computing the provisional carrying weight Wp (step SC49a).

On the basis of the membership function X1 stored in the NFM 35, the membership function value X1 (Wp) of the provisional carrying weight Wp computed in step SC49a is computed (step SC49b). On the basis of the membership X3 stored in the NVM 35, the membership function value X3 (δ) of the vehicle deflection value δ computed in step SC31 is computed (step SC49c).

The four (upper limit) control parameters Y1, Y3, Y5 and Y7 are acquired from both membership function values X1 (Wp) and X3 (δ) through fuzzy inference (step SC49d).

The fuzzy scales corresponding to the control parameters Y1, Y3, Y5 and Y7 are developed according to their grade to acquire the center of gravity under the law of center of gravity. The fuzzy scale value corresponding to the center of gravity is acquired as the correction value ΔW from the abscissa (step SC49e). Using the second equation stored in the NVM 35, the correction value ΔW is added to the above provisional carrying weight Wp to the real carrying weight W (step SC49f). The processing process is returned to the main routine of FIG. 36 and proceeds to step SC51.

After step SC49, the storage value in the carrying weight register area of RAM 33b is updated to the carrying weight computed in step SC49 (step SC51). Further, in step SC53, the indication at the carrying weight indicating area 37 is updated to the carrying weight W stored in the carrying weight register area in step SA75 (step SC53).

Figure 37:
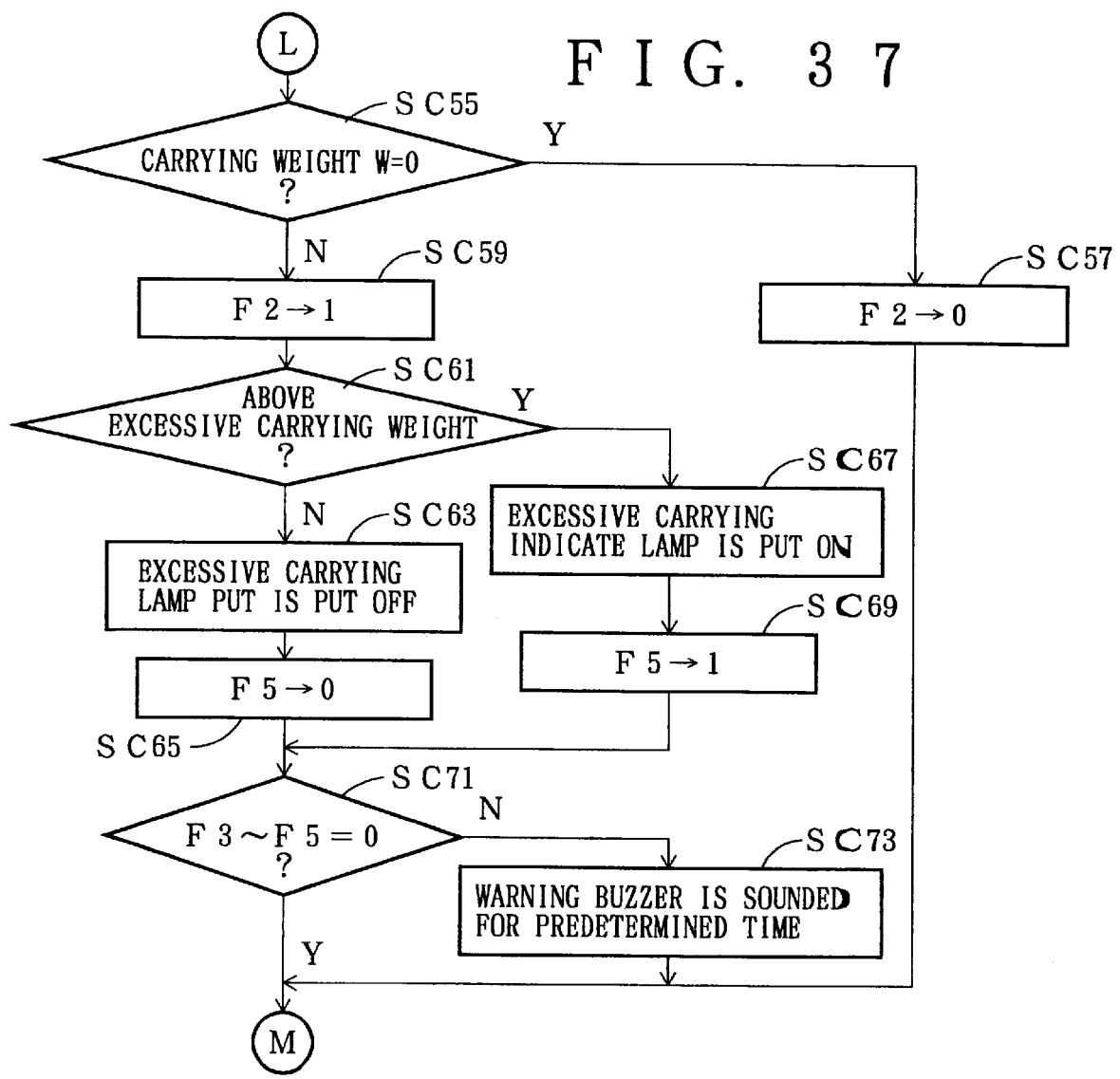

Further, as shown in the flowchart of FIG. 37, in step SC51, decision is made on whether or not the carrying weight stored in the carrying weight register area in step SC51 is '0'. If step SC 55 is "Yes" (carrying weight is '0'), in step SC57, the flag F2 in the carrying flag area is set for '0'. The processing routine returns to step SC3. On the other hand, if step SC55 is "No", the flag F2 in the carrying flag area is '1' (stepSC59), and thereafter, the processing routine proceeds to step SC61.

In step SC61, decision is made whether or not the carrying weight stored in the carrying weight register area is beyond the excessive carrying weight in the NVM 35. If step SC61 is "No" (the carrying weight is not beyond the excessive carrying weight), in step SC63, the excessive carrying indicating lamp 41 is put off. In step SC65, the flag F5 of the excessive flag area is '0', and the processing routine proceeds to step SC71. If step SC61 is "Yes" (the carrying weight exceeds the excessive carrying weight), instep SC67, the excessive carrying indicating lamp 41 is put on. In step SC69, the flag F5 of the excessive flag area of the RAM 33b is set for '1', and the processing routine proceeds to step SC71.

In step SC71, decision is made on whether or not the flags F3 to F5 of the flag areas of the left deflection, right deflection and excessive carrying are all "0". If step SC71 is "No", instep SA73, the warning buzzer 43 is sounded for a predetermined time. The processing routine returns to step SC3 in FIG. 35. If step SC71 is "Yes" (all the flags F3 to F5 are 0), the processing routine returns to step SC3 directly.

As understood from the description hitherto made, in this embodiment, the weight computing means 33P defined in the claims includes step SC49 in FIG. 39; membership function value deduction means includes step SC49b and SC49c in FIG. 39; and fuzzy inference means 33C includes step SC49d; weight correction value deduction means 33T includes SC49e in FIG. 39.

Further, in this embodiment, the output characteristic correction means 33A in the claims includes step SC23 in the flowchart of FIG. 35; axle deflection value computing means 33B includes step SC29 in FIG. 35; and the weighting means 33C includes step SC31 in FIG. 35.

An explanation will be given of the operation of the carrying weight meter 31 according to this embodiment.

When the offset adjustment value setting key 45 is operated, inputting of the offset adjustment value is on standby. A numerical value is inputted by operating the ten-digit key pad 53 and the setting key 55. This value is adopted as an offset adjustment value which is stored in the NVM35.

In a state where the offset adjustment value key 45 is not operated, and the running pulse from the running sensor 57 is not inputted, the frequency of each of the pulse signals from the sensing elements 21 on both ends of each axle 9, which corresponds to the load applied thereto, is corrected by the corresponding offset adjustment value stored in the NVM 35. Thus, variations in the output frequencies among the sensing elements in a tare state can be eliminated.

The frequency of the output pulse signal thus obtained is corrected in terms of the corresponding characteristic correction value stored in the NVM 35. Thus, the output from each sensing element 21 has a linear characteristic converted from a non-linear characteristic. As a result, the frequency of the output pulse signal from the sensing element 21 will not have a value corresponding to an unrealistic negative loa d under the influence of hysterisis that it becomes higher when the load increases than the load decreases.

The output pulse signal from each sensing element 21 thus obtained is further corrected in terms of the corresponding error correction value. Thus, variations in the characteristics on the correlation between the load and output pulse signal are eliminated.

Thereafter, the axle deflection values δ1 to δ3 are computed on the basis of output signals for each axle 9. Also using the weighting coefficients Q1 to Q3 inherent to the respective axles 9, the vehicle deflection value δ which is a deflection of load about the entire vehicle 1 is computed (0–1.0 mathematically in this embodiment).

The corresponding one of the left, uniform and right deflection load indicating lamps 40a to 40c is put on according as the vehicle deflection value δ is in either of the ranges $-5 \leq \delta \leq 5$ (uniform), $5 < \delta$ (left deflection) and $\delta < -5$ (right deflection).

The membership function value X3 (δ) is computed from the vehicle deflection value δ on the basis of the membership function X3 in the NVM 35.

For example, where the dimension of the vector of the vehicle deflection value δ, i.e. norm is 0.7, as indicated by a broken line in FIG. 32(b), the member function value X3 (0.7) acquired by the fuzzy scale intersecting the fuzzy scale value of the vehicle deflection value δ=0.7 is HI (0.7)=c, and VH (0.7)=d.

Further, the provisional carrying weight Wp (0 ton–16 ton mathematically in this embodiment) of the vehicle 1 is computed from the total frequency after offset adjustment, characteristic correction and error correction using the first equation in the NVM 35, and the membership function value X1 (Wp) of the provisional carrying weight Wp is acquired on the basis of the membership function X1 of the NVM 35.

If the provisional carrying weight Wp is 6.5 (ton), as indicated by a broken line in FIG. 32, the member function value X1 (6. 5) acquired by the fuzzy scale intersecting the fuzzy scale value of the provisional carrying weight Wp is LO(6. 5)=a, and HI(6. 5)=b.

The control parameter is inferred from the membership function value X1(Wp) of the provisional carrying weight Wp and the membership function value X3($\delta$) on the basis of the fuzzy inference rule R stored in the NVM 35.

For example, as described above, where the membership function value X1 (6. 5) of the provisional carrying weight Wp is LO (6. 5)=a and HI (6. 5)=b, and the membership function value X3 (0. 7) is HI (0. 7)=c and VH (0. 7)=d, the inference by the fuzzy inference rule R will be made for the following four combinations: LO (6. 5) of Wp=a and HI (0. 7) of $\delta$=c; LO(6. 5) of Wp=a and VH (0. 7) of $\delta$=d; HI (6. 5) of Wp=b and HI (0. 7) of $\delta$=c; and HI (6. 5) of Wp=b and VH (0. 7) of $\delta$=d.

The fuzzy scale of the membership function X5 corresponding to the combination of LO (6. 5) of Wp=a and HI (0. 7) of $\delta$=c is "P" as seen from FIG. 33. The grade of weighting "P" is "c" because the grade c of the HI (0. 7) is lower than the grade a of the LO (6. 5) as apparent from FIGS. 32(*a*) and (*b*).

Therefore, the control parameter Y1 obtained from LO (6. 5) of Wp=a and HI (0. 7) of $\delta$=c as a result of the fuzzy inference based on the fuzzy inference rule R is Y1=c*P.

The fuzzy scale of the membership function X5 corresponding to the combination of LO (6. 5) of Wp=a and VH (0. 7) of $\delta$=d is "N" as seen from FIG. 33. The grade of weighting "N" is "d" because the grade d of VH (0. 7) of $\delta$ is lower than the grade a of LO (6. 5) of Wp as seen from FIGS. 32(*a*) and (*b*).

Therefore, the control parameter Y3 obtained from LO (6. 5) of Wp=a and HI (0. 7) of $\delta$=d as a result of the fuzzy inference based on the fuzzy inference rule R is Y3=d*P.

The fuzzy scale of the membership function X5 corresponding to the combination of HI (6. 5) of Wp=b and HI (0. 7) of $\delta$=c is "Z" as seen from FIG. 33. The grade of weighting "Z" is "b" because the grade b of HI (0. 7) of $\delta$ is lower than the grade c of HI (6. 5) of Wp as seen from FIGS. 32(*a*) and (*b*).

Therefore, the control parameter Y5 obtained from HI (6. 5) of Wp=b and HI (0. 7) of $\delta$=d as a result of the fuzzy inference based on the fuzzy inference rule R is Y5=b*Z.

The fuzzy scale of the membership function X5 corresponding to the combination of HI (6. 5) of Wp=b and VH (0. 7) of $\delta$=c is "N" as seen from FIG. 33. The grade of weighting "N" is "b" because the grade b of HI(6. 5) of $\delta$ is lower than the grade d of HI (0. 7) of Wp as seen from FIGS. 32A and 32B.

Therefore, the control parameter Y7 obtained from LO (6. 5) of Wp=b and HI (0. 7) of $\delta$=d as a result of the fuzzy inference based on the fuzzy inference rule R is Y7=b*N.

The correction value $\Delta$W (−3 ton to +3 ton mathematically in this embodiment) is acquired from the four control parameters Y1 to Y7 under the application of the rule of center of gravity.

The rule of center of gravity is a general operation in fuzzy control of acquiring the center of gravity of the area encircled by the developed fuzzy scales in the membership function X5 with the four control parameters Y1, Y3, Y5 and Y7 developed in the fuzzy scales compressed in their grades c, d, b and b. The fuzzy scale value corresponding to the center of gravity acquired by this operation is the above correction value $\Delta$W.

Thus, when the provisional carrying weight Wp and the correction value $\Delta$W are defined, they are added on the basis of the second equation stored in the NVM 35 to acquire the real carrying weight W which is indicated on the carrying weight indicating area 37.

Incidentally, if the computed carrying weight Wp is beyond a predetermined excessive carrying weight value, the excessive carrying weight indicating lamp 41 is put on and the warning buzzer 43 is sounded to inform the driver of the state of excessive carrying.

When it is decided that the load is deflected in the vehicle width direction from the comparison of the computed vehicle deflection value $\delta$ and the deflection decision value and the load indicating lamp 40*a* for left deflection or 40*c* for right deflection is put on, the warning buzzer 43 is sounded to inform the driver of the state of deflective loading.

In the carrying weight meter 31 according to this embodiment, the provisional carrying weight Wp and the vehicle deflection value $\delta$ are acquired on the basis of the outputs from the sensing elements 21 arranged on both ends of the front, intermediate and rear axles 9; the membership function values X1 (Wp) and X3 ($\delta$) of the these provisional carrying weight Wp and the vehicle deflection value $\delta$ are acquired from the membership functions X1 and X3; the control parameters Y1–Y7 are fuzzy-inferred from the membership function values X1 (Wp) and X3 ($\delta$) using the fuzzy inference rule R; the correction value $\Delta$W is acquired from the inference result; and the provisional carrying weight Wp is corrected using the correction value $\Delta$W to acquire the real carrying weight W.

For this reason, even when the outputs from the sensing elements 21 vary due to the deflection of load applied to the vehicle 1 or the vibration of the vehicle 1 during the running of the vehicle 1, the correct carrying weight corresponding to the actual loading can be computed from the total of the outputs from the sensing elements 21.

In the carrying weight meter 31 according to this embodiment, in terms of the characteristic correction value stored in the NVM 35, the output from each of the sensing elements 21 is corrected from the non-linear characteristic to the linear characteristic. For this reason, the frequency of the output pulse signal of each sensing element 21 will not become a value corresponding to a non-realistic negative load under influence of the hysterisis. Therefore, the accuracy of each of the provisional carrying weight Wp and the vehicle deflection value $\delta$, which are computed on the basis of the output from each of the sensing elements and hence the correction value $\Delta$W and the carrying weight W can be improved.

In the carrying weight meter 31, the loads $\delta$1 to $\delta$3 for each axle 9 in the vehicle width direction are weighted by the weighting coefficients Q1 to Q3 inherent to the respective axles 9 to acquire the vehicle deflection value $\delta$, and the correction value is computed from the vehicle deflection value $\delta$ to acquire the carrying weight W.

Therefore, in accordance with the dispersion for the respective axles of load applied to the vehicle 1, the deflection of load for each axle 9 is weighted. Thus, on the basis of the output from each sensing element 21, the vehicle deflection value $\delta$, and hence the correction value $\Delta$W and carrying weight W can be deduced precisely and surely.

The load indicating lamps 40a to 40c of "left deflection", "uniform" and "right deflection" arranged on the carrying weight meter 31 and the means for blinking them according to the first, second and fourth embodiments may be omitted. Provision of these means, however, permits the orientation of the load in a transverse direction of the vehicle 1 to be detected visibly easily.

The load indicating lamps 42a to 42c of "front", "rear", "left" and "right" arranged on the carrying weight meter 31 and the means for blinking them according to the third embodiment may be omitted.

Provision of these means, however, permits the orientation of the load in the front-rear and left-right direction of the entire vehicle 1 to be detected visibly easily.

The deflection indicating section 40d arranged on the carrying weight meter 31 and means for indicating the vehicle deflection value δ according to the first embodiment may be omitted. But, provision of these means permits the degree of orientation of load to be easily detected in terms of the value itself and its polarity under a certain standard.

By providing the load indicating lamps 40a to 40c and the deflection indicating section 40d, the state of the inclination of load applied to the vehicle 1 can be recognized more precisely and correctly not only taking the deflection into consideration and but also the above indication than deciding to see the baggage on the platform 7.

Provision of the carrying weight indicating area 37 and structure for indicating the computed carrying weight permits not only the computed carrying weight to be recorded and a driver to be understandably informed of capability of further loading a baggage.

The means may be omitted which includes the excessive carrying indicating lamp 41 and warning buzzer 43 provided in the carrying weight meter 31 according to the first to fourth embodiments, structure for putting on the excessive carrying indicating lamp 41 when the computed carrying weight exceeds a prescribed carrying weight, and structure for sounding the warning buzzer 43 when the carrying weight is beyond a prescribed carrying weight or when the load is deflective.

But, provision of the excessive carrying indicating lamp 41 and the structure for its putting-on permits the excessive carrying state to be easily recognized, and provision of the warning buzzer 43 and the means for sounding it permits the deflective state of the loading and excessive carrying state to be easily recognized auditorily.

Incidentally, where such a structure as indicating or warning the orientation of deflection of load and excessive carrying state is adopted, the value used as a standard of decision may be changed as in the carrying weight meter 31 according to the third embodiment, or may be fixed as in the carrying weight meter 31 according to the first, second and fourth embodiments.

The structure may be omitted which serve to correct the output from each sensing element in terms of the characteristic correction value, provided in the carrying weight meter 31 according to the second and third embodiment and serve to correct the output from each sensing element in terms of the error correction value, provided in the carrying weight meter 31 according to the first and fourth embodiments.

Provision of such a structure eliminates fluctuation among the sensing elements 21 in the correlation between the load applied to each sensing element 21 and the output pulse signal, and its influence is excluded. Therefore, the accuracy of the carrying weight computed on the basis of the outputs from the sensing elements can be improved greatly.

The structure may be omitted which serves to correct the output from each sensing element 21 in terms of the offset adjustment value so that the pulse signal at the time of the carrying weight=0 ton is 200 Hz which is a reference frequency.

But, because of provision of such a structure, where no baggage is carried on the platform, the frequency of the output pulse signal from each sensing element 21 will not be shifted above or below 0 ton. The accuracy of the carrying weight computed on the basis of the output from each sensing element 21 can be improved greatly.

A structure will be omitted which serves to correct the nonlinear characteristic of the output from each sensing element 21 to the linear characteristic thereof in terms of the characteristic correction value. For this reason, the frequency of the output pulse signal of each sensing element 21 will not become a value corresponding to a non-realistic negative load under influence of the hysterisis. Thus, the accuracy of the carrying weight computed on the basis of each of the sensing elements can be improved greatly.

Further, both of the correction values Z1 to Z6 for gain adjustment and the characteristic correction values described above are set as a single kind of correction values. In this case, when the characteristic of the sensing element 21 varies according to the frequency band of the output pulse signal, each of the correction values Z1 to Z6 may be set for different values for the respective frequency bands as necessity requires.

In the carrying weight meter 31 according to the first, second and fourth embodiments, a structure may be omitted which serves to weight the axle deflection values δ1 to δ3 by weighting coefficients Q1 to Q3. But, providing such a structure, even if the rate of load dispersion is different for each axle according to the type of a vehicle, the axle deflection value δ1 to δ3 are weighted by the weighting coefficients Q1 to Q3 according to the rate, respectively so that the vehicle deflection value δ and hence the carrying weight can be computed precisely.

Incidentally, the above correction, adjustment or gain adjustment for the output pulse signal from each sensing element 21 may be carried out for the total of the frequencies of the output pulse signals from the sensing elements 21, or otherwise for each of the frequencies.

In the carrying weight meter 31 according to the second embodiment, by switching the setting mode changing switch 38, the setting of the deflecting state of load is selected from an automatic setting mode of detecting and setting it on the basis of the output from each sensing element 21 by the microcomputer 33, and a manual setting mode of setting it by the operation of the load input keys 39a to 39c of "left deflection", "uniform" and "right deflection". One of the two setting modes and its associated structure, however, may be omitted.

Further, the carrying weight meter 31 according to the first, second and fourth embodiments is designed so that the deflection of load is detected in only the vehicle width direction, the output from each sensing element 21 is corrected according to the detected content, and the provisional carrying weight Wp computed from the output from each sensing element 21 is corrected in terms of the correction value ΔW to acquire the real carrying weight W. However, the carrying weight meter 31 may be designed so that in accordance with the deflection of the load in the vehicle length direction as well as the vehicle width direction, the output from each sensing element 21 is corrected and the correction value ΔW is defined.

The carrying weight meter 31 according to the second embodiment is designed so that the correction content of the output from each sensing element 21 is determined referring to the state of running/stopping of the vehicle 1 as well as the deflection of load. Such a structure may be omitted. Inversely, it may be applied to the first, third and fourth embodiments.

Further, in the carrying weight meter 31 according to the first to fourth embodiments, each sensing element 21 is arranged within the shackle pin 19. The sensing element 21 may be arranged at any position inside the sprindle of a steering knuckle (in the case of the steering wheel) and at any vehicle portion where the load is applied from the platform 7 to the wheel 1.

In the carrying weight meter 31 according to the first, second and fourth embodiments, six wheels 3 and three (front, intermediate and rear) axles 9 are provided so that the six sensing elements are provided. On the other hand, in the carrying weight meter 31 according to the third embodiment, four wheels 3 and two (front and rear) axles 9 are provided so that the four sensing elements are provided.

In a case of the vehicle having the other number of wheels and axles than the above (two axles and four wheels, and three axles and six wheels), the corresponding number of sensing elements may be used. Therefore, the present invention may be applied to the vehicle having any number of axles and wheels.

In the carrying weight meter 31 according to the first to fourth embodiments, a magnetostrict sensing element 21 can be used as a weight sensor. The weight sensor having any other configuration may be used. The object of the output from each sensing element are to be corrected and adjusted in terms of the gain adjustment value should not limited to the frequency of its output pulse signal, but may be other values such as a voltage/current level and weight after weight conversion according to the arrangement of the sensors.

The object to be corrected according to the deflection of load should not limited to the frequency of its output pulse signal, but may be other values such as a voltage/current level and weight after weight conversion according to the arrangement of the sensors according to the arrangement of the sensors.

In the carrying weight meter 31 according to the first to fourth embodiments, the correction function holding means 35A, weighting coefficient holding means 35B, correction data holding means 35C, membership function holding means 35D and fuzzy inference rule holding means 35E may be configured by the RAM 33*b* but not the NVM 35.

The membership functions X1, X3 and X5 held by the membership function holding means 35D and the fuzzy inference rule R held by the fuzzy inference rule holding means 35E may be changed according to the structure of a vehicle, i. e. a variation in the type of the vehicle represented by the number of the axles 9, the maximum carrying weight, etc.

In this case, by configuring the membership function holding means 35D and the fuzzy inference rule holding means 35E in the NVM 35 outside the microcomputer 33, the NVM which is different in its held contents of the membership function and the fuzzy inference rule according to the vehicle type may be installed to use the other components commonly.

What is claimed is:

1. A load deflection degree computing apparatus for computing the vehicle deflection degree in a vehicle width direction applied on the vehicle on the basis of outputs from a plurality of weight sensors arranged separately in the vehicle width direction, comprising:

correction function holding means for holding an output characteristic correction function for correcting the non-linear characteristic of each of said weight sensors into the liner characteristic, said correction function corresponding to the output from each said sensor; and output characteristic correction means for correcting the output from each said weight sensor in terms of said output characteristic correction function;

wherein said vehicle deflection degree is computed on the basis of the corrected output from each said weight sensor.

2. A load deflection degree computing apparatus according to claim 1, further comprising deflection degree indicating means for indicating said vehicle deflection degree.

3. A load deflection degree computing apparatus according to claim 2, further comprising deflection orientation indicating means for indicating the orientation of said vehicle deflection degree.

4. A load deflection degree computing apparatus according to claim 2, wherein said weight sensors are arranged at both ends in said vehicle direction of each of axles of said vehicle, further comprising:

axle deflection computing means for computing an axle deflection degree of the load applied on each axle represented by its orientation and magnitude in the vehicle width direction on the basis of said corrected output from each said weight sensor;

weighting coefficient holding means for holding a weighting coefficient inherent to each said axle depending on the configuration of each said axle in a vehicle length direction;

weighting means for weighting said axle deflection degree for each axle by the weighting coefficient corresponding to each axle;

wherein said deflection degree of load in the vehicle width direction applied on the vehicle is computed by totaling the axle deflection degrees thus weighted.

5. A load deflection degree computing apparatus according to claim 4, further comprising deflection degree indicating means for indicating said vehicle deflection degree.

6. A load deflection degree computing apparatus according to claim 1, further comprising weight sensor level correction means for correcting the output signal from each said weight sensor so that the characteristics of said weight sensors are coincident with one another, wherein said vehicle deflection degree is computed on the basis of the levels of the output signals corrected by said weight sensor level correction means.

7. A carrying weight computing apparatus for computing a carrying weight on a vehicle on the basis of the outputs from a plurality of weight sensors separately arranged at least in a vehicle width direction, comprising:

deflecting load setting means for setting a deflection applied on the vehicle;

a carrying weight computing means for computing said carrying weight on the basis of outputs from said plurality of weight sensors and the deflection set by said deflective load setting means;

correction function holding means for holding output characteristic correction functions corresponding to the outputs from said weight sensors to correct their non-linear characteristic to their linear characteristic; and output characteristic correcting means for correcting the outputs from said weight sensors in terms of said output characteristic correction functions.

8. A carrying weight computing apparatus according to claim 7, wherein said carrying weight computing means comprises output correction means for correcting each said output from the weight sensor depending on said deflection of load, wherein said carrying weight i s computed on the basis of the total of the corrected outputs from said weight sensors.

9. A carrying weight computing apparatus according to claim 7, wherein said carrying weight computing means comprises total output correction means for correcting the total of said outputs from the weight sensors depending on said deflection of load, wherein said carrying weight is computed on the basis of the corrected total of the outputs from said weight sensors.

10. A carrying weight computing apparatus according to claim 7, wherein said carrying weight computing means comprises:

weight computing means for computing weight on the basis of the total of outputs form said plurality of sensors; and weight correcting means for correcting the weight in accordance with the deflection of said load set by said deflective load setting means, thereby providing said carrying weight.

11. A carrying weight computing apparatus according to claim 7, further comprising carrying weight indicating means for indicating the carrying weight of the vehicle computed by said carrying weight computing means.

12. A carrying weight computing apparatus according to claim 7, further comprising:

excessive carrying state deciding means for deciding presence or absence of the excessive state on the basis of comparison between said carrying weight of the vehicle and a prescribed carrying weight; and excessive carrying state informing means for informing a driver of the excessive carrying state when said excessive carrying state deciding means decides that the vehicle is in an excessive carrying state.

13. A carrying weight computing apparatus according to claim 7, further comprising:

correction data holding means for holding correction data corresponding to the deflection of load applied to the vehicle set by said deflection load setting means;

wherein said carrying weight computing means computes said carrying weight on the basis of said correction data held in said correction data holding means.

14. A carrying weight computing apparatus according to claim 13, before-computation running detection means for detecting presence or absence of running of the vehicle before the carrying weight is computed at the present time on the basis of an output from a running sensor for detecting the running of the vehicle and said carrying weight computed a the previous time; and correction data selecting means for selecting the corresponding correction value data from said correction value data holding means on the basis of the detection result by said before-computation running detection means and said deflection of load, wherein said carrying weight computing means computes the said carrying weight on the basis of said correction data selected by said correction data selecting means.

15. A carrying weight computing apparatus according to claim 13, wherein said correction data holding means holds a plurality of said correction value data correlated with the ratios of load in a vehicle length direction and a vehicle width length orthogonal thereto; and said deflective load setting means sets the ratios in both vehicle length and vehicle width directions.

16. A carrying weight computing apparatus according to claim 15, further comprising means for inputting/setting said correction value data.

17. A carrying weight computing apparatus according to claim 15, further comprising deflective load detecting means for detecting the ratios of load in both vehicle length and vehicle width directions on the basis of the respective output signals from the weight sensors, wherein said deflective load setting means sets said deflection of load for the detected ratios of load in both vehicle length and vehicle width directions.

18. A carrying weight computing apparatus according to claim 17 further comprising:

deflective load information inputting means for inputting the ratios of load in the vehicle length and vehicle width directions; and deflective load information selecting means for selecting either one of said ratios inputted to said deflective load information inputting means and those detected by said deflective load detecting means, wherein said deflective load setting means set the ratios in the vehicle length and vehicle width directions for those selected by said deflective load information selecting means.

19. A carrying weight computing apparatus according to claim 17, further comprising:

weight sensor level correcting means for correcting the respective output signals from said weight sensors so that their characteristics agree with one another, wherein said deflective load detecting means detects the ratios in the vehicle length and vehicle width directions on the basis of the corrected output signals from said weight sensors.

20. A carrying weight computing apparatus according to claim 17, wherein said output deflective load detecting means detects the ratios of load in the vehicle length and vehicle width direction on the basis of the levels of the output signals from said weight sensors.

21. A carrying weight computing apparatus according to claim 17 further comprising:

deflective load direction deciding means for deciding the direction of deflection for the vehicle of load applied thereto on the basis of said detected ratios of load;

deflective load direction indicating means for indicating said decided direction of deflection.

22. A carrying weight computing apparatus according to claim 7, further comprising deflective load detecting means for detecting the deflection of load applied to the vehicle on the basis of the output signals from the weight sensors, and said deflective load setting means sets the deflection of load for said detected deflection of load.

23. A load deflection degree computing apparatus according to claim 22, wherein said weight sensors are arranged at both ends in said vehicle width direction of each of axles of said vehicle, further comprising:

axle deflection computing means for computing an axle deflection degree of the load applied on each axle represented by its orientation and magnitude in the vehicle width direction on the basis of said corrected output from each said weight sensor;

weighting coefficient holding means for holding a weighting coefficient inherent to each said axle depending on the configuration of each said axle in a vehicle length direction;

weighting means for weighting said axle deflection degree for each axle by the weighting coefficient corresponding to each axle;

wherein said deflection degree of load in the vehicle applied on the vehicle is computed by totaling the axle deflection degrees thus weighted, and the deflection of load applied to the vehicle is detected from said deflection degree.

24. A carrying weight computing apparatus according to claim 22, further comprising:

weight sensor level correcting means for correcting the respective output signals from said weight sensors so that their characteristics agree with one another, wherein said deflective load detecting means detects the deflection of load applied to the vehicle on the basis of the corrected output signals from said weight sensors.

25. A carrying weight computing apparatus according to claim 17, further comprising:

correction function holding means for holding output characteristic correction functions corresponding to the outputs from said weight sensors to correct their non-linear characteristic to their linear characteristic; and output characteristic correcting means for correcting the outputs from said weight sensors in terms of said output characteristic correction functions;

wherein said output deflective load detecting means detects the deflection of load applied to said vehicle on the basis of the levels of the output signals from said weight sensors.

26. A carrying weight computing apparatus according to claim 22 further comprising:

deflective load orientation deciding means for deciding the orientation in the vehicle width direction of said detected deflection of load;

wherein said deflective load setting means sets the deflection of load for said decided orientation of deflection of load.

27. A carrying weight computing apparatus according to claim 26, further comprising deflective load indicating means for indicating the decided orientation of the deflection of load in the vehicle width direction.

28. A carrying weight computing apparatus according to claim 20 further comprising:

deflective load orientation deciding means for deciding the orientation in the vehicle width direction of said detected deflection of load;

deflective load information inputting means for inputting the orientation of deflection of said load in the vehicle width direction; and deflective load information selecting means for selecting either one of said orientation of the deflection of load inputted to said deflective load information inputting means and that detected by said deflective load orientation detecting means, wherein said deflective load setting means set the deflection of load for that selected by said deflective load information selecting means.

29. A carrying weight computing apparatus according to claim 28 further comprising deflective load indicating means for indicating the decided orientation of the load in the vehicle width direction.

30. A carrying weight computing apparatus according to claim 10, further comprising deflective load detecting means for detecting the degree of deflection of load applied to the vehicle on the basis of the output signals form the weight sensors, wherein said deflective load setting means sets the deflection of load for the detected deflection of load, said weight correcting means comprises a membership function deducing means for deducing membership function values corresponding to the weight computed by the weight computing means and the deflection of load set by said deflective load setting means on the basis of them, fuzzy inference means for making fuzzy inference relative to said membership function values on the basis of a fuzzy inference rule, and weight correction value deducing means for deducing a weight correction value used to correct said weight on the basis of the inference result by said fuzzy inference means.

31. A load deflection degree computing apparatus according to claim 22, wherein said weight sensors are arranged at both ends in said vehicle direction of each of axles of said vehicle, further comprising:

axle deflection computing means for computing an axle deflection degree of the load applied on each axle represented by its orientation and magnitude in the vehicle width direction on the basis of said corrected output from each said weight sensor;

weighting coefficient holding means for holding a weighting coefficient inherent to each said axle depending on the configuration of each said axle in a vehicle length direction;

weighting means for weighting said axle deflection degree for each axle by the weighting coefficient corresponding to each axle;

wherein a total of the axle deflection degrees of load for the respective axles weighted in terms of said weighting coefficients is detected as a deflection degree of said load.

32. A carrying weight computing apparatus according to claim 30, wherein said weight correction means comprises:

membership function holding means for holding the membership function for defining the membership function values corresponding to said weight and said deflection of load, and fuzzy inference rule holding means for holding said fuzzy inference rule, wherein said membership function deducing means deduce the membership function values on the basis of the said membership function, said fuzzy inference rule means makes fuzzy inference relative to the membership function values on the basis of said fuzzy inference rule, and at least one of said membership function and said fuzzy inference rule is changed in accordance with the structure of said vehicle.

33. A carrying weight computing apparatus according to claim 30, further comprising:

weight sensor level correcting means for correcting the respective output signals from said weight sensors so that their characteristics agree with one another, wherein said deflective load detecting means detects the weight of the vehicle on the basis of the corrected output signals from said weight sensors, and said deflective load detecting means also-detects the deflection of load on the basis of them.

34. A carrying weight computing apparatus according to claim 30, further comprising:

correction function holding means for holding output characteristic correction functions corresponding to the outputs from said weight sensors to correct their non-linear characteristic to their linear characteristic; and output characteristic correcting means for correcting the outputs from said weight sensors in terms of said output characteristic correction functions;

wherein said weight computing means computes said weight on the basis of the corrected levels of the output signals from said weight sensors, and said output deflective load detecting means detects the deflection of load applied to said vehicle on the basis of them.

35. A carrying weight computing apparatus according to claim 30 further comprising:

deflective load orientation deciding means for deciding the orientation in the vehicle width direction of said detected deflection of load; and deflective load indicating means for indicating the decided orientation of the load in the vehicle width direction.

* * * * *